(12) United States Patent
Daoura et al.

(10) Patent No.: US 11,495,108 B2
(45) Date of Patent: Nov. 8, 2022

(54) PRIVATE WIRELESS NETWORK COMMUNICATIONS SYSTEMS, METHODS AND DEVICES

(71) Applicant: PB Inc., Issaquah, WA (US)

(72) Inventors: Daniel J. Daoura, Renton, WA (US); Nicholas R. Pearson-Franks, Sammamish, WA (US)

(73) Assignee: PB, Inc., Issaquah, WA (US)

( * ) Notice: Subject to any disclaimer, the term of this patent is extended or adjusted under 35 U.S.C. 154(b) by 0 days.

(21) Appl. No.: 16/983,965

(22) Filed: Aug. 3, 2020

(65) Prior Publication Data

US 2021/0035429 A1    Feb. 4, 2021

Related U.S. Application Data

(60) Provisional application No. 62/882,465, filed on Aug. 2, 2019.

(51) Int. Cl.
*G08B 21/02* (2006.01)
*H04W 4/029* (2018.01)

(52) U.S. Cl.
CPC ..... *G08B 21/0283* (2013.01); *G08B 21/0222* (2013.01); *G08B 21/0269* (2013.01); *H04W 4/029* (2018.02)

(58) Field of Classification Search
CPC ............ G08B 21/0283; G08B 21/0222; G08B 21/0269; H04W 4/029
See application file for complete search history.

(56) References Cited

U.S. PATENT DOCUMENTS

| | | | | |
|---|---|---|---|---|
| 6,826,385 B2* | 11/2004 | Kujala | ................ | G01C 21/20 340/573.1 |
| 7,034,678 B2* | 4/2006 | Burkley | ................ | G01S 5/0027 340/539.13 |
| 7,091,851 B2* | 8/2006 | Mason | ................ | G01S 5/0027 340/539.13 |
| 7,091,852 B2* | 8/2006 | Mason | ................ | G01C 21/206 340/539.13 |

(Continued)

OTHER PUBLICATIONS

Google, "Assisted GPS", at least as early as Dec. 1, 2020, pp. 1 through 2, Google Search.

(Continued)

*Primary Examiner* — Hoi C Lau
(74) *Attorney, Agent, or Firm* — Fogg & Powers, LLC

(57) ABSTRACT

An embodiment of a minder device includes a selector and a transceiver. The selector is configurable in one of multiple configurations each corresponding to a respective one of multiple responses. And the transceiver is configured to receive, from a host server via a cellular network, a message from a monitor device associated with the minder device, and to send, to the monitor device via a cellular network and the host server, the one of the responses corresponding to the one of the configurations in which the selector is configured. For example, such a device can be a less-expensive alternative to, and can allow more monitor control than, a smart phone. Furthermore, such a device can be suitable for tracking and locating children too young to have a smart phone, for tracking and locating pets, and for tracking and locating objects.

33 Claims, 32 Drawing Sheets

(56) References Cited

U.S. PATENT DOCUMENTS

| | | | | |
|---|---|---|---|---|
| 7,518,500 | B2* | 4/2009 | Aninye | G08B 21/0269 340/506 |
| 7,804,412 | B2* | 9/2010 | Derrick | G08B 21/0283 340/573.1 |
| 8,436,725 | B2* | 5/2013 | Caetano Pereria | H04K 3/226 340/508 |
| 8,451,131 | B2* | 5/2013 | Ghazarian | G08B 21/22 340/573.4 |
| 8,665,087 | B2* | 3/2014 | Greene | G08B 7/06 340/539.13 |
| 8,688,375 | B2* | 4/2014 | Funk | G08B 25/016 701/495 |
| 8,712,441 | B2* | 4/2014 | Haney | H04W 4/14 455/456.3 |
| 9,195,866 | B1 | 11/2015 | Mehranfar et al. | |
| 9,247,410 | B1* | 1/2016 | Matsuo | H04W 52/0212 |
| 9,295,024 | B2* | 3/2016 | Howard | G08B 25/016 |
| 9,407,624 | B1 | 8/2016 | Myers et al. | |
| 9,889,305 | B1 | 2/2018 | Hellman et al. | |
| 9,954,995 | B2* | 4/2018 | Sulaiman | H04W 4/33 |
| 10,075,811 | B1* | 9/2018 | Puppala | H04W 4/029 |
| 10,169,970 | B2* | 1/2019 | Selmanovic | G08B 21/0288 |
| 10,389,459 | B2* | 8/2019 | Daoura | H04W 4/08 |
| 10,645,534 | B1* | 5/2020 | Klinkner | G08B 13/1427 |
| 10,909,830 | B1* | 2/2021 | Stapleford | G08B 21/0283 |
| 10,937,286 | B2* | 3/2021 | Daoura | H04L 67/10 |
| 10,972,872 | B2* | 4/2021 | Gandrud | G08B 21/0286 |
| 2001/0048364 | A1* | 12/2001 | Kalthoff | G01S 5/02 340/573.1 |
| 2004/0070515 | A1* | 4/2004 | Burkley | G01S 5/0289 340/8.1 |
| 2004/0174264 | A1* | 9/2004 | Reisman | G08B 21/0202 340/573.4 |
| 2004/0192353 | A1* | 9/2004 | Mason | H04B 7/18595 455/457 |
| 2005/0134459 | A1 | 6/2005 | Glick et al. | |
| 2006/0279427 | A1* | 12/2006 | Becker | G16H 40/20 340/573.4 |
| 2008/0001734 | A1 | 1/2008 | Stilp et al. | |
| 2008/0062120 | A1* | 3/2008 | Wheeler | G08B 25/016 345/156 |
| 2008/0102799 | A1* | 5/2008 | Dholakia | H04L 51/38 455/466 |
| 2008/0104649 | A1* | 5/2008 | Naaman | G06F 16/2423 725/116 |
| 2008/0201076 | A1* | 8/2008 | Huang | G01C 21/00 701/469 |
| 2009/0143078 | A1 | 6/2009 | Tu et al. | |
| 2009/0298461 | A1* | 12/2009 | O'Reilly | H04M 3/42374 455/404.2 |
| 2010/0066545 | A1* | 3/2010 | Ghazarian | G08B 21/22 340/573.4 |
| 2010/0079304 | A1* | 4/2010 | Becker | G16H 40/20 340/8.1 |
| 2010/0099361 | A1* | 4/2010 | Lundstrom | H04B 17/3912 455/67.11 |
| 2011/0177790 | A1* | 7/2011 | Monte | G08B 21/0277 455/404.2 |
| 2011/0300946 | A1* | 12/2011 | Stafford | H04L 67/38 463/42 |
| 2012/0235860 | A1* | 9/2012 | Ghazarian | G08B 13/1427 342/357.4 |
| 2013/0072223 | A1 | 3/2013 | Berenberg et al. | |
| 2013/0150028 | A1 | 6/2013 | Akins et al. | |
| 2014/0062695 | A1* | 3/2014 | Rosen | G08B 21/0219 340/539.13 |
| 2014/0089128 | A1* | 3/2014 | Stauffer | H04N 9/87 386/280 |
| 2014/0274225 | A1* | 9/2014 | Lacatus | H04W 4/029 455/574 |
| 2015/0264307 | A1* | 9/2015 | Chastney | G06F 3/04847 715/753 |
| 2015/0264308 | A1* | 9/2015 | Chastney | G06F 3/0481 715/753 |
| 2015/0332573 | A1* | 11/2015 | Selmanovic | H04W 4/02 455/457 |
| 2015/0356393 | A1* | 12/2015 | Daoura | G06Q 10/10 340/8.1 |
| 2015/0356858 | A1* | 12/2015 | Daoura | A44B 15/00 340/539.32 |
| 2015/0356861 | A1* | 12/2015 | Daoura | G08B 21/0277 340/539.13 |
| 2015/0356862 | A1* | 12/2015 | Daoura | G08B 25/08 340/686.6 |
| 2015/0371215 | A1 | 12/2015 | Zhou et al. | |
| 2015/0371511 | A1 | 12/2015 | Miller et al. | |
| 2016/0044723 | A1* | 2/2016 | Sergeev | H04W 24/08 370/252 |
| 2016/0054083 | A1 | 2/2016 | Kiyani et al. | |
| 2016/0116598 | A1* | 4/2016 | Wu | G01S 19/23 342/357.62 |
| 2016/0171486 | A1 | 6/2016 | Wagner et al. | |
| 2016/0189450 | A1 | 6/2016 | Anderson et al. | |
| 2016/0226812 | A1* | 8/2016 | Attolini | G06Q 50/01 |
| 2016/0343032 | A1 | 11/2016 | DeWitt et al. | |
| 2017/0019853 | A1 | 1/2017 | Ghosh et al. | |
| 2017/0032344 | A1* | 2/2017 | Attolini | H04L 51/066 |
| 2017/0180062 | A1 | 6/2017 | Johansen | |
| 2018/0047297 | A1* | 2/2018 | Harper-Ray | H04M 15/8083 |
| 2018/0242272 | A1* | 8/2018 | Dackefjord | H04W 64/00 |
| 2018/0260822 | A1 | 9/2018 | Wells | |
| 2018/0324562 | A1 | 11/2018 | Park et al. | |
| 2019/0103012 | A1* | 4/2019 | Daoura | G08B 21/0227 |
| 2019/0137947 | A1 | 5/2019 | Yaghmour | |
| 2019/0182873 | A1 | 6/2019 | Wass et al. | |
| 2019/0192053 | A1 | 6/2019 | Saigh | |
| 2019/0208363 | A1* | 7/2019 | Shapiro | G16H 50/30 |
| 2019/0213860 | A1* | 7/2019 | Shaprio | H02J 7/025 |
| 2019/0220715 | A1 | 7/2019 | Park et al. | |
| 2019/0288966 | A1* | 9/2019 | Attolini | G06Q 10/1053 |
| 2019/0296969 | A1 | 9/2019 | Zimny et al. | |
| 2019/0342833 | A1 | 11/2019 | Åström et al. | |
| 2019/0394720 | A1 | 12/2019 | McCoy et al. | |
| 2020/0027096 | A1 | 1/2020 | Cooner | |
| 2020/0128212 | A1 | 4/2020 | Sannala | |
| 2020/0169848 | A1* | 5/2020 | Daoura | G08B 21/24 |
| 2020/0314752 | A1 | 10/2020 | Haque et al. | |
| 2020/0337162 | A1 | 10/2020 | Perkins et al. | |
| 2020/0367147 | A1 | 11/2020 | Höglund et al. | |
| 2020/0367471 | A1 | 11/2020 | Deliou | |
| 2021/0027309 | A1 | 1/2021 | Wells | |
| 2021/0035429 | A1* | 2/2021 | Daoura | G08B 21/0291 |
| 2021/0152976 | A1* | 5/2021 | Daoura | H04W 52/0219 |
| 2021/0256833 | A1* | 8/2021 | Daoura | H04W 4/021 |
| 2021/0274315 | A1* | 9/2021 | Daoura | H04W 4/20 |

OTHER PUBLICATIONS

Google, "Universally unique identifier", at least as early as Nov. 30, 2020, pp. 1 through 2, Google Search.

IP.com, "Create Number List", InnovationQ Plus, at least as early as Dec. 1, 2020, pp. 1, https://ip.ip.com/discover.

U.S. Patent and Trademark Office, "Office Action", U.S. Appl. No. 16/575,315, filed Dec. 4, 2020, pp. 1 through 10, Published: US.

Vos, "What is eDRX (Extended Discontinuous Reception)?", IoT Blog, Sierra Wireless, Jun. 4, 2020, pp. 1 through 7, https://www.sierrawireless.com/iot-blog/edrx-lpwa/.

Wipo, "edrx and bluetooth", Search International an National Patent Collections, at least as early as Dec. 1, 2020, p. (s) 1 through 2, https://patentscope.wipo.int/search/en/result.jsf?_vid=P12-KI655E-11650.

U.S. Patent and Trademark Office, "Notice of Allowance", U.S. Appl. No. 16/575,315, filed May 7, 2021, pp. 1 through 34, Published: US.

U.S. Patent and Trademark Office, "Notice of Allowance", U.S. Appl. No. 16/575,315, filed Aug. 30, 2021, pp. 1 through 11, Published: US.

(56) References Cited

OTHER PUBLICATIONS

U.S. Patent and Trademark Office, "Office Action", U.S. Appl. No. 17/163,403, filed Jul. 9, 2021, pp. 1 through 24, Published: US.

\* cited by examiner

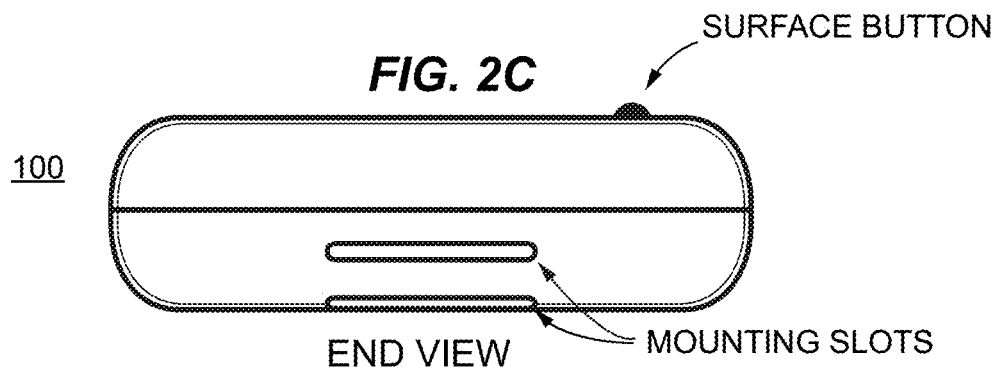
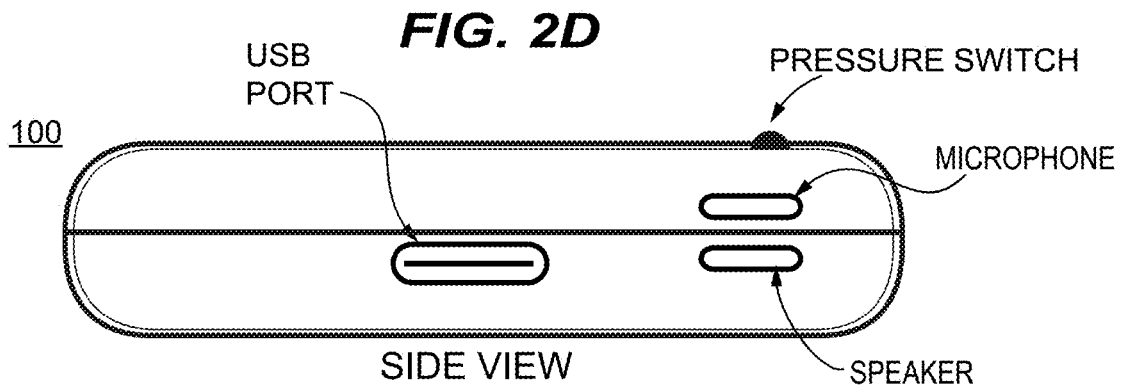
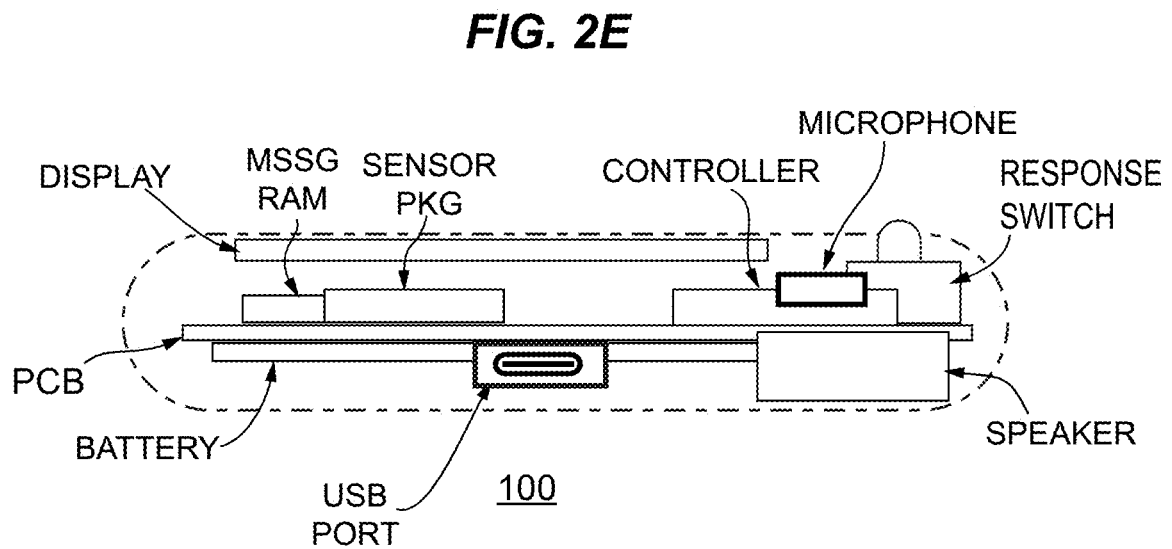

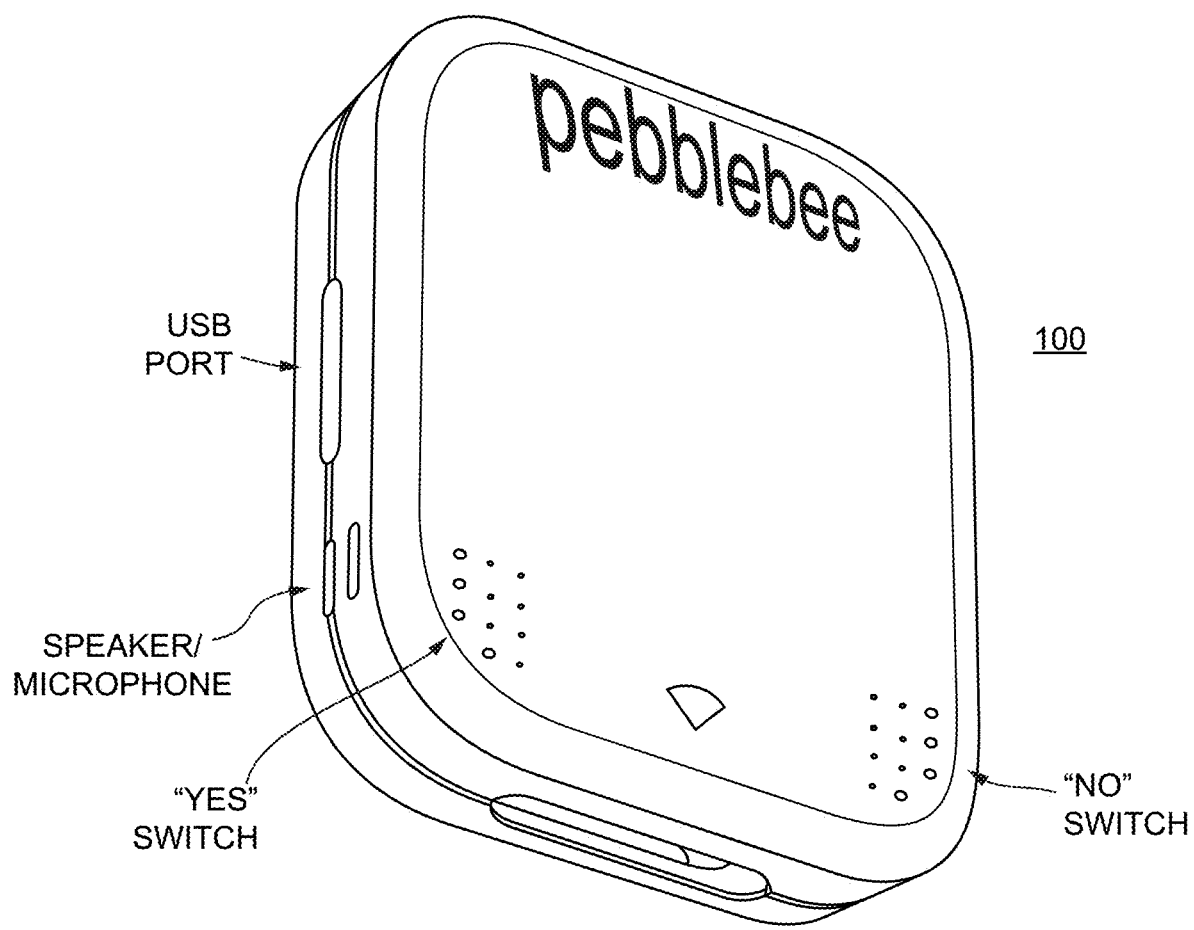

MESSAGE DISPLAY

100

MESSAGE DISPLAY

100

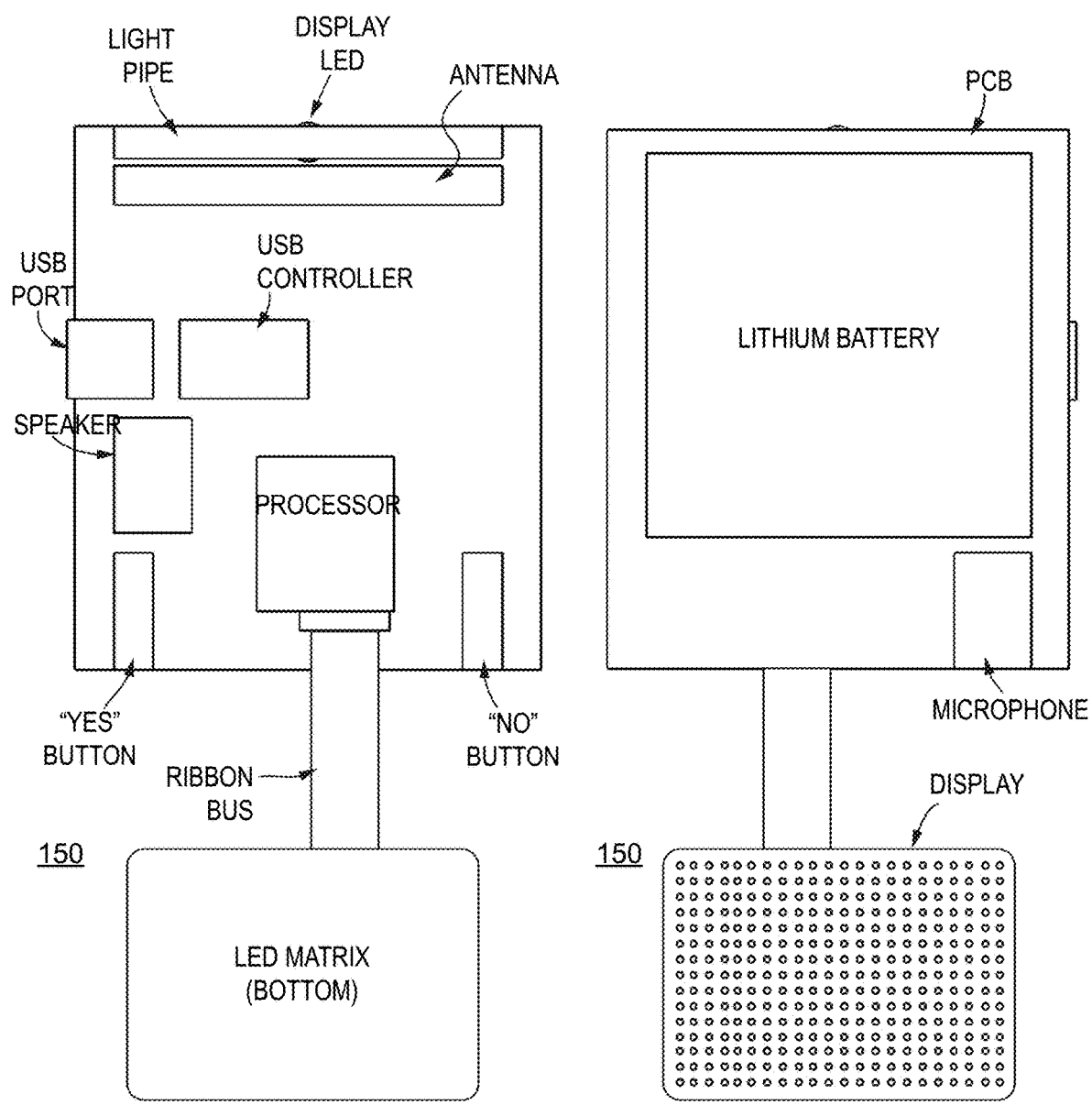
FIG. 6A  FIG. 6B

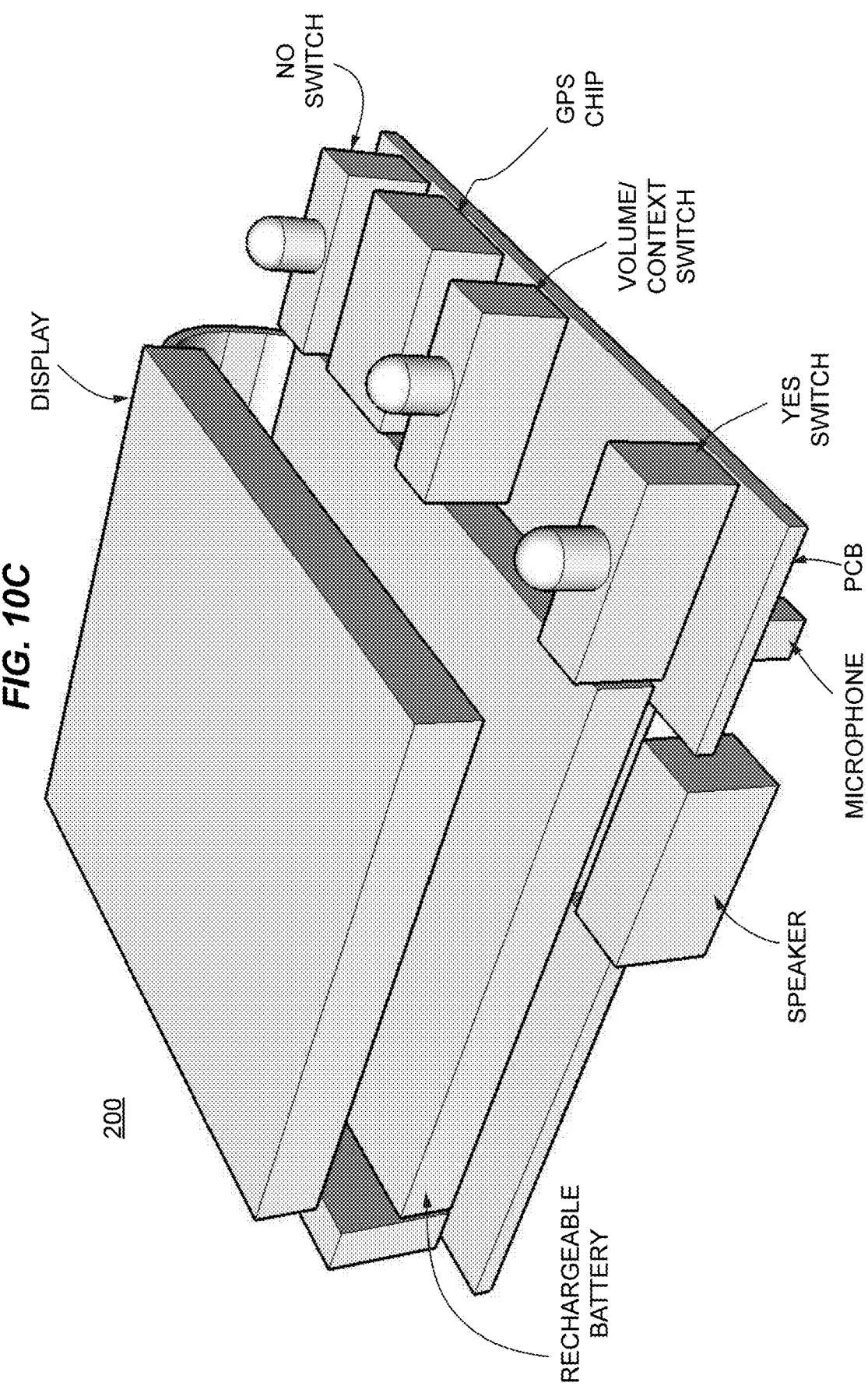

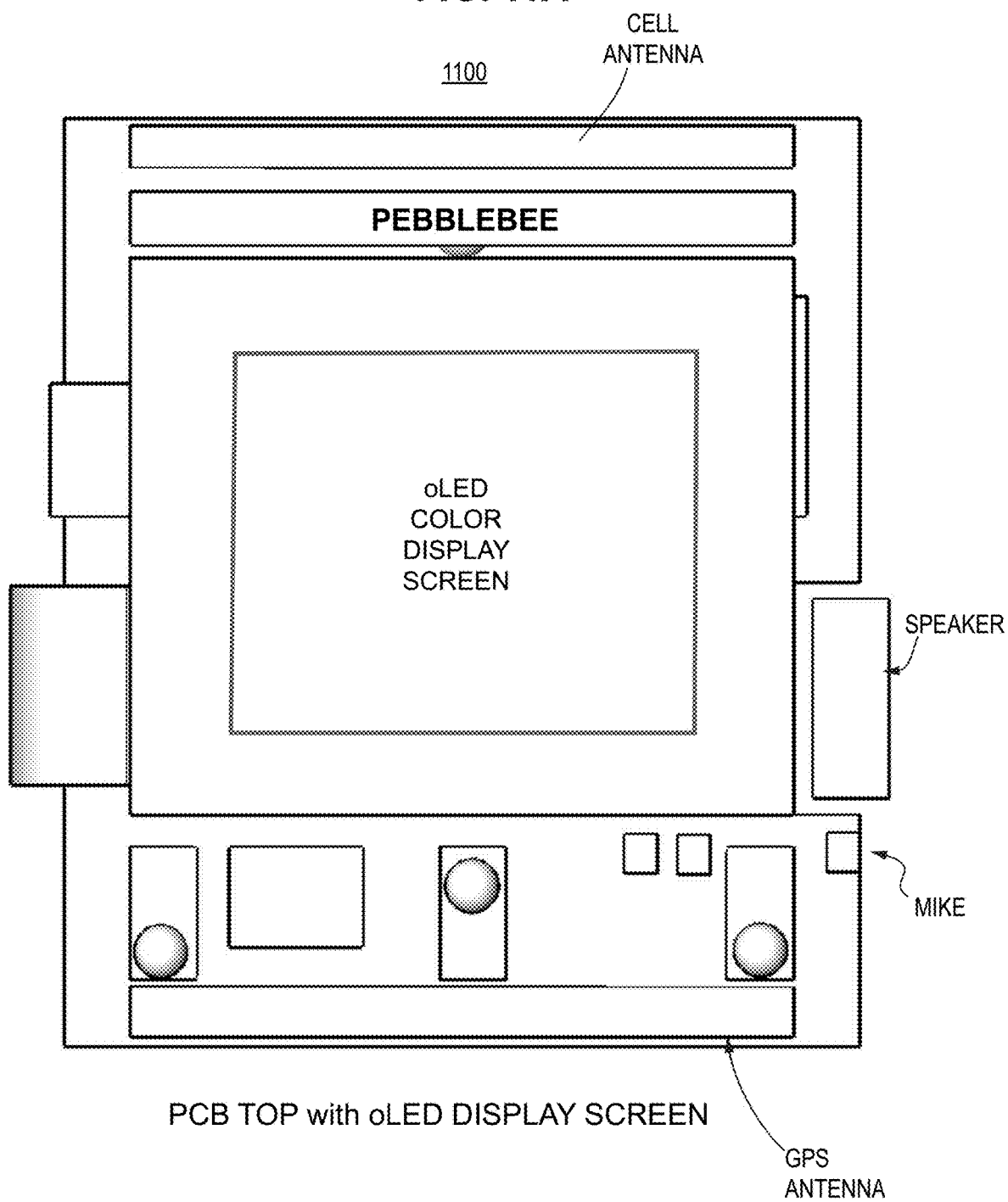

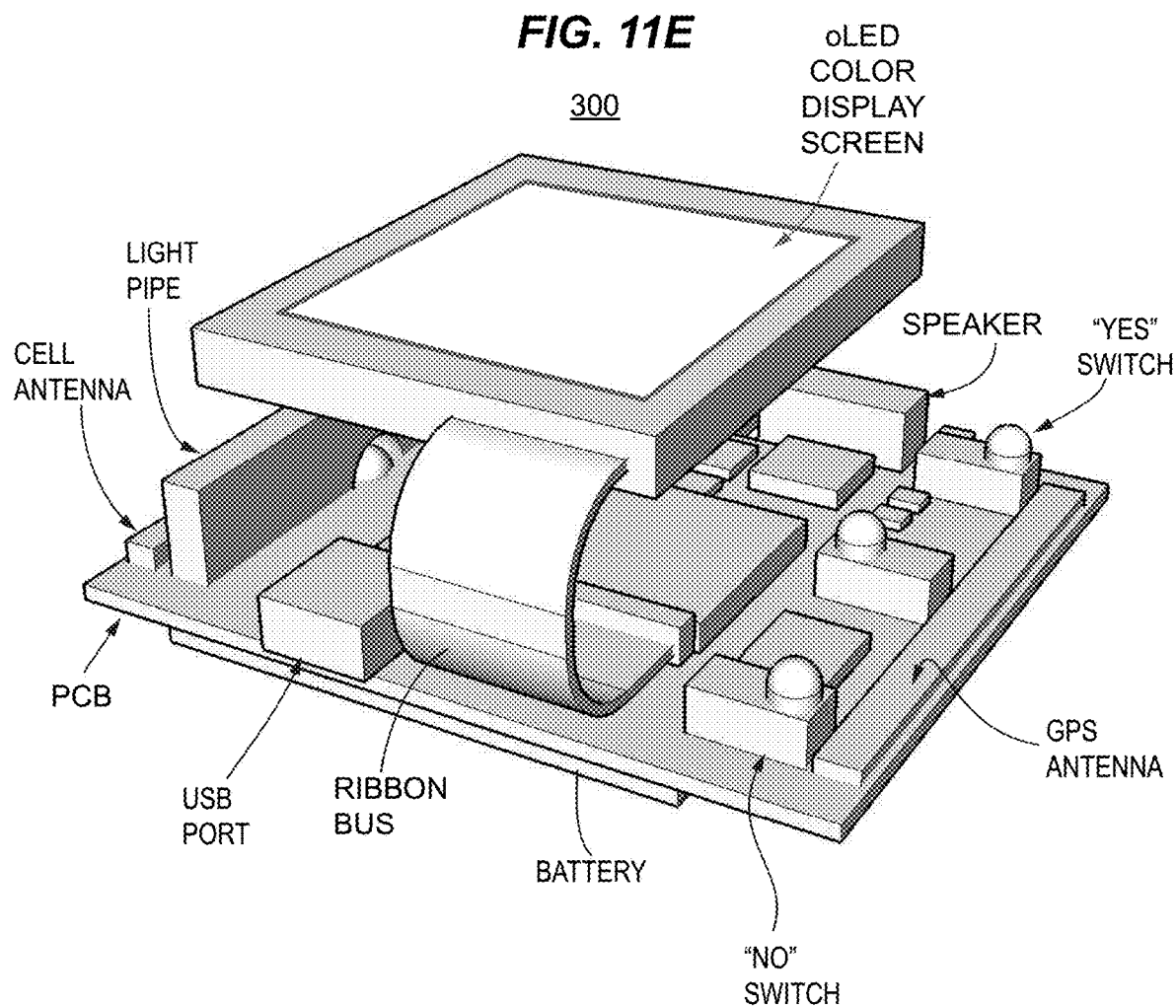

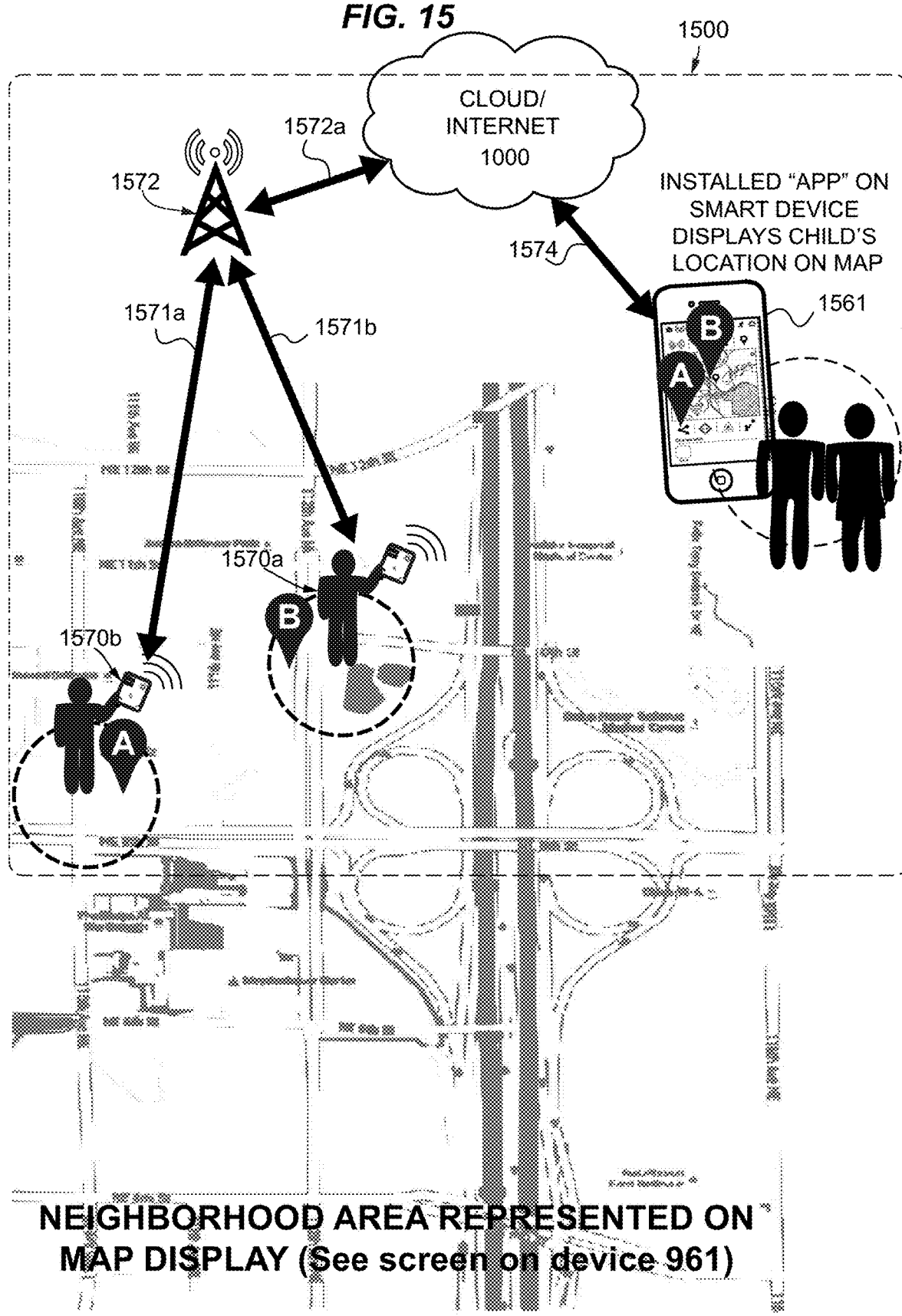

SECTION PLANE A

SECTION PLANE B

PRIVATE WIRELESS NETWORK COMMUNICATIONS SYSTEMS, METHODS AND DEVICES

CROSS-REFERENCE TO RELATED APPLICATIONS

This Application claims priority from U.S. Provisional Patent Application Ser. No. 62/882,465 filed Aug. 2, 2019, entitled "PRIVATE WIRELESS NETWORK COMMUNICATIONS SYSTEMS, METHODS AND DEVICES"; the contents of which are hereby incorporated in its entirety.

SUMMARY

An embodiment includes one or more wireless child minder devices that define nodes of a child network. The child minder device(s) is(are) addressable and is(are) tethered to a parent network of one or more smart device(s). The tether includes cellular connectivity by which each parent (e.g., monitor) device, when supplied with program instructions provided as an "application," is enabled to monitor, and to be in radio communication with, one or more child devices. Transmissions from the child minder devices generally include location information that enables the parent device to track each child device. A 'store-and-share' (SNS) protocol enables cellular audio messaging from parent device to child device or child device to parent device. The child devices also can receive text messages from a parent device and can respond by affirmative or declinatory responses or by audio messages addressed to the parent device(s). The network that is formed is termed a software-defined virtual network (SDPN), and is set up by registering each child minder device with one or more parent devices on a cloud host. The cloud host operates the SDPN and serves as an interface between the child and parent devices. The cloud host server also operates administrative functions, advanced logic functions such as AI, and may be enabled to access data from larger networks.

GOVERNMENT SUPPORT

Not Applicable.

TECHNICAL FIELD

This disclosure pertains generally to the field of smart solutions for cellular communications in a software-defined closed network.

SUMMARY

Longstanding issues for groups, such as families, include keeping in communication with one another, not getting separated from one another or otherwise lost, and getting into trouble while no one else is around to help. Therefore, there is a need for a private networking system that allows members of a group to determine a location of (e.g., find), or otherwise aid, another member of the group who becomes separated from the group. Related issues include, for example, finding lost pets and reuniting lost family members with parents or another guardian. More generally, a system for checking status and updating location of group members is needed for monitoring and guiding members of private groups. For example, such a system could be supplied with a radio-communications system for allowing one member of a group to determine a geographical location or other status of another member of the group.

Cellular, Wi-Fi and BLUETOOTH technologies are known for communicating via radio. More recently, cellular technologies have been integrated with other digital radio networks via Multi-RAT (radio access technologies) connections and handoffs. A key feature of integrated radio systems is a flexible frame and slot standard for the digital radio signal. Modern systems are designed to be forward compatible as standards evolve but also to accept legacy signals.

Legacy cellular technologies include GSM (Groupe Speciale Mobile) with GRPS (General Packet Radio System) and EDGE (Enhanced Data rates for Global Evolution), PCS 1900, CDMAOne® (IS-95), SMS (short message service), TDMA, PDC, and UMTS (wideband CDMA) and CDMA2000 1×EV-DV (the first data and voice standard supporting full 3G data rates). These are generally 3G or 4G systems. Currently, 5G cellular networks are being implemented worldwide. The goal is to increase digital-transmission rates and -carrying capacity by increasing density of digital traffic. Pulse-code modulation (for example, with code division multiple access (CDMA)), may be used to allow cellular towers to transmit communications to multiple receivers in parallel by multiplexing and interleaving messages that can be separated out at a receiver by a correlation process. But the use of these technologies to simplify monitoring and tracking of one or more individuals of a group remains a major challenge.

An embodiment of a solution to one or more of the above problems is a device having the capacity to exchange a variety of digital messages, including bit messages, text messages, audio messages, and even to stream video via a software-defined private network (SDPN) embedded in a cloud host, can be used to construct virtual, software-defined private networks in which location information is collected using cellular A-GPS. Such a device is designed to reduce energy consumption so as to be portable for extended periods of time, up to weeks or months, without the need to recharge or to replace a battery.

In an embodiment, a cloud host-based private virtual network and system is configured to link one or more smart devices at parent nodes of a parent network with one or more "child minder devices" (more generally "child devices") of a child network. A software application is provided that, when installed on and executed on at least one "parent smart device" at a parent node, allows the parent smart device to communicate wirelessly and bidirectionally with one or more child minder devices. Subscription and non-subscription systems are envisioned and described.

In an embodiment, the child minder devices are addressable and are tethered to the parent smart device by a radio link established and controlled through a cloud host. The tether includes facility for location tracking and waypoint archiving so that a current location and a last location or trail of past waypoints is accessible in, or derivable from, data stored by the cloud host. The tether also defines a private communications network.

In an embodiment, the child minder devices include capability for initiating and responding to cellular voice-messaging communications and for receiving text messages and include response buttons for making a YES or NO response to a text query from a parent device. The child minder devices are registered with a parent smart device, for example, during setup of a private virtual network.

In an embodiment, the cloud host is configured to connect the child network (having one or more child nodes) and the parent network (having one or more parent nodes). Once the one or more child minder devices are registered with a smart device at the parent node (the "parent smart device" or "parent device"), each child minder device is distributed to a respective one of one or more members of a group (e.g., a family (including a pet), a tour group) so that when monitored with a software application and user interface on the smart device, the child minder devices can be tracked for current location, for past locations (stored in respective memories of the child minder devices or on the cloud host), and can be addressed by sending voice or text communications from the parent device.

Each child minder device is assigned to an individual such as a child or a pet and has a radio identifier associated therewith and typically stored thereon. On a screen page of the parent smart device are one or more icons, each of which corresponds to a respective child minder device and, therefore, to a respective individual. The one or more child minder devices can then be monitored remotely by a responsible member of a group (such as by a parent in a family with children at a busy airport or by a teacher with students on a field trip) to enable the responsible member to communicate with and to monitor the location of each other member of the group.

In an embodiment, the parent device (typically a smart phone or other smart device) is programmed by installing a software application that guides the rest of the network setup. The parent device is used, for example, by a parent, teacher, nurse, or group leader, and each child minder device is given to a respective child, student, tour member, pet, or other member of the group to link the child minder devices, and, therefore, to link the members of the group, to the parent device, and, therefore, to the responsible group member, via an "electronic tether" of a private network.

In an embodiment, each parent or other group leader can send text messages to one or more members of the group simultaneously (sometimes called "multicasting") or to members within the group one at a time, and receive either a "YES" or a "NO" as a short digital answer to a posed question. Or if needed, the group leader can have a chat session with one or more of the other group members, or one of the group members can have a chat session with one or more other group members, by an exchange of audio recordings. Each child device also has a locating functionality so that the parent device can create a map of an area such as an airport, a fairgrounds, an auditorium, a museum, a park or even a city borough, and display the locations of all the child devices within the map. The cloud server can be configured to provide location tracking, and can provide an archive of time-sequenced past locations ("breadcrumbs") so that the last-known location of the child device and the direction in which the child device is moving can be determined relatively quickly. The digital message format may contain message content not typically associated with an audio message, such as direction and speed, and may include other sensor data such as any one or more of temperature, light intensity, pressure, altitude, and humidity as would be acquired from a package of sensors in the child device.

An advantage of receive-only text messaging is that a keypad is not needed on the child device because queries can be answered yes or no with a simple button or other mechanism (e.g., voice), eliminating the need for the more complex implementation of ASCII messaging input and also reducing the need for display and editing of draft messages before sending replies.

The archived locations can be used to help a holder of the device to retrace his/her steps, and to help persons converge on a place where their car is parked, or where the group members agreed to meet after splitting up for shopping or visiting different attractions before returning to a common starting point. Generally, these features are not available on a cellphone and are adopted because of the need to assign individuals to a common group and to share location information with a level of privacy best achieved by providing a proprietary private virtual network. For example, a device having these features can be a dedicated device that can be periodically synchronized to update encryption and security features.

A private virtual network is operated by routing the communications through a cloud host, which also monitors sensor data interleaved into the messages and which can perform a range of actions from notifications to alarms according to context and virtual intelligence built into the system.

The device, termed here a "child minder device" or more loosely a "child device" (not limited to children, for example, "child device" can denote the relationship between a device configured for use by a child or any group member, and a device (e.g., "parent device") configured for use by a parent or any group leader) can be a pocket- or wrist-sized device that can help parents or groups to stay connected to friends, associates, dependents or other group members when travelling together. In an embodiment, no paid subscription is required for a certain level of basic service, but enhanced features are available on a monthly plan or after an introductory period.

In an embodiment, the features of a system can include the following:

Two-way communication by audio messaging using a "store-and-share" protocol with voice coder (also called "vocoder") and memory. Text is receive only, and is directed from parent device to child device. By selecting a group message, a text can be shared with all of the child devices on the address list (if the group-message text is sent to more than one, or all, of the child devices simultaneously, such action can be called "multicasting"). A display of a child device is provided to allow a holder of the child device to view the message before responding. Using one or more child-device buttons, the recipient of a text message can respond with a "YES" or a "NO." The one or more buttons also function to activate voice recording, to control speaker volume, to control display "skin" (overall appearance of the graphical user interface display), or optionally as a panic switch. Holding a NO button also may serve as a power ON/OFF function. In an embodiment, a combination of three button switches is a multi-purpose interface for interacting with the network.

The child devices may include an A-GPS location tracker with motion sensing. The hardware can be GPS-cellular assisted hardware integrated in chipsets or proprietary hardware and may include automated power saver features such as Bluetooth proximity tracking. The location and direction of movement can be sent to the parent or group leader in response to a query or can be sent periodically with tracking so that a map of movements over time, projected direction, and a last known position are displayed.

The hardware of a child device may include:
Processor (e.g., a microcontroller or a microprocessor), volatile and non-volatile memory for storing program instructions, which, when executed by the processor, enable enhanced communications functions often not available on conventional telephones, pagers, and smart devices.

Multifunction button or switch;

Speaker and a microphone;

One or more antennae;

Battery (the device may be sold, or otherwise provided, without a battery);

Radiolucent housing;

GPS chip;

Display,

Optional sensor or an optional package of sensors, and,

Enhancements that may include a messaging format for sharing of mixed sensor data on a message band, anonymous key-type encryption of voice and video with proprietary compression to reduce bandwidth, message receipt verification tied to message alerting and queuing, and simplified step-by-step trip directions tied to a visual compass displayed on the display that is directly accessible by children and the disabled. This is more direct than web-browser-enabled scrolling of trip directions and maps through Mapquest or Google Maps, for example, and is adapted here for use by children and the disabled, if needed.

The elements, features, steps, and advantages of one or more embodiments will be more readily understood upon consideration of the following detailed description, taken in conjunction with the accompanying drawings, in which embodiments, including details, conceptual elements, and current practices, are illustrated by way of example.

It is to be expressly understood, however, that the drawings are for illustration and description only and are not intended as a definition of the limits of the disclosure. The various elements, features, steps, and combinations thereof that characterize various aspects of embodiments are pointed out with particularity in the claims annexed to, and forming part of, this disclosure. The claimed invention does not necessarily reside in any one of these aspects or embodiments taken alone, but rather in each claim taken as a whole in view of the disclosure taken as a whole.

Elements of embodiments may be used in various other embodiments. For example, it is contemplated that features of dependent claims depending from one independent claim can be used in apparatus and/or methods within the scope of any of the other independent claims.

BRIEF DESCRIPTION OF THE DRAWINGS

One or more embodiments are taught and are more readily understood by considering the drawings in association with the specification, in which:

FIGS. 2C and 2D are end and side views of the child device of FIGS. 2A and 2B, according to an embodiment.

FIG. 2E is a side view of a circuit board and associated electronic components, including a battery, LED array, USB port, microphone, speaker, surface switch(es), controller, memory and a sensor package of FIGS. 2A-2D, according to an embodiment.

FIG. 4A is a perspective view of a child minder device, according to an embodiment, in which is visible a clamshell housing having front and back cover pieces.

FIGS. 6A and 6B are plan views showing the circuit-board layout of a first embodiment of the child minder device of FIGS. 2A-2E and 4A-4B, according to an embodiment in which the left panel is a top view of the PCB and the right panel is a bottom view of the PCB.

Figure 8A:
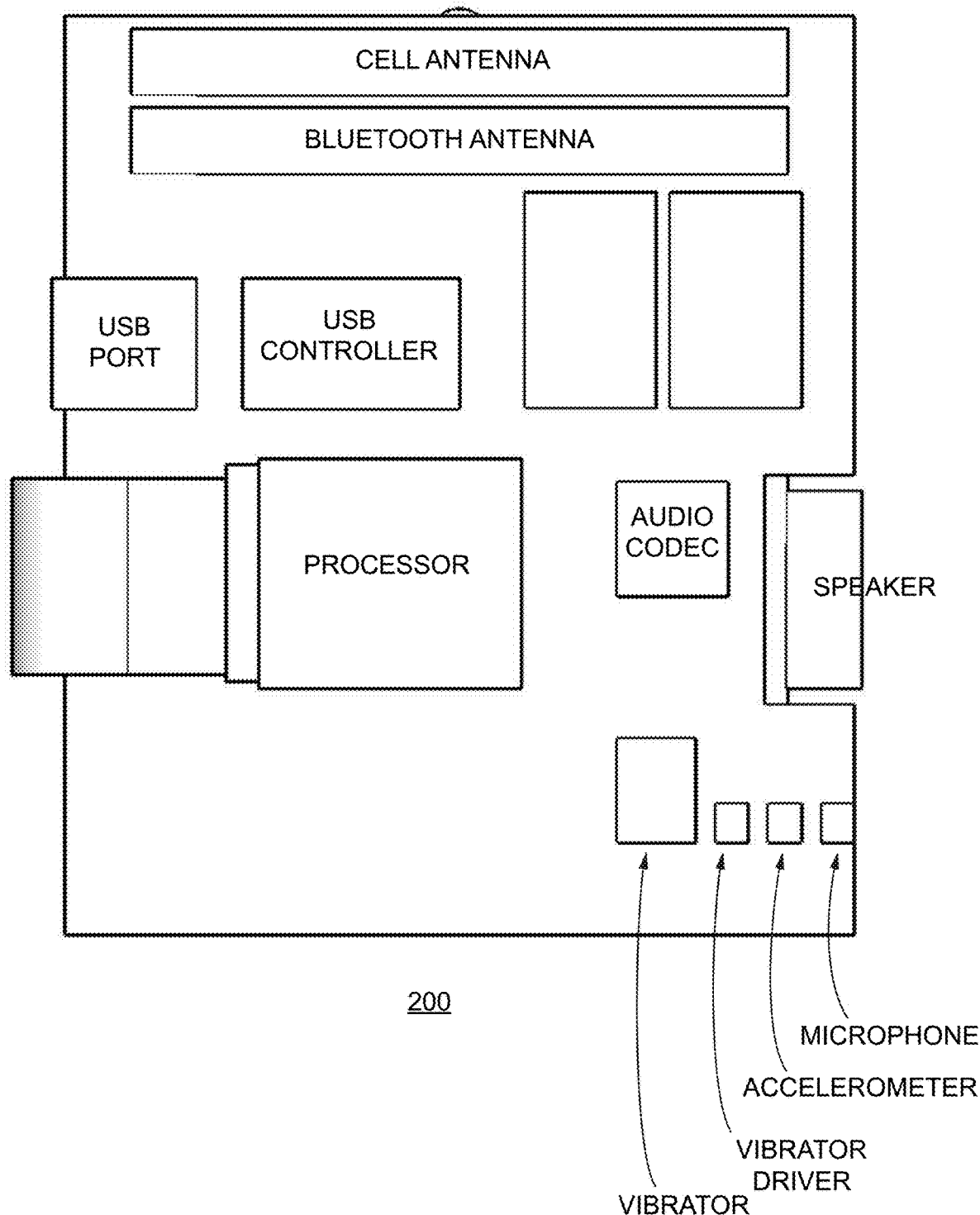
FIGS. 8A and 8B are plan-view block diagrams of the electronic components of a child device, according to an alternate embodiment.
Figure 8B:
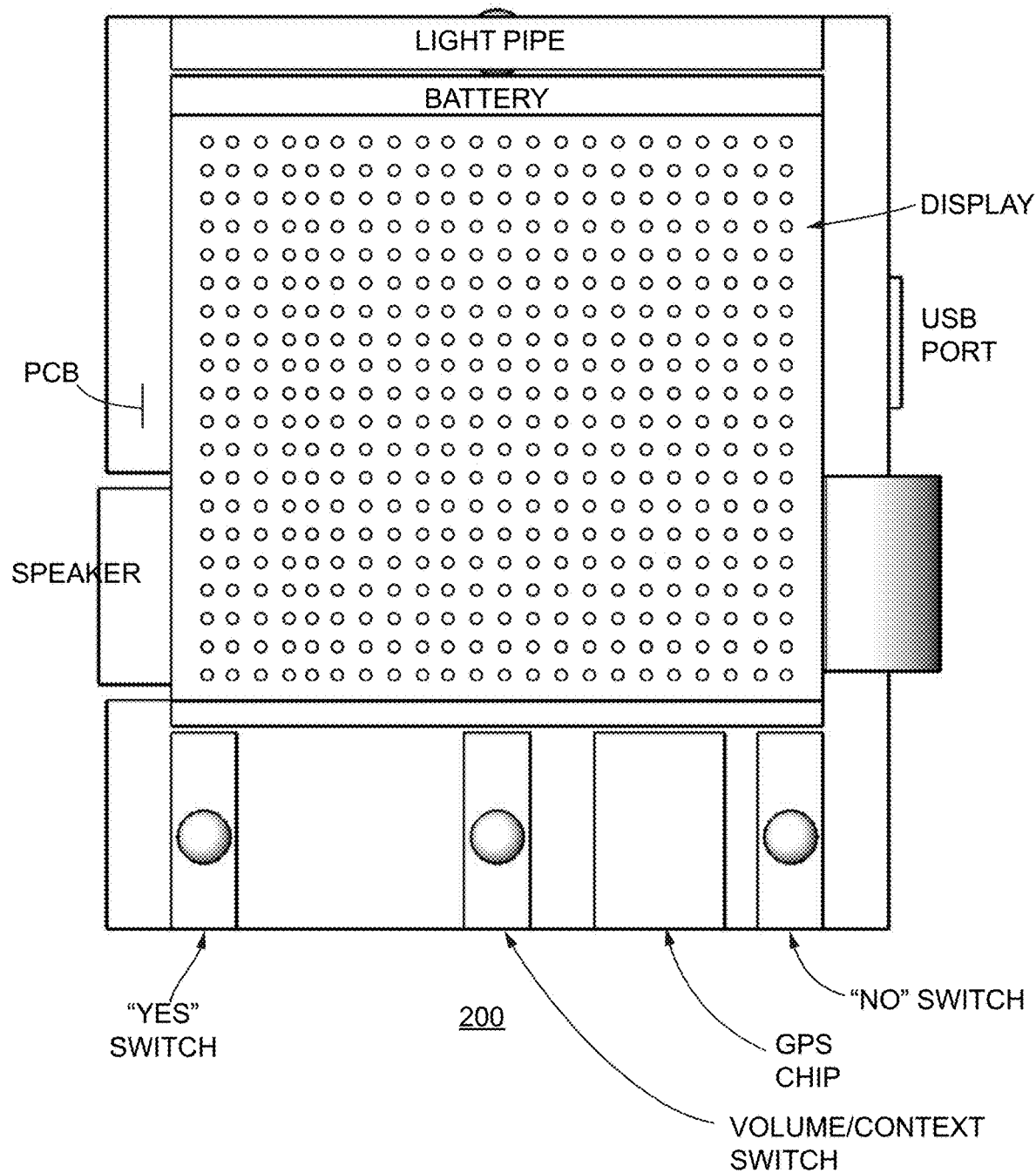
Figure 10A:
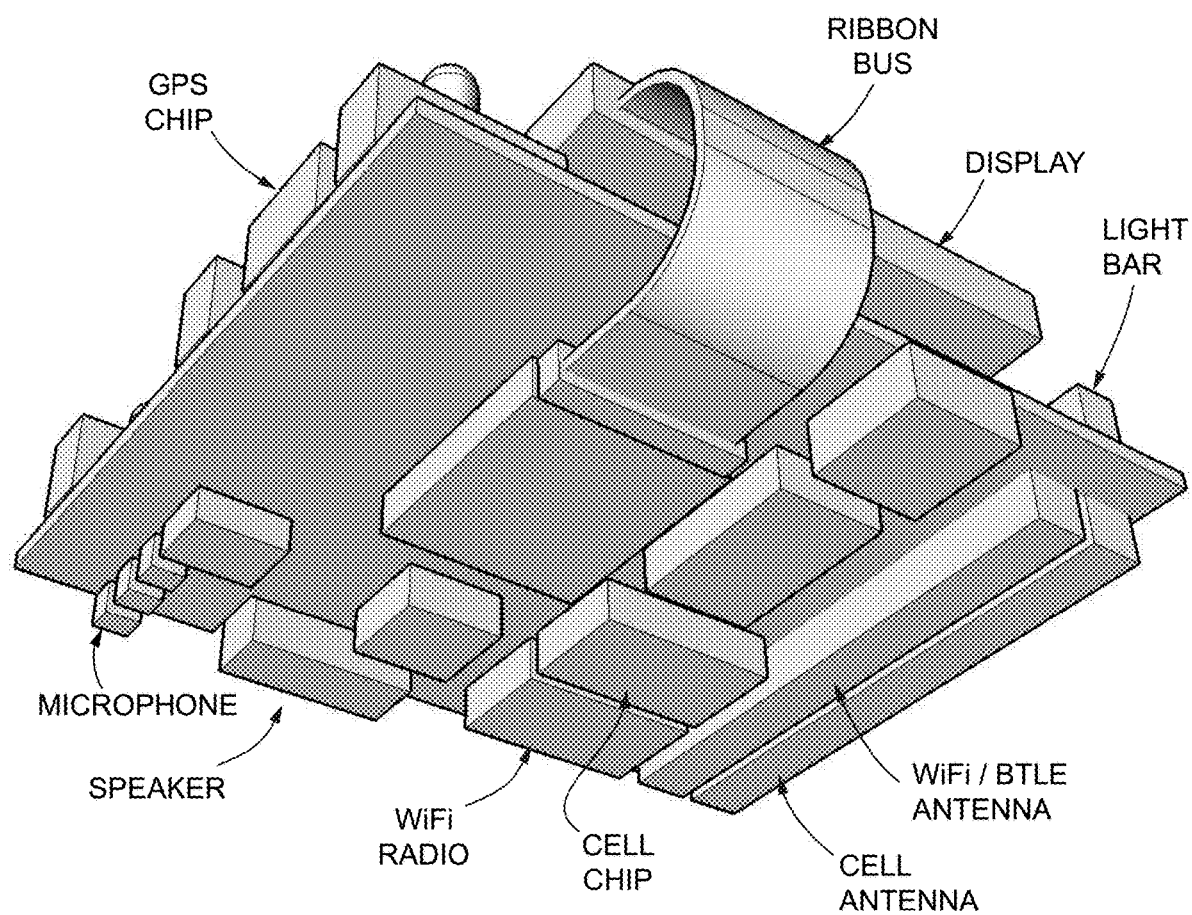
Figure 10B:
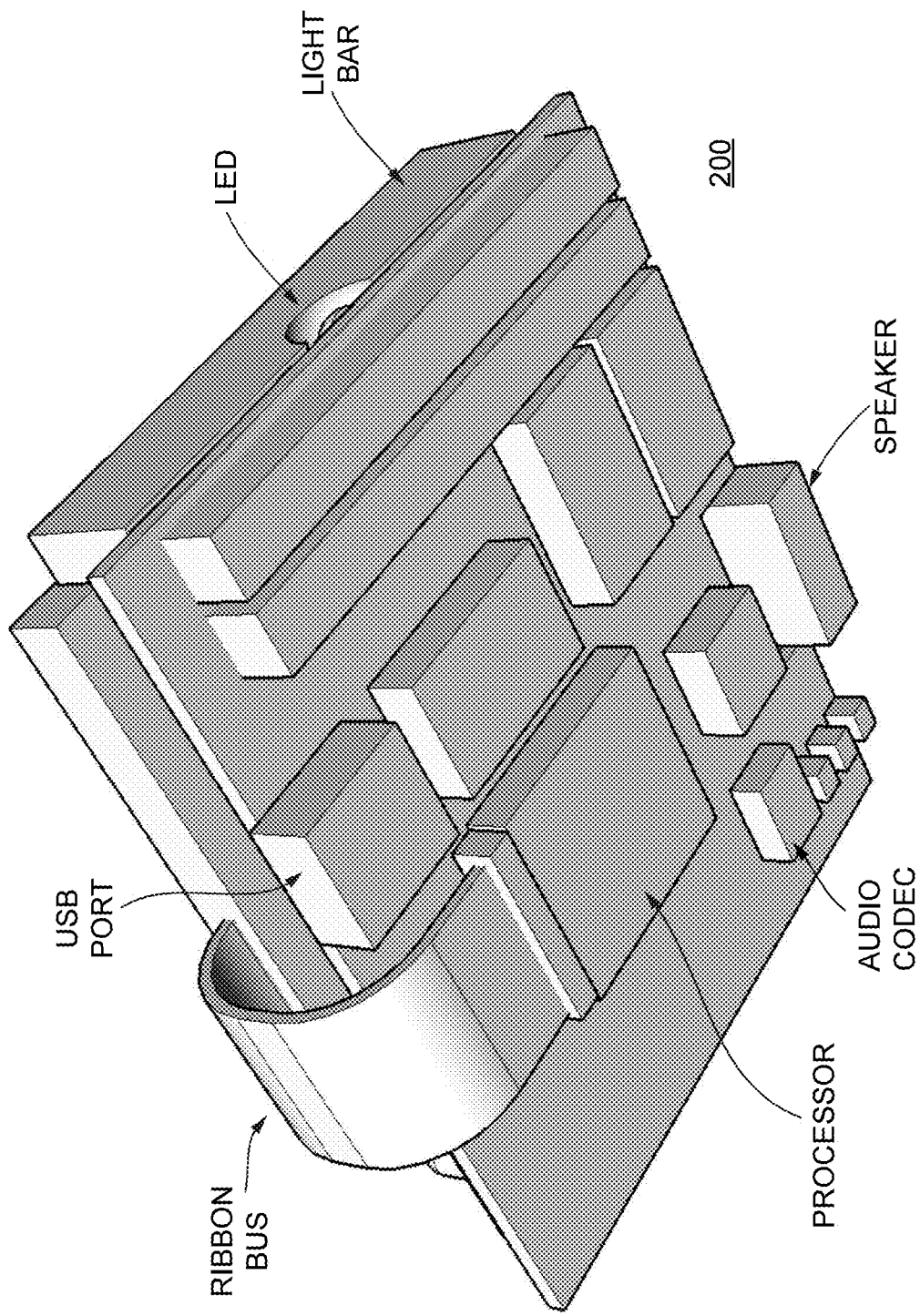
Figure 11B:
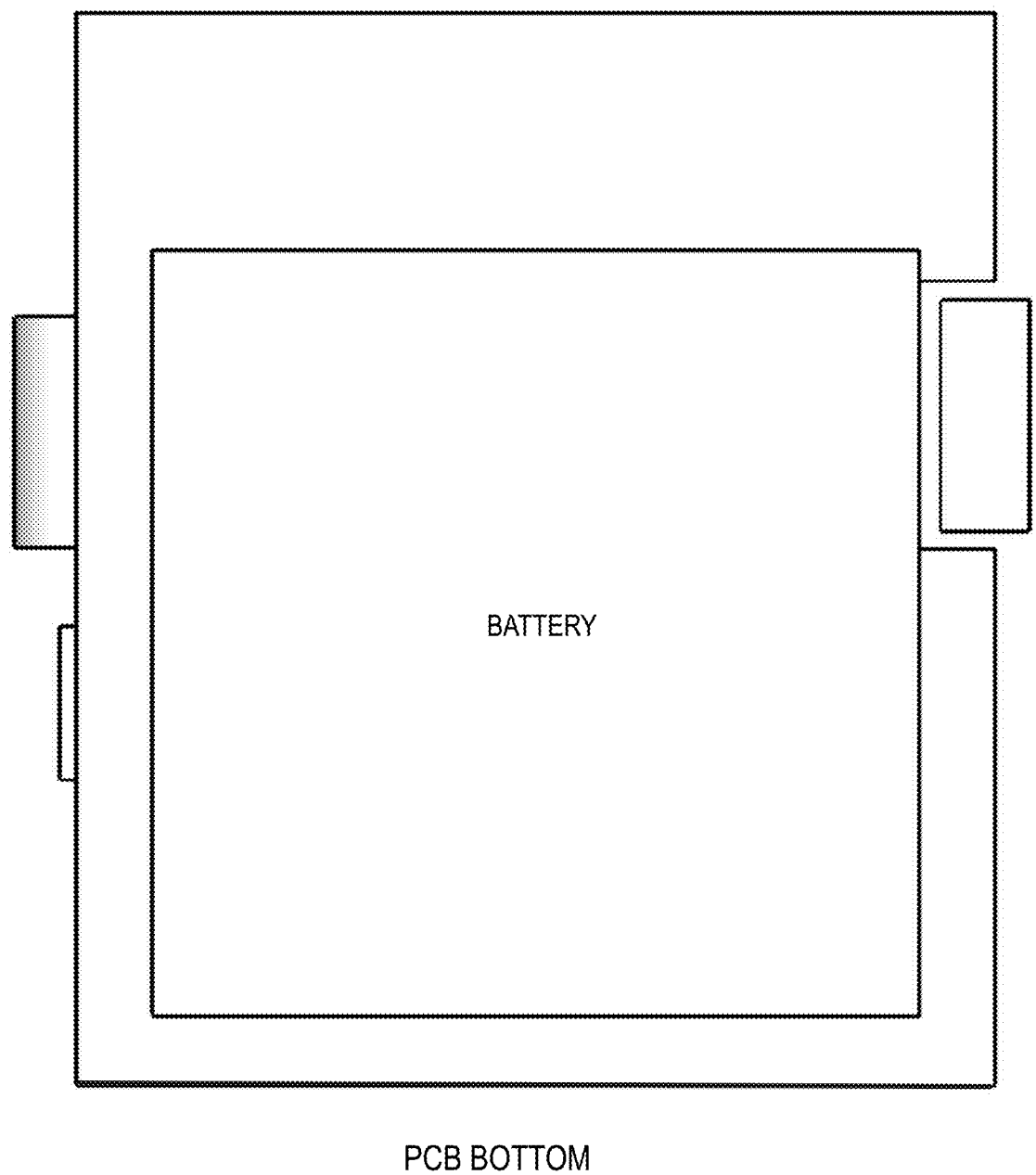
Figure 11C:
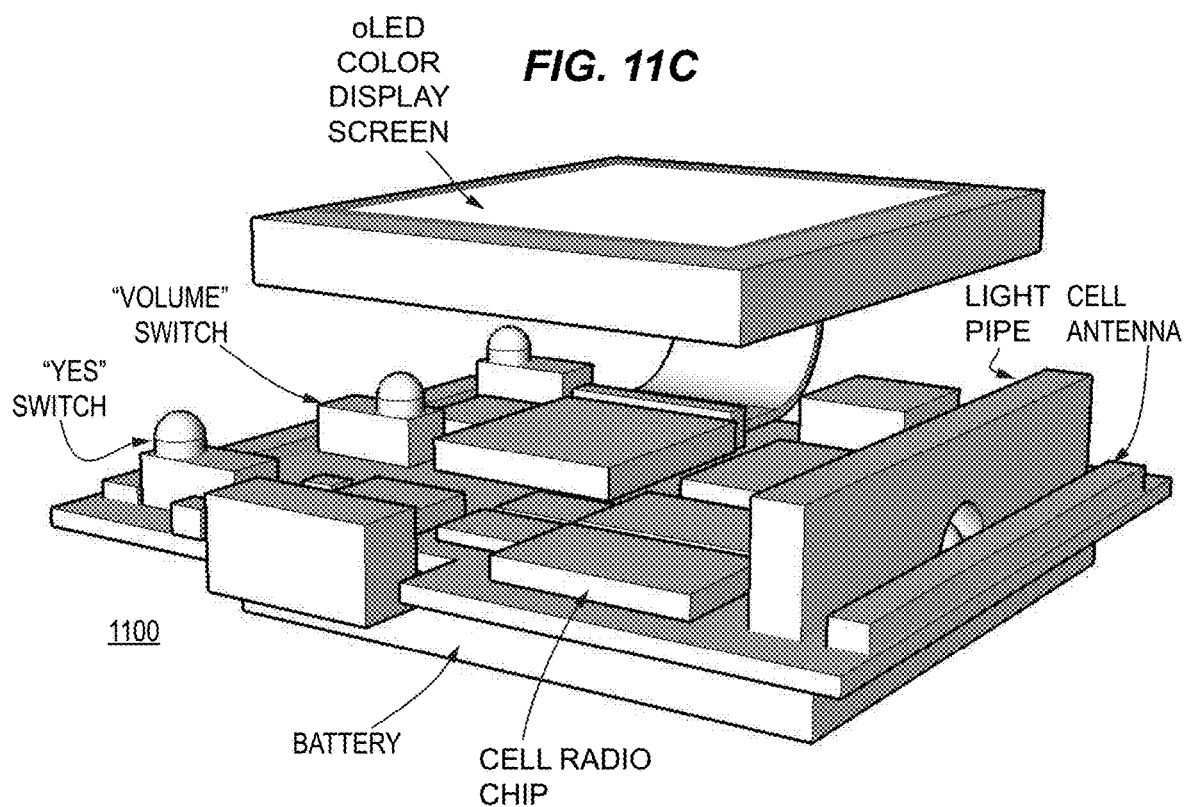
Figure 11D:
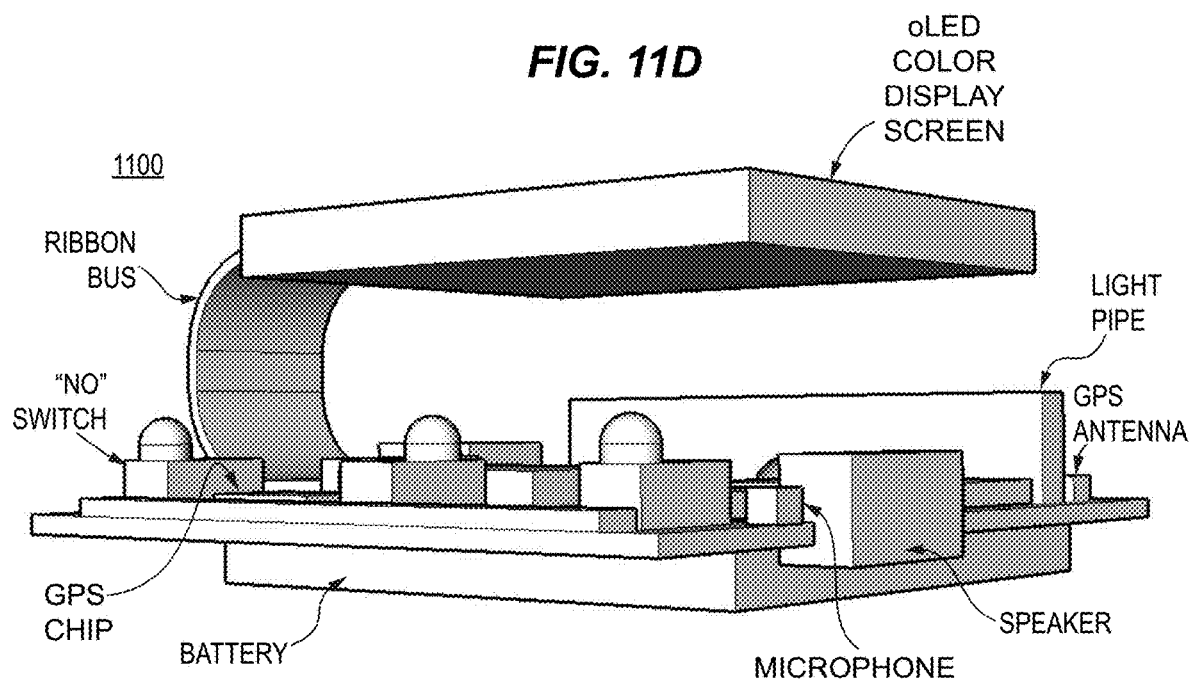

Referencing FIGS. 10A, 10B and 10C, the child device of FIGS. 8A-8B is illustrated in respective perspective views, according to an embodiment.

FIGS. 11A, 11B, 11C, 11D and 11E illustrate an embodiment of a child device, according to yet another embodiment.

Figure 12A:
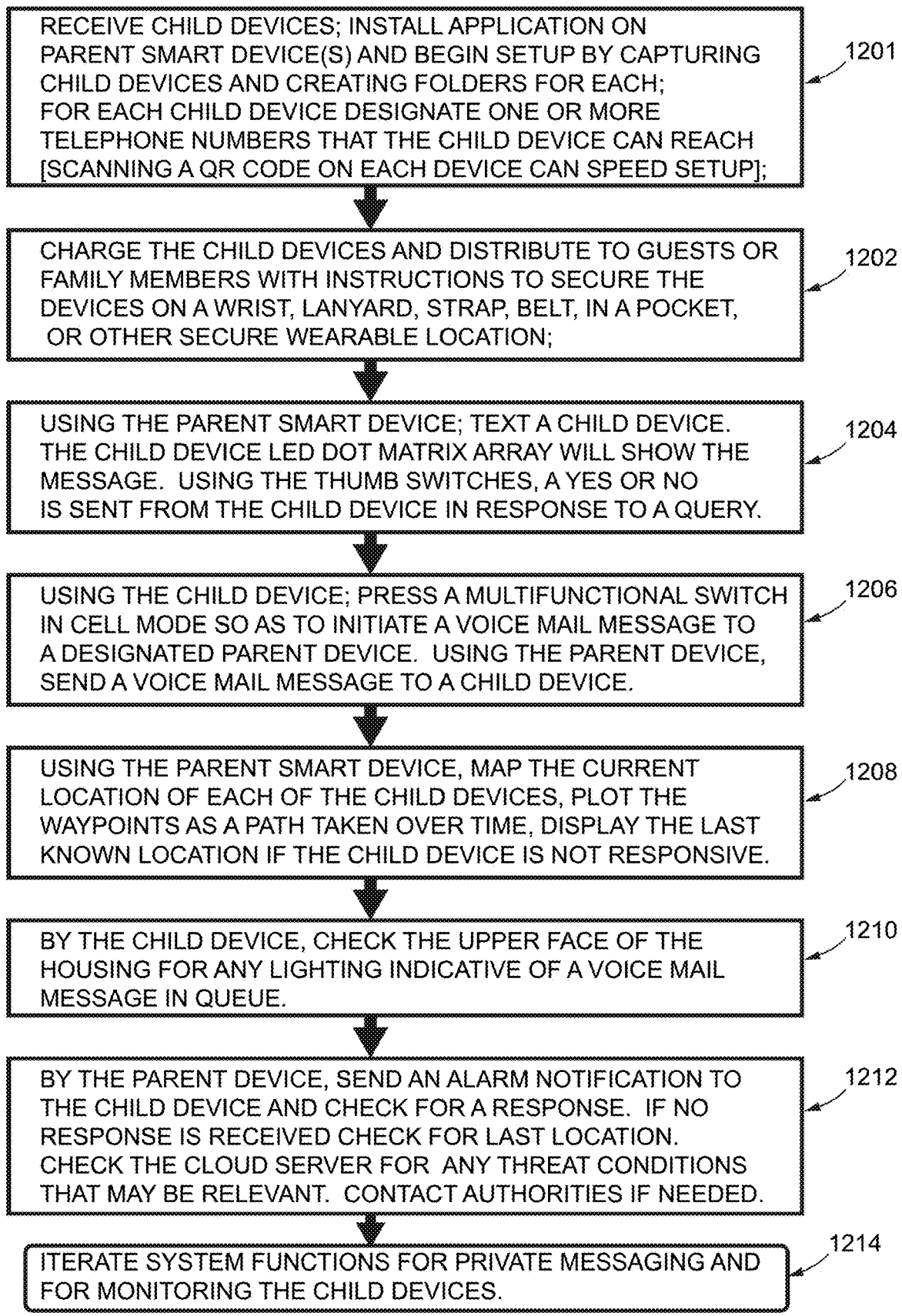

FIG. 12A is a first flow chart of a method for operating a parent-device-child-device system, according to an embodiment.

Figure 12B:
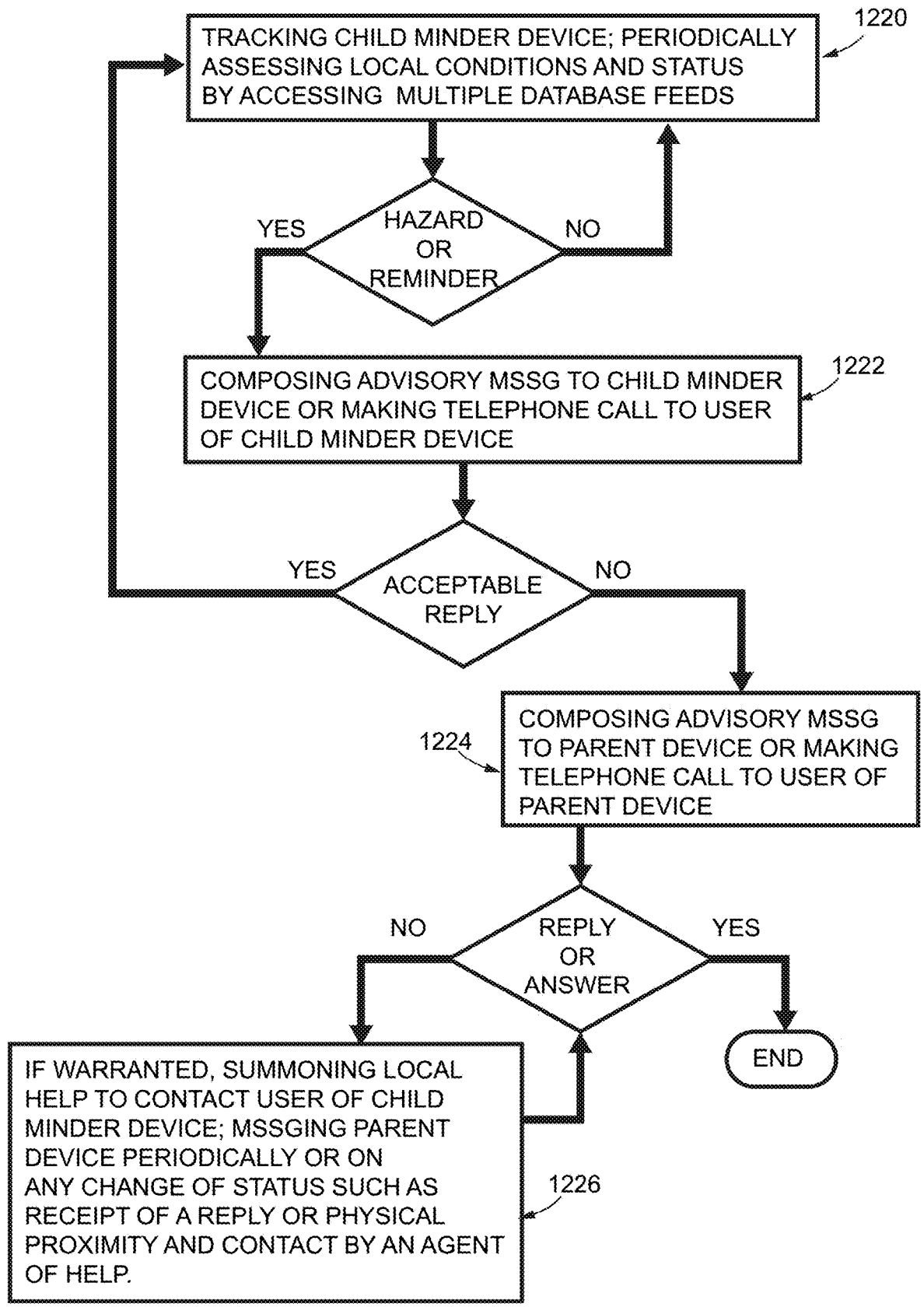

FIG. 12B is a second flow chart of a method for operating an automated tracking and monitoring system with parent device notification, wherein the method is an option for the method described in conjunction with FIG. 12A, according to an embodiment.

Figure 12C:
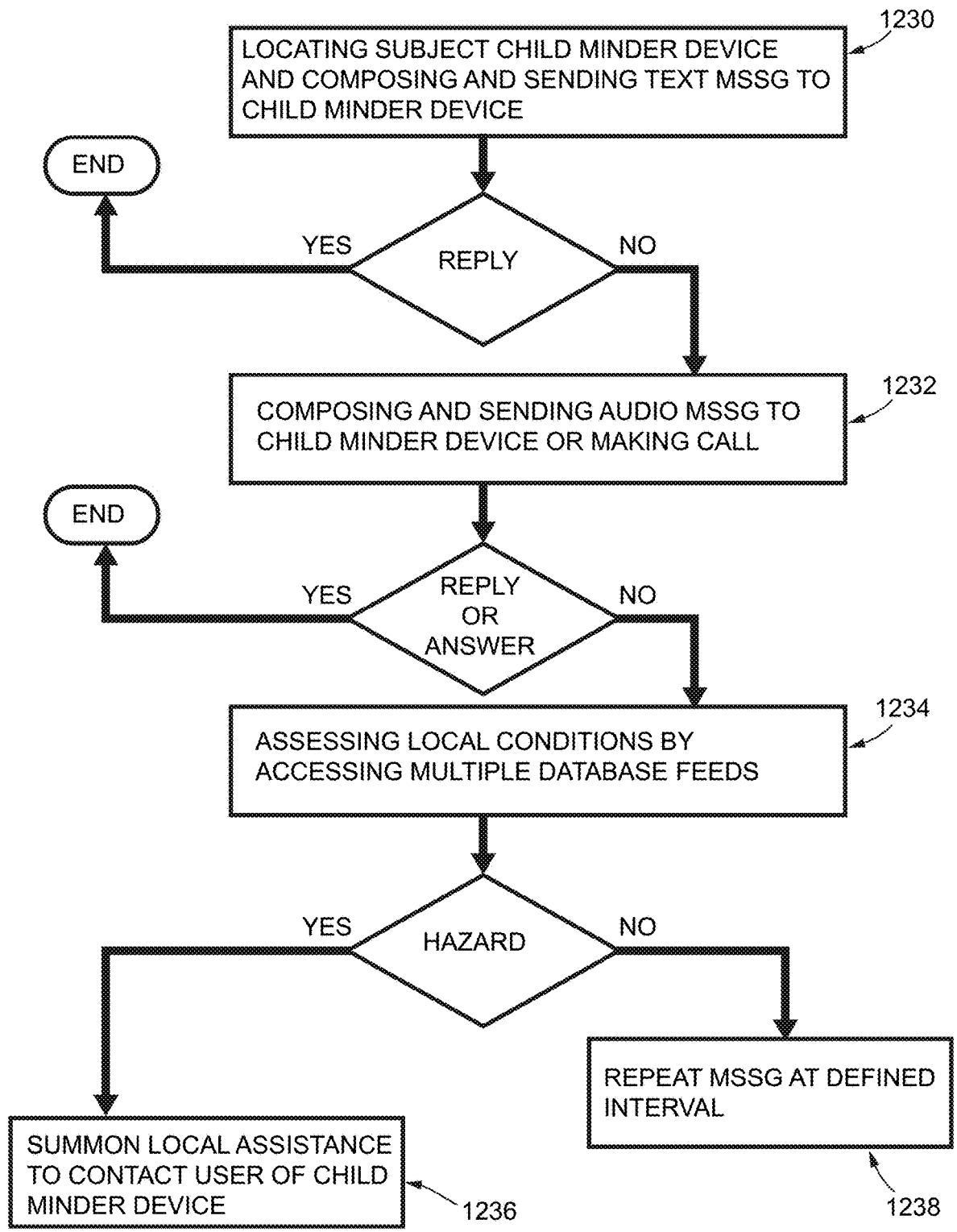

FIG. 12C is an alternate embodiment of the second flow chart of FIG. 12B, according to an embodiment.

Figure 13:
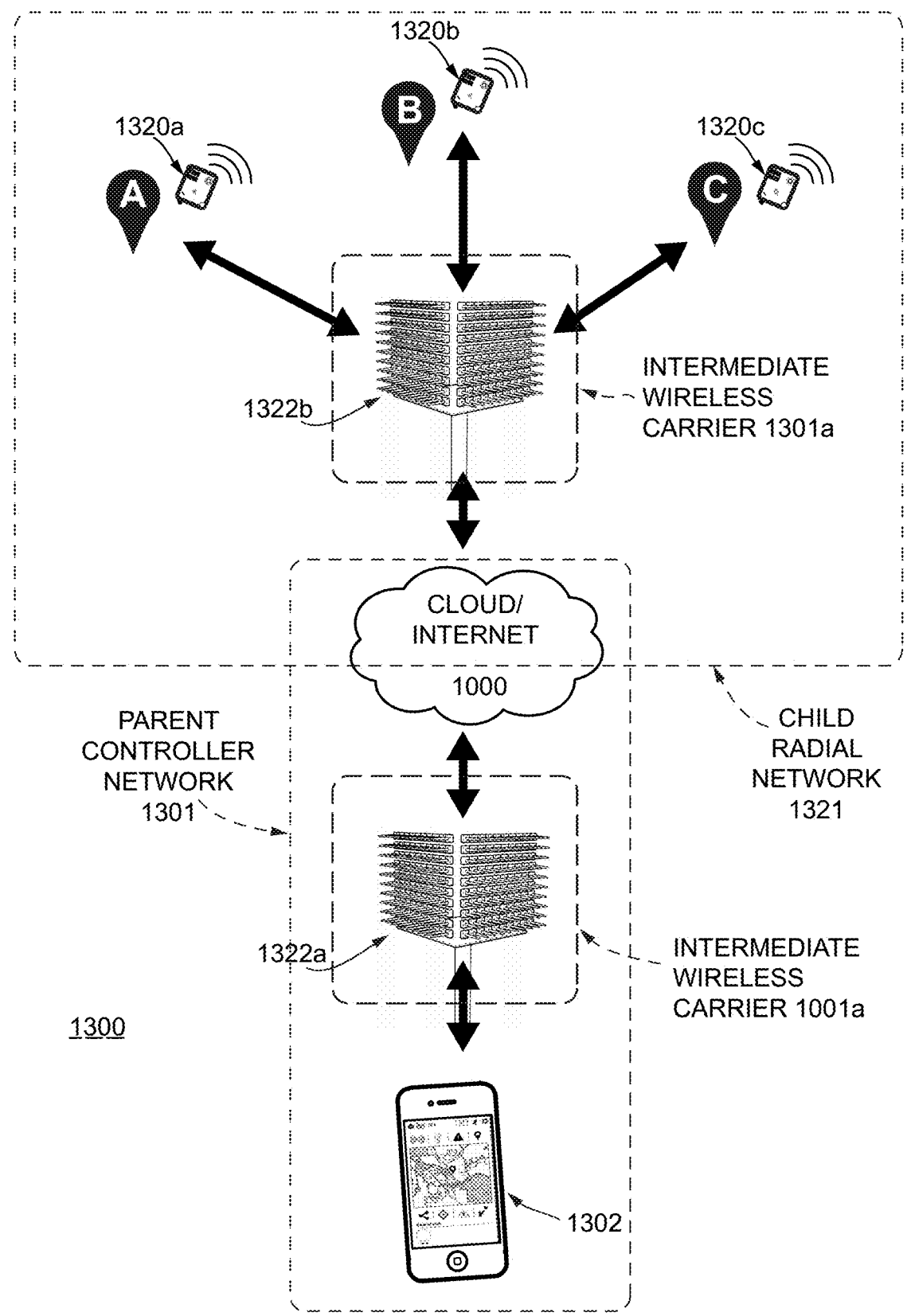

FIG. 13 is a view of a parent-device-child-device system in operation, according to an embodiment in which the system includes a parent smartphone device of a parent network and three tethered child electronic devices at locations A, B, C of a child network.

Figure 14:
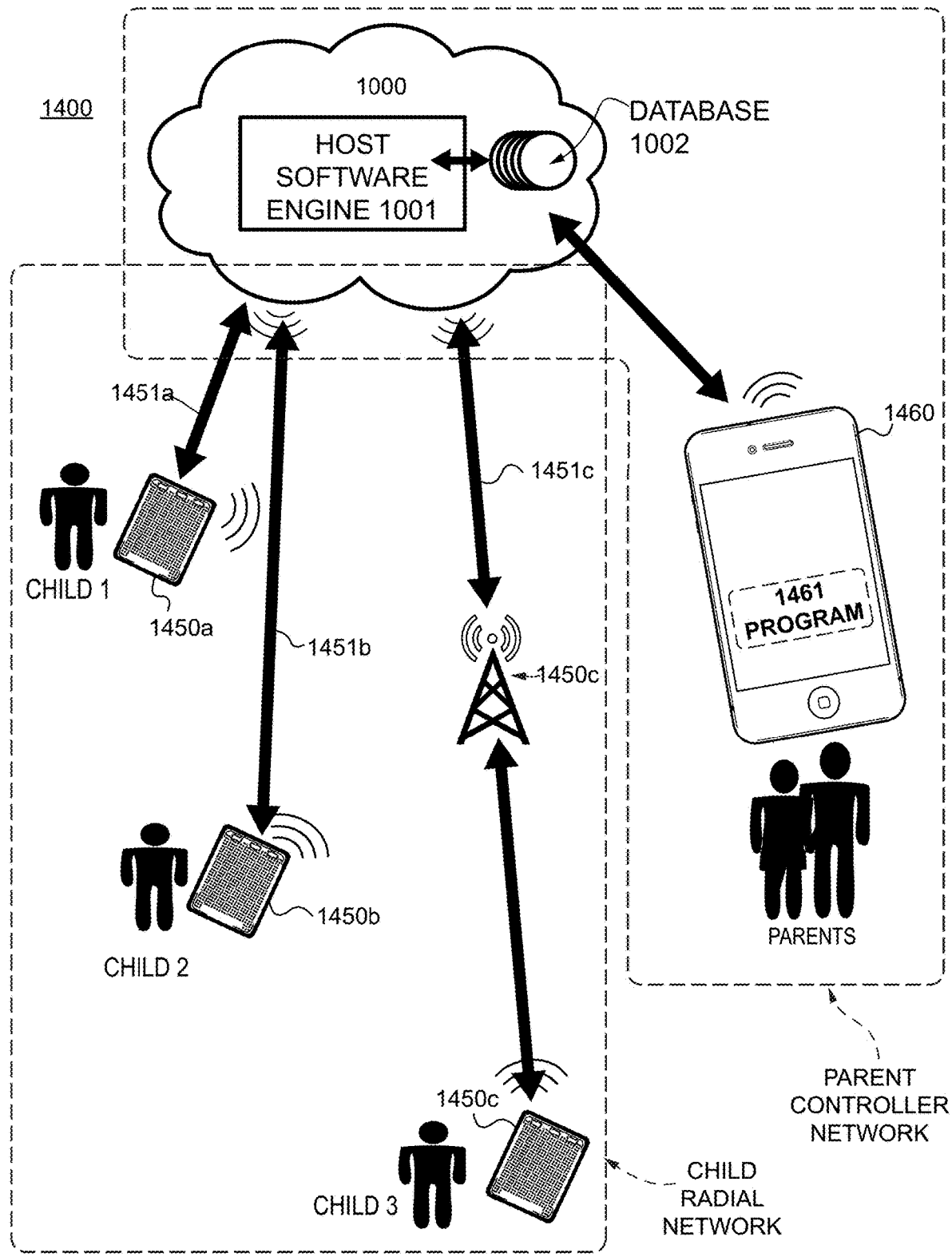

FIG. 14 is view of a general system in which the communications link between a parent device and child devices is an Internet-enabled private wireless network with cloud host server, according to an embodiment.

FIG. 15 is a view of a system in which a cloud host server is configured to forward location information from a child minder device to a parent smart device, according to an embodiment.

Figure 16A:
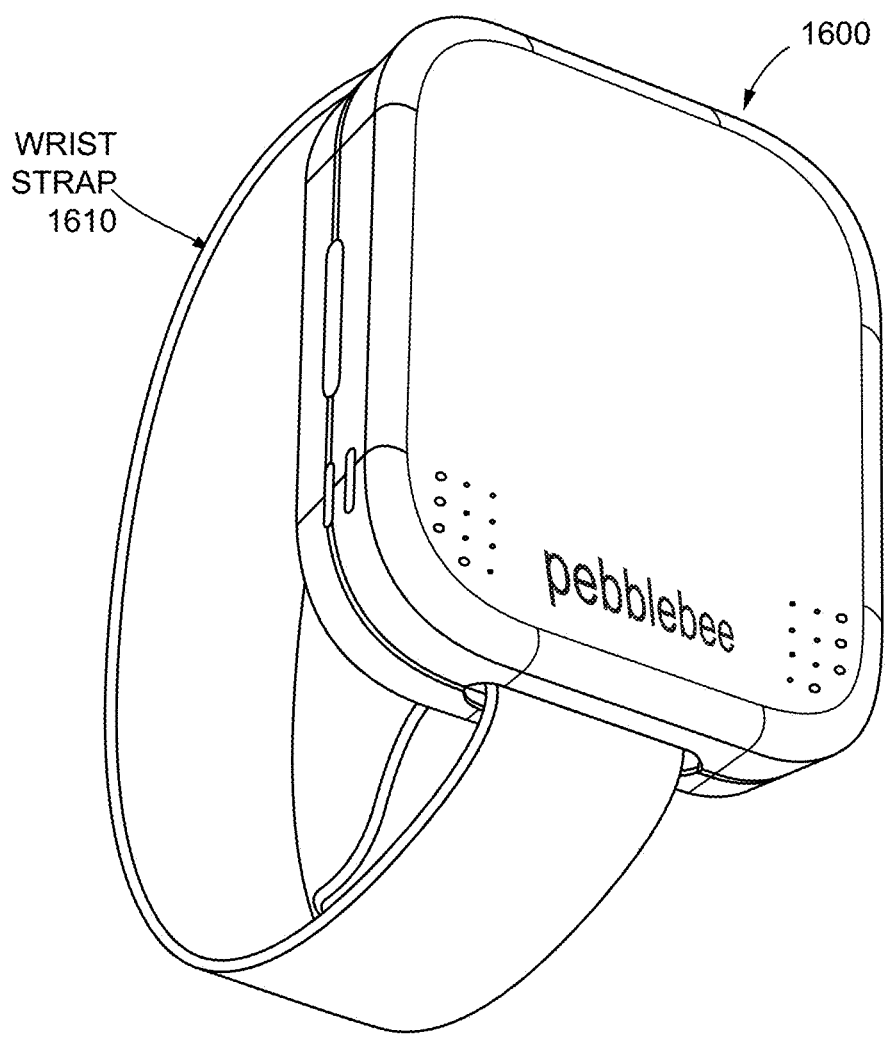
Figure 16B:
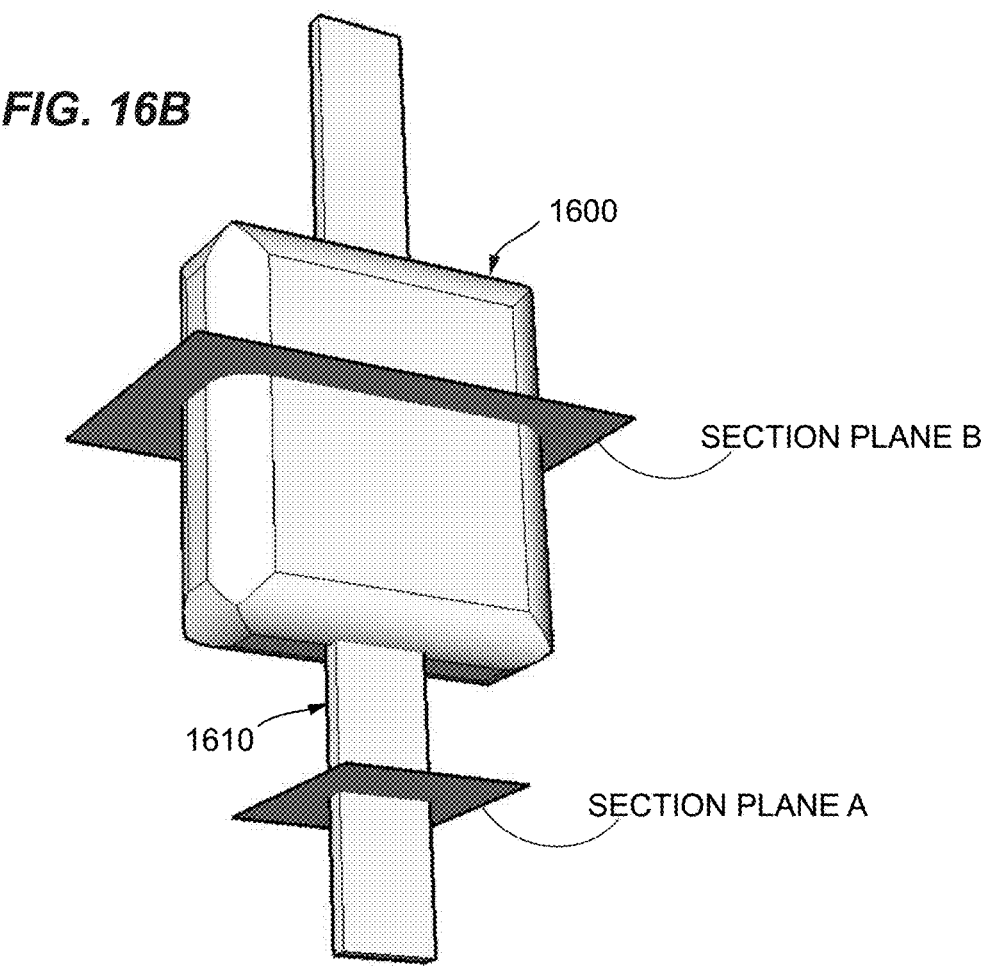
Figure 16C:

FIGS. 16A, 16B, 16C, and 16D are views of a device including a strap (such as a wristband or collar) configured to secure a child device to, or otherwise to allow a child device to be carried on, a person, an animal, or a moveable or other object, according to an embodiment. Furthermore, FIGS. 16B and 16C show alternate antenna constructs, according to an embodiment.

Figure 17A:
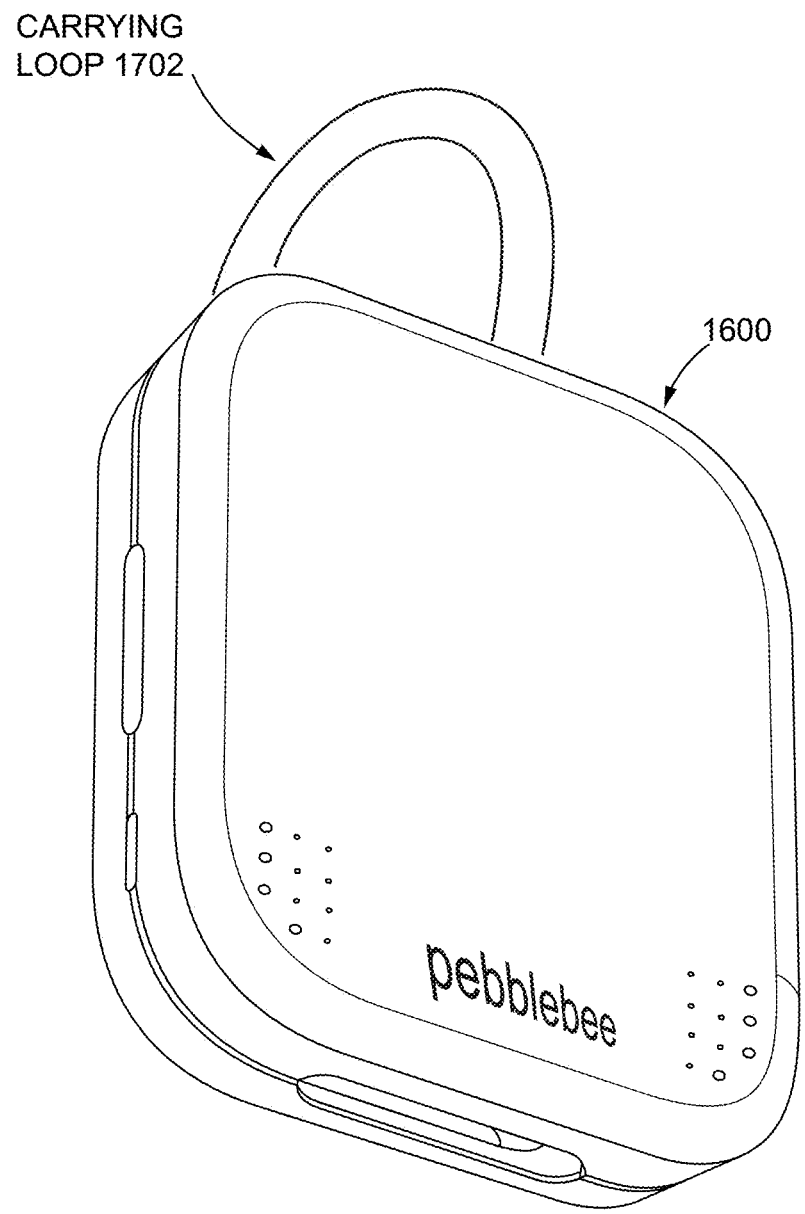
Figure 17B:
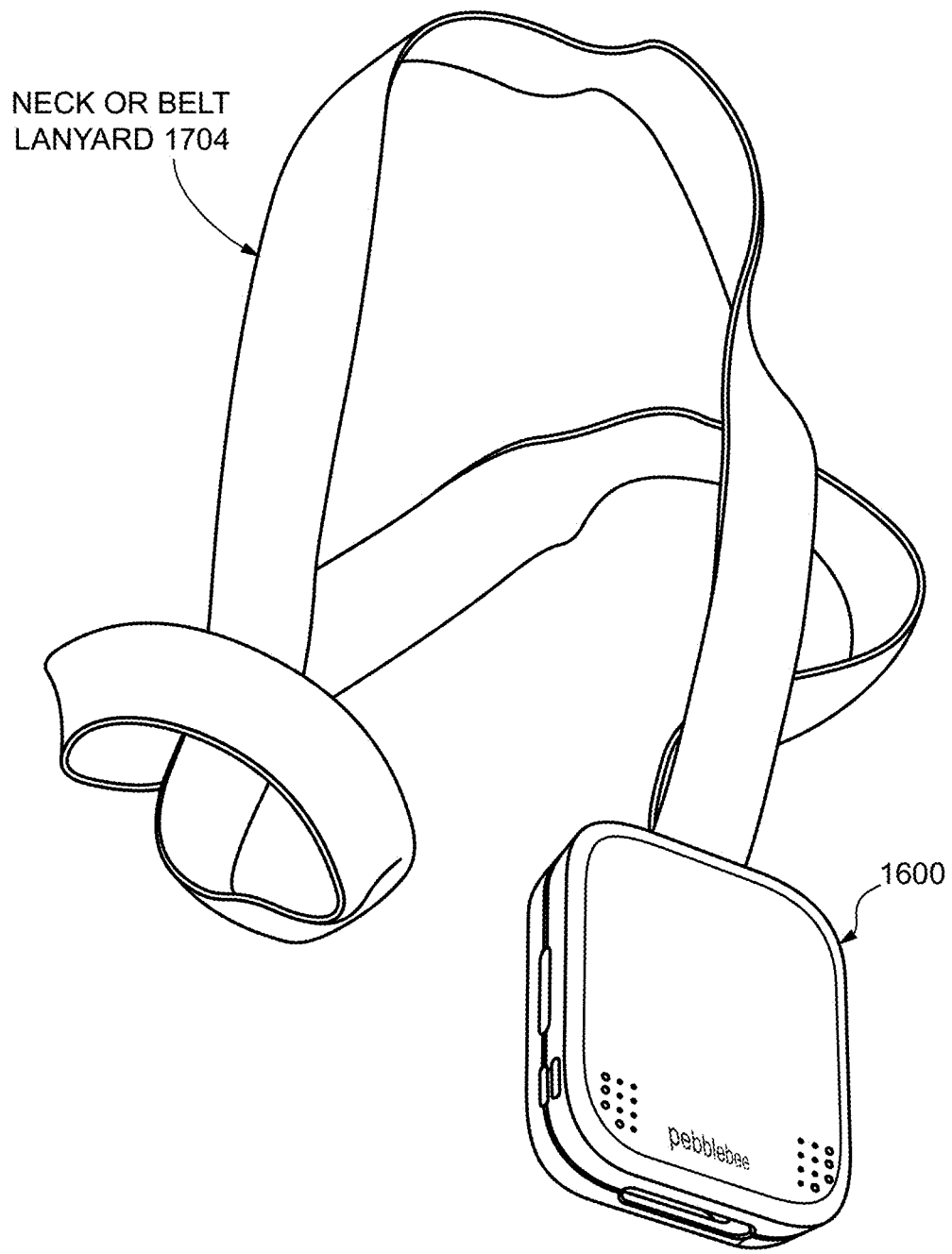

FIGS. 17A and 17B are views of a device having means other than a wristband or collar configured for attaching a child device to a person's (e.g., a child's) or an animal's body or clothing so as to allow a person or animal to wear the device, according to an embodiment.

Figure 18:
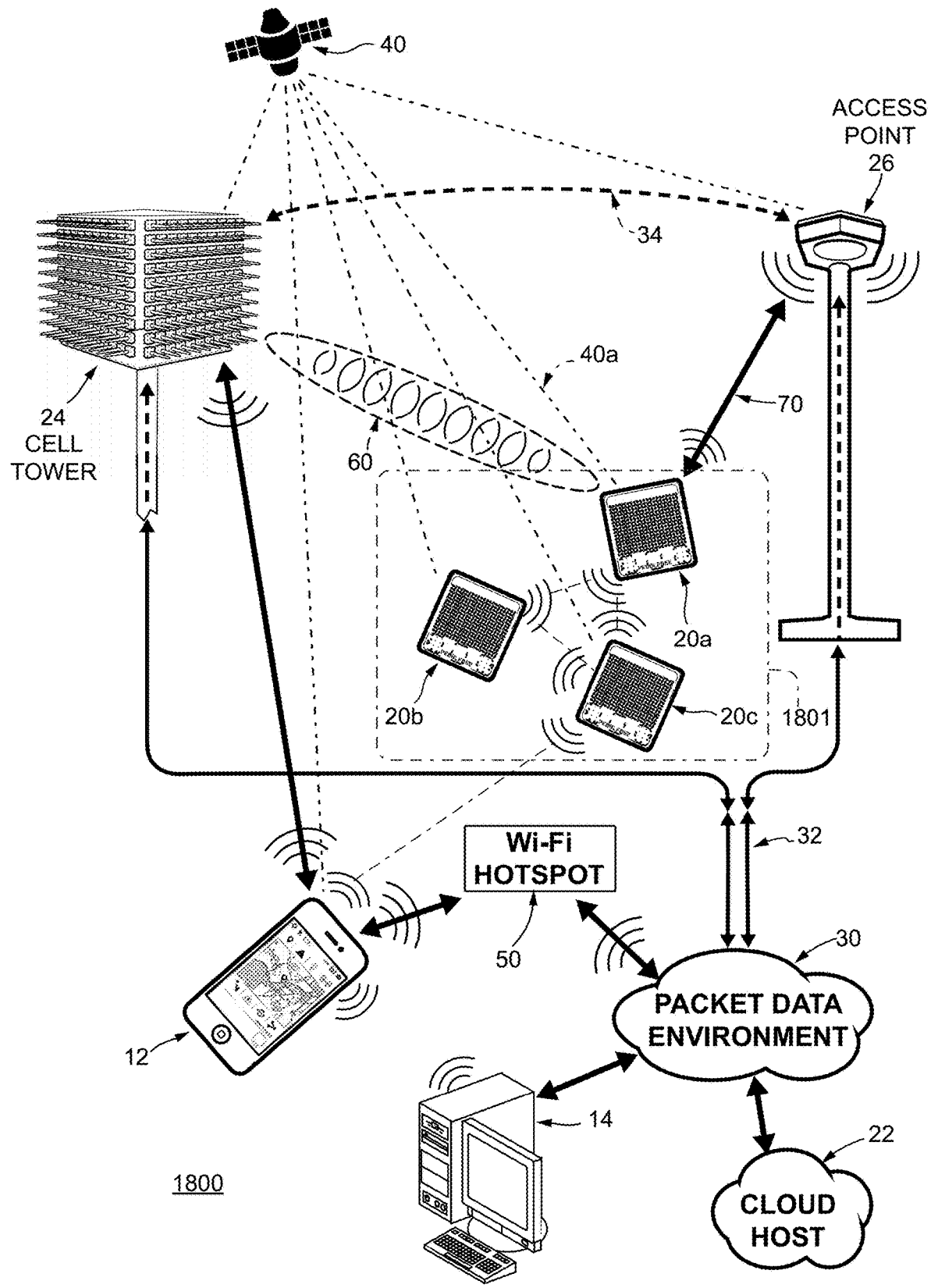

FIG. 18 is a diagram of a system including a Bluetooth network nested within a larger cellular network, according to an embodiment.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description, and teachings disclosed herein.

Glossary

Certain terms are used throughout the following description to refer to particular features, steps, or components, and are used as terms of description and not of limitation. As one skilled in the art will appreciate, different persons may refer to the same feature, step, or component by different names. Components, steps, or features that differ in name but not in structure, function, or action are considered equivalent, and may be substituted herein without departure from the spirit and scope of this disclosure. The following definitions supplement those set forth elsewhere in this disclosure and supplement the meaning of terms as used elsewhere in this disclosure. Certain meanings are defined here as intended by the inventors. Other words and phrases used herein take their meaning as consistent with usage as would be apparent to one skilled in the relevant arts. In case of conflict, the present specification, including definitions, will control.

Unless otherwise defined expressly or by usage herein, all technical and scientific terms used herein have the same meaning as commonly understood by one of ordinary skill in the art to which the subject matter described herein belongs.

In case of conflict, the present specification, including definitions, will control.

A "child minder device" or "child device" is a wireless device capable of limited communications functions that can include store-and-share audio messaging in receiving and sending mode, text receiving mode, switches for generating short data transmissions such as "YES" or "NO" in response to a text query, and A-GPS functionality configured to transmit location data to a parent network. Each child minder device can define a "node" in a "child network." As used here, a "parent smart device" or "parent device" is any of the class of newly emergent devices that derived from pagers and cellphones that now are miniature computers with radiosets capable of addressing local area networks and broad area networks. These smart devices are programmable, and by installing what are termed, "apps", can be configured for a wide variety of uses. Individual device permissions limit access, and specialized encoding may be applied to data to prevent unauthorized parties from capturing that data. These devices, examples of which include smart phones, tablet computers, laptop computers, and desktop computers, are well known in conjunction with a variety of communications technologies, including cellular radio, WiFi, direct WiFi, and Bluetooth protocols.

The smart device is typically provided with a software "application," which, when installed and running on the smart device, enables the device to enable or to perform network functions associated with an external server interface such as a cloud administrative server ("cloud host"). The smart device, as programmed by the software application, is configured to function as a "parent control device" for minding one or more child minder devices. Each parent smart device is, or otherwise defines, a node in a "parent network."

A "software-defined virtual network" (SDPN) is formed by registering child minder devices with a parent smart device or devices during a setup procedure for a child minder device or a parent smart device. Using a dedicated cloud host, two-way network wireless communication services are provided between child device and parent device, but the SDPN is closed, private, and invisible to outside agents.

"Artificial intelligence" relates to computing machines that exhibit apparently intelligent, goal-directed behavior, typically that mimics cognitive functions such as problem solving and learning by experience, also termed "machine learning." The technology is closely related to the study of adaptive and emergent behaviors of complex systems such that the emergent properties of a system may be evident in autonomous decision processes that are system functionalities and rival human intelligence for decision making that incorporates context as well as rules-based logic.

"Internet" is a global computer network of networks providing an almost endless compendium of information, opinion, speculation, and entertainment, and consisting of interconnected networks able to communicate using a standardized communication protocol termed the "Internet Protocol" for packet-switched data sharing by use of layered frames to format and address data. Structurally, the Internet includes a "backbone" of high-bandwidth data lines that join continents and countries and Internet hubs where branches are provided to service web servers and internet service providers (ISPs) that in turn provide distributed access to local customers by subscription or through open-access hot spots, all of which are termed here "web portals" or "access points."

"Cloud" is a communications network built on the Internet Protocol, typically a host datacenter of servers that supplies worldwide web connectivity and network services to a cluster of client devices. More recently a "multicloud," taken to represent a connected cluster of clouds, each with partial overlap has been conceptualized.

"Cloud computing" involves services and computing resources (collectively "cloud services") that are migrated to a cloud host outside a local server, device, or firewall. A plurality of users can share centrally provided systems. Instead of accessing applications and services from a local or otherwise privately owned hard drive, some or all computational tools and resources are accessed via the World Wide Web (WWW). The services are delivered and used over the Internet and are paid for by cloud customers, typically on a "pay-per-use" or "subscription" business model. The cloud infrastructure is maintained by the cloud provider, not the individual cloud customer. Cloud computing enables companies to consume a compute resource, such as a virtual machine (VM), data storage, or an application like Adobe PDF reader, as a utility—just like electricity—rather than having to build and maintain computing infrastructures de novo in-house. The extent to which "network services" are migrated to a cloud host may vary, and includes three basic levels: software as a service (SaaS), platform as a service (PaaS), and infrastructure as a service (IaaS), so as to monetize network connectivity. Examples of providers of cloud-host network services include Amazon Web Services (AWS), IBM Blue Cloud, Oracle Java Cloud, Microsoft Azure, and perhaps the earliest cloud service provider, Google Cloud Platform. Cloud hosts may interact in what has become a "multicloud world" that is anticipated to grow with the rollout of 5G networks.

In cloud computing, the word "cloud" (also phrased as "the cloud") is typically used as a metaphor for "the Internet," so the phrase "cloud computing" has come to mean "a type of Internet-based computing," where "cloud network services," or "network services"—such as servers, programs, and storage—are delivered to or are accessible from an organization's computers and devices through a web portal.

"Processor" refers to a digital hardware device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example. Examples of a processor include a microcontroller and a microprocessor. Parallel processing is also considered in any definition of processor in which multi-threaded processors are operative. And a processor may be configured to receive information in analog form and convert the analog information to digital form for further manipulation.

"Computer" means a virtual or physical computing machine with at least one processor that accepts information in analog, digital, or similar form and manipulates the information for a specific result based on a sequence of instructions. "Computing machine" is used in a broad sense, and may include logic circuitry having one or more processors, programmable memory, random access memory, and generally one or more ports to I/O devices such as a graphical user interface, a pointer, a keypad, a sensor, imaging circuitry, a radio or wired communications link, and so forth. One or more co-processors may be integrated into the display, sensor, and communications modules of an apparatus according to an embodiment of the invention, and may communicate with other processors or with a network via wireless or wired connections known to those skilled in the art. Processors are generally supported by static and dynamic memory, a timing clock or clocks, and digital input and outputs as well as one or more communications protocols and programs. Smart devices are frequently formed into networks, and networks of smart devices may be referred to here by the term "computing machine." In one instance, informal internet networks known in the art by the term "cloud computing" may be functionally equivalent to computing machines, for example.

A "server" refers to a software engine or a computing machine on which that software engine runs, and provides a service or services controlled by a client software program running on the same computer or on other computers distributed over a network. A client software program typically provides a user interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud.

A "sensor package" includes one or more sensors and associated circuitry and is effective in collecting and reporting a physical measurement or measurements when attached to a person, to an object, or at a location, attached to or built into a vehicle, or disposed at a stationary location. The data is often geostamped to indicate the data source by its location and the data also can be time stamped. Sensors may be directed at measuring motion, velocity, impact, pressure, ambient or internal temperature, ambient light intensity, location, and so forth. Sensor output may be digital or a digital encoder such as an A/D converter may be associated with the sensor circuitry.

The term "transceiver" may also include the functionality of a transponder and the terms "transceiver" and "transponder" may be interchanged where compatible functionality allows for such substitution. The use of one term over or the other is not to be considered limiting.

"Packeted Data Environment" relates to a conventional Internet system or protocol (e.g., hypertext transfer protocol (HTTP)) for breaking data messages into protocol-compatible strings having frames for a MAC address and an IP address, as well as other formatting information. In the logic of data transmission, the MAC address is found in a frame titled the "data link layer"; the IP Address is found in a frame titled "the network layer". An early model, known historically as the Open Systems Interconnect (OSI) Reference Model, is the basis for the use of "layered" or "nested" frames that direct the message as it progresses through a network from point to point.

"Timestamp" is an automated function performed as a background service in most nodal devices. Each radio contact detected is assigned a record having a time and date, for example.

"Geostamp" is an optional function performed as a background service in some nodal devices. Each radio contact is assigned a record having a datum indicative of proximity to a known location or is assigned a GPS coordinate. Radio signal strength at a particular frequency is generally indicative of proximity to another device. Cloud host servers may further refine location using aggregated data. But in an embodiment, geostamping is a nodal device function, much as a camera associates an image in memory with a location determined by accessing GPS signals and making a calculation of latitude and longitude, generally on a dedicated chip included in the device for that purpose.

"Registering"—refers to a programmed node action of storing a record of a radio contact, a timestamp, a geostamp, or sensor data in a memory module of a radiobeacon. On a cellular system, calls are routinely authenticated using subscriber databases prior to being routed for connection. Registration tabulates records of authenticated calls by time, location, and any sensor-data content.

"Records" in storage are generally retrievable, such as by accessing or searching a table or a database, for example, or other data retrieval systems known in the art. Records may also be uploaded to a higher layer in a network, such as to a server or other cloud-based service.

"Network"—refers to a whole world network ("internetwork"), a local area network (LAN), a wide area network (WAN), or a wired network (and combinations thereof) having one or more nodes through which signals are received and processed or retransmitted. The Internet is termed a global area network (GAN). Networks are differentiated as to whether their wireless emissions are low power and short range (i.e., "bluetoothed" and MANET networks) versus higher power and longer range as would be understood by one skilled in the art. A conventional network may include segments that are wired and wireless, for example a Zigbee radio network with a wireless base station and a telephonic radio network of devices that communicate across a network of telephone wires. Telephonic networks employing routers include the AIN (Advance Intelligent Network), MSTO (Mobile Switching Telephone Office), and PSTN (Public Switched Telephone Network). Cellular networks include wireless networks configured for implementing cellular protocols such as Global System for Mobile communications (GSM) and a Universal Mobile Telecommunications System (UMTS). Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA such as CDMA2000, Orthogonal Frequency Division Multiplexing (OFDM), Long Term Evolution (LTE), and various other 2G, 2.5G, 3G, 4G, 5G and next generation systems. Examples of suitable data-carrier protocols include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), EMB (enhanced mobile broadband), and various other current and future data bearers. It should be understood, however, alternatively or additionally, embodiments of the systems, devices, methods, and computer program products disclosed herein may be implemented in wireless networks that use any existing, developing, or yet-to-be-developed telecommunications technologies and standards.

Telecomm "orchestrators" are software programs that, when executed by a device such as a processor or computing machine, configure the device to be responsible for managing software-defined networks (SDNs), IoT data, and programmatic networks like 5G.

"Security orchestrators" are devices such as computing machines configured for automating very large networks and can address various telecom security issues, including differentiating traffic and control channel transmissions of telecomm equipment versus transmissions from rogue base stations and hacked satellites. A security orchestrator may rely on dynamic network routing and data architecture and may be programmed, or otherwise configured, to operate according to artificial intelligence and machine learning.

All embodiments disclosed here are exemplary embodiments. The word "exemplary" is used herein to mean "serving as an example, instance, or illustration." Any embodiment described herein as "exemplary" is not necessarily to be construed as preferred or advantageous over other embodiments and is not a comprehensive description of the scope of the disclosed embodiments.

General connection terms including, but not limited to, "connected," "attached," "conjoined," "secured," "coupled," and "affixed" are not meant to be limiting, such that structures so "associated" may have more than one way of being associated. "Fluidly connected" indicates a connection for conveying a fluid therethrough. "Electrically connected" indicates a connection in which units of electrical charge may be conveyed therethrough. "Digitally connected" indicates a connection that may be electrical or "wireless" (including acoustic, optical, and radio means) in which digital data may be conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," "fourth," and so on are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of, e.g., a device, apparatus, method, or system of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. *Aspex Eyewear v Marchon Eyewear*, 672 F3d 1335, 1349 (Fed Circ 2012). "Configured to", as used here, is taken to indicate is designed or arranged to, and is intended to function in support of the disclosed structures.

The terms "may," "can," and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this disclosure relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present disclosure.

The detailed description set forth below in connection with the appended drawings is intended as a description of exemplary embodiments and is not intended to represent the only embodiments that can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments disclosed. It will be apparent to those skilled in the art that the exemplary embodiments may be practiced without these specific details. In some instances, well-known structures and devices are shown in block diagram form in order to avoid obscuring the novelty of the exemplary embodiments presented herein.

DETAILED DESCRIPTION

An exemplary environment 10 in which the various exemplary embodiments disclosed herein may be implemented is now described with reference to FIG. 1.

Shown is a network system having a parent (e.g., monitor) mobile device 12, a parent stationary device 14 and two child minder devices 20a, 20b. Note that the parent and child devices need not be, and, in the illustrated embodiment, are not, in direct point-to-point radio contact.

The network includes a cloud-host administrative server 22 with administrative responsibility for the operation of a software-defined or definable private radio network. All communications are routed through a packet data environment 30, which has connections to cellular radio antennae. In this example, two cellular radio antennae are shown, each defining a "base station" or "access point." The first has a MIMO base-station antenna 24 as is typical of recently deployed cell towers. Other cell towers equipped for 3G and 4G networks may also be used. The second base-station antenna is a small cell antenna 26 that is pole mounted, as on a street pole, and is representative of "small-area cells" used in urban environments. Other cells, including pico- and femto-cells, are generally equivalent in function and are representative of modern LTE and 5G infrastructure. Smaller cells may also include home networks. The small cell networks may use several frequencies, including >5 GHz frequencies designated for 5G at about 28 GHz, 39 GHz, 60 GHz, and 70 GHz. The telecommunications equipment is generally back compatible, and may include one or more antennae designed for 800 MHz, 2.1 GHz, 2.4 GHz, 3.5 GHz and 5 GHz as are used for LTE and Wi-Fi. Child minder devices 20a, 20b may also be enabled to collect radio-beacon contacts at frequencies of 2.4 GHz via Bluetooth radio antennae and to transmit time- and location-stamped beacon contact information to a cloud host such as the cloud host 22 via an access portal at cellular frequencies or via a parent smart device at Bluetooth frequencies.

Uplinked and downlinked data moving through packet data environment 30 may be carried, for example transmitted wirelessly 34, between base stations, or on optical fibers 32 as in trunk lines across the major cores of the Internet.

In 5G, cellular devices initially use 4G LTE or LTE-M for the initial connection with the cell, and depending on the availability of 5G, are backwards compatible with 4G and 3G. Thus, each child minder device is provided with a SIM or USIM identifier and a unique IDME.

A service provided by the private network is location tracking of the child minder devices. This is generally provided using satellite signals 40a from a network of orbital GPS satellites 40, from the Starlink system, or from another positioning system. Location may also be achieved using radio triangulation from beacons having known locations, but A-GPS is more commonly employed. To reduce the hardware and energy requirements of the iterative calculations associated with raw GPS, A-GPS or a variant of A-GPS, can be used. The user equipment (child minder device) receives initial boundary conditions from a base station 24, 26 and on that basis is configured to transmit time-stamped measurements from the child minder device or receiver back to a network service provider for final calculations. The child minder device or receiver is then given more precise position coordinates. Using A-GPS data and location calculation assistance from the network, time to final position can be reduced to as little as 8 seconds in an embodiment, or otherwise a longer time due to limiting by network latency.

While GPS calculations can be a major power draw for a pocket device, other circuit power losses also can occur. In one or more embodiments, one or more of the child minder devices are provided with smart switching (e.g., power-island technology and techniques) that puts circuits that are not active into a "sleep mode" (e.g., lower-power mode, lower-functionality mode) in which only the cellular radio-set is active and is listening for a "page" from the system, and a "supersleep mode" in which one of the only electrical drains is power to the processor so that a clock is being monitored and time measured so as to identify a next wake-up time. In another embodiment, a child minder device is enabled to negotiate a schedule with a network so that the device is paged only at defined times and outside those times is in a supersleep mode. By design, a supersleep mode allows a child minder device to be used without charging for extended periods, for example, as long as several months between chargings.

Both the child minder device and the base stations receive GPS clock signals and time synchronization is routinely performed as part of maintaining digital radio communications. Transferring the initial fix of location of a child minder device and subsequent calculation load to the network saves energy and reduces hardware requirements of a child minder device. However, alternatively, the receiver child minder device can make the iterative calculations to fix precise location from the initial boundary conditions. Note that the initial boundary conditions correspond to CELL-ID location based on the geographical coordinates of the cell. Any correction of the local clock to GPS time can also be made.

The cloud host 22 tracks the location data as a function of time and archives data containing waypoint "breadcrumbs." Breadcrumbs can be accessed by the child minder devices to display directions useful, for example, in backtracking a trail of breadcrumbs to an earlier location (such as a parked car or meeting spot) and can be accessed by a parent device to display direction of motion, expected time to reach destination, and last location as needed.

The network location service also benefits by what is termed "mobile edge computing," in which local-area base stations are provided with computing power to perform GPS fix calculations (and other network services) without routing data to a central network core.

Interestingly, MIMO antennae can transmit a focused radio signal 60 in a process termed "transmission beam forming." "Reception beam forming" may also be used. The directionality of the beam aids in power efficiency of signals on the uplink and downlink and can be used as an adjunct to location to determine direction and velocity of a child minder device. Some level of inertial navigation is also achieved by incorporating an XYZ accelerometer in the child minder device. This accelerometer data can be used onboard or by the system to determine whether a child minder device is moving, and if so, the direction and velocity, including any change in direction, of the child minder device. The accelerometer sensors are often supplied in a package (sometimes called an inertial measurement unit (IMU) with a gyroscope, compass, and temperature sensor. All sensor data can be transmitted to the network during periodic bursts.

The sensor-package data also may be transmissible by Bluetooth radio when a child minder device is in Bluetooth radio proximity to a paired parent device. Bluetooth radio may also be used in tracking. This technology has been disclosed in earlier publications (US Pat. Publ. Nos. 20150356861, 20150356862, 20150356858, 20150356393, 20160182170, 20180190103, 20180206177, 20180206172, 20180359039) and in U.S. Pat. App. Ser. No. 62/732,945 by the same inventors, all of said patent documents being incorporated herein by reference for all they teach.

Figure 1:
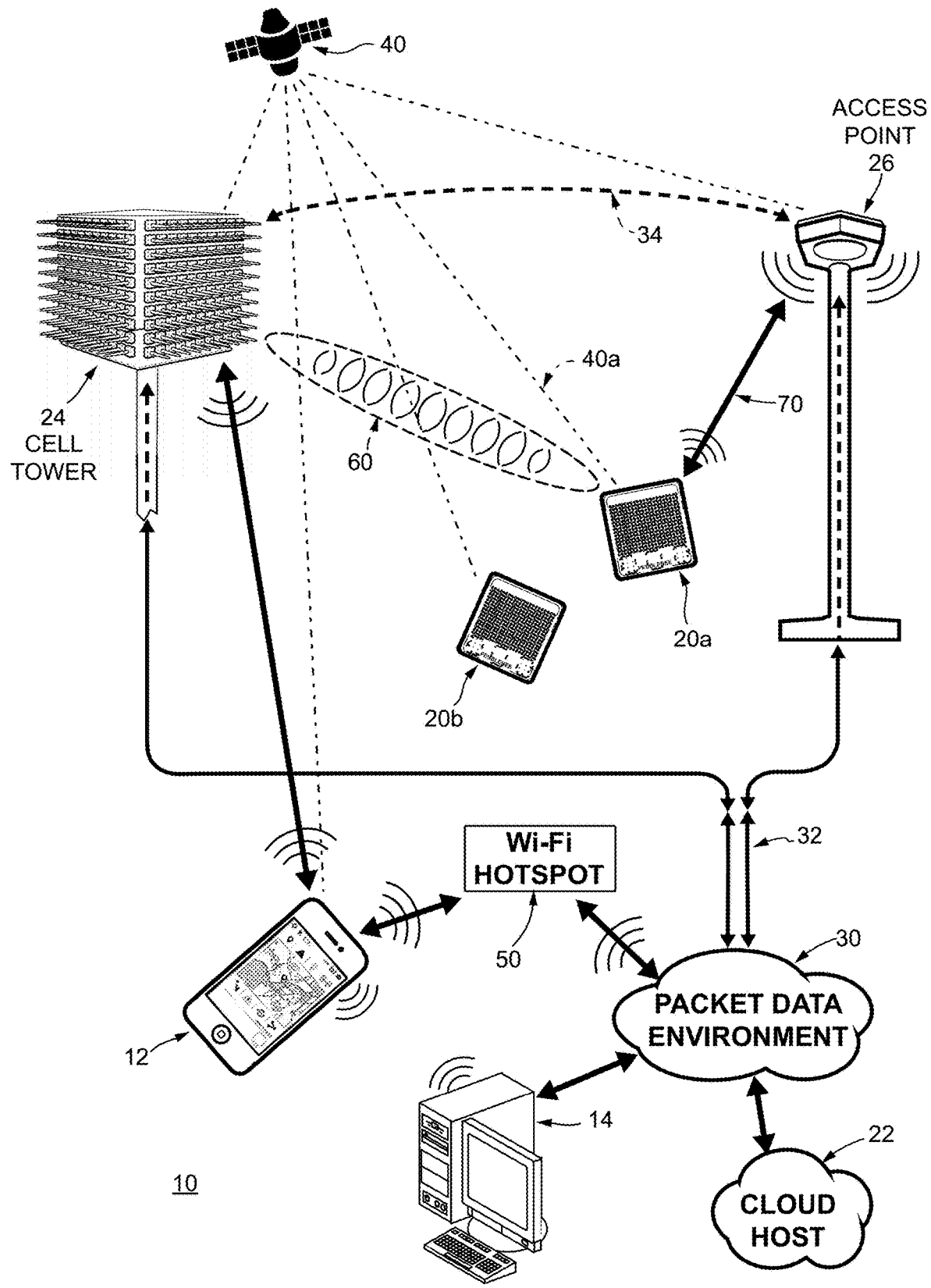
FIG. 1 is a diagram showing an overview of a radio network with child minder devices, according to an embodiment.

In FIG. 1, child cell device 20a is in radio contact with access point 26. Some network services are performed directly at the access point 26; others are performed using wider net resources accessed via trunk lines 32. In most instances, the data is passed on through the packet data environment 30 to cloud host 22, which administers the private network of child minder and parent control devices.

Data is transmitted via multiple channels, one termed a "traffic channel" for example, another a "control channel," and yet another as a data channel containing GPS-related data, although the terminology may vary. The control channel carries commands to SIM cards of the parent control devices and also carries data packets for SMS text messaging. The traffic channel is organized into slots for carrying symbols and on the uplink is controlled by a dynamic allocation of slots to each end-user (e.g., child minder, parent control) device. To avoid an imbalance on the backhaul, slot traffic is asymmetrical, and may be greater in the downlink then the uplink. In newer systems, slots can be mini-slots for carrying small payloads, slots can be aggregated as needed if reception is good, and packet data may be transmitted in the aggregated slots to support bit-streaming applications. At least one procedure for dynamically allocating slots is conventional.

Larger transmissions such as audio recordings and video recordings can be transmitted using a "store-and-share" (SNS) protocol in which there is an initial processing of data on the child minder device that includes compression by a vocoder. The child minder device stores for example the audio in memory temporarily, followed by processing to encapsulate the digital recording into the frame/slot structure of a transmission. Transmissions are completed in one or more bursts. The data then propagates (e.g., is transmitted) through the packet data environment 30 and is received by the cloud host 22. The cloud host 22 examines the data, looks up an associated profile of the users, including any permissions, and forwards the message to one or more parent control devices 12, 14. In this way, the digital radio signals are made compatible with an Internet Protocol (IP) format and can be displayed or played back as audio on a parent control device. The parent control device also can send audio (or video) messages by the same process of packetization followed by radio transmission in one or more frames.

Frame structure is complex and includes hyperframes, superframes, frames, and slots. In time-division multiplexing (TDM), the frames and slots are transmitted at designated times. Each carrier is part of a transmission protocol managed by the network and includes its own metadata, including error checking, synchronization, indexing, guard periods, and so forth. For example, a 5G network supports text message traffic from the parent control device to the child minder device in larger slots, but can use mini-slots to carry a reply from child to parent where replies are limited to button press of the YES or NO buttons, for example.

Figure 2A:
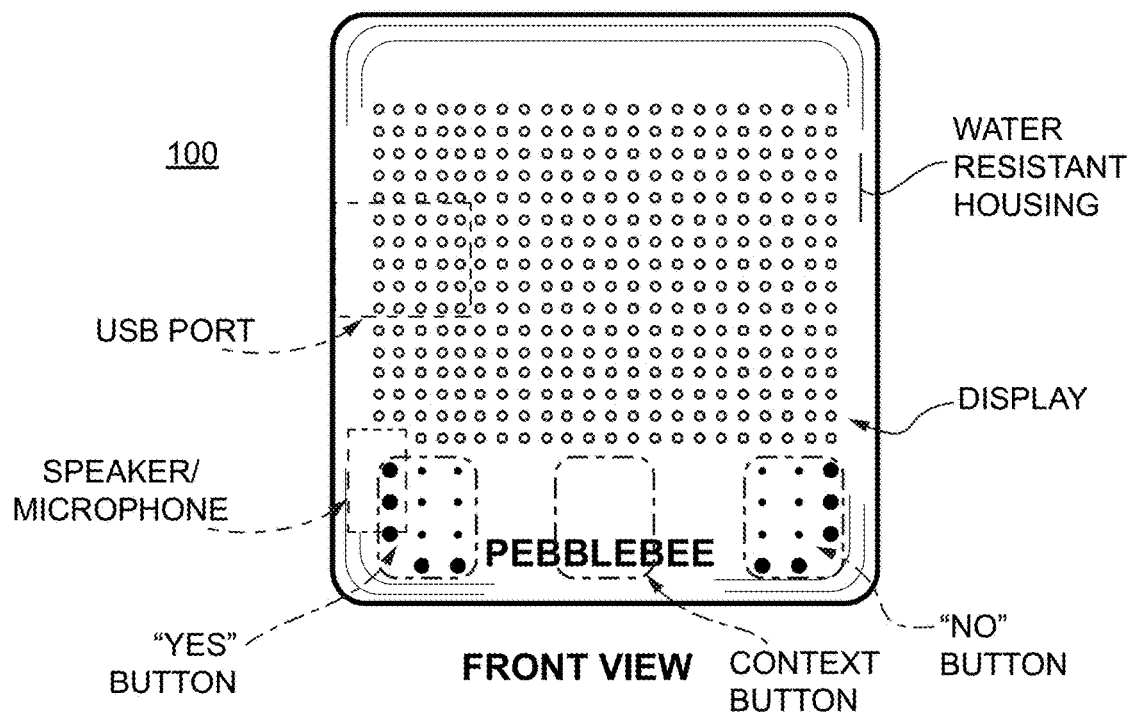
FIGS. 2A and 2B are front and back external views, respectively, of a first embodiment of a child minder device, according to an embodiment.
Figure 2B:
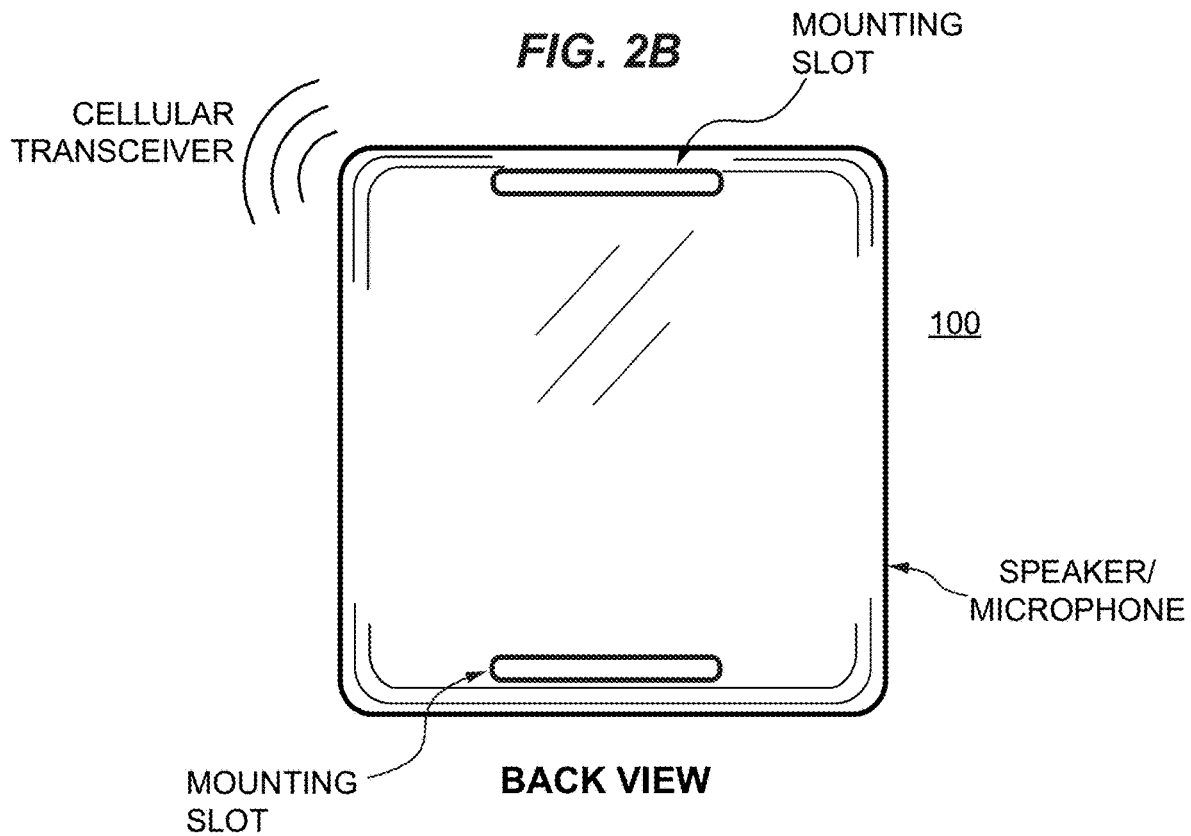

FIGS. 2A and 2B are front and back external views of a first embodiment of a child minder device 100, according to an embodiment. A housing holds a processor and supporting circuitry, a display for scrolling messages (or other suitable display matrix), a cellular radio transceiver configured for text and audio messaging, a GPS positioning module, an antenna or antennas, switches and optional sensors, and a battery with USB charging port (the battery may be installed when an end user purchases, or otherwise acquires, the child minder device 100, or the end user may install the battery after he/she purchases or otherwise acquires the child minder device). The antenna system may also include means for transmitting power as well as data and inductive wireless charging means. Furthermore, examples of the display include an LED dot-matrix array and an array of organic light-emitting diodes (OLEDs).

The front surface of the housing includes three regions (marked here with embossing) that cover pressure-sensitive switches (e.g., one or more switches can be called, collectively, "a selector"). Thumb or finger pressure on the switch region activates one or more functions of the child minder device 100. For instance, a first button (lower left) may be a "YES" button used to respond to a display of a text query (see FIGS. 4A through 4C). The button may also be used in other contexts. A second switch or button (lower right) may be a "NO" switch for responding in the negative to text queries and in other contexts may be multifunctional. For example, the YES and NO buttons may serve the place of a dial pad and may be used to send SNS (store-and-share) messages to at least one pre-selected telephone number. By pressing the respective YES or NO button several times in a row, a user can scroll through a restricted list of programmed telephone number(s) that include the number(s) of parent control devices and emergency numbers. A third switch (center) may be used for volume control and in other contexts for accessing sensor information or activating playback of recorded audio messages from a parent control device. In use, the buttons may also encode commands for RECORD and SEND SNS messages. At least one switch (either YES, NO, context, or another switch not shown in FIGS. 2A-2B) may power down the unit into a sleep mode when not needed. In another realization of switch logic, pressing both YES and NO buttons at the same time can signal a PANIC alert. Thus, the switches are multi-functional in use and their functions are context dependent.

The housing can be water-tight, or otherwise fluid-tight, and includes one or more mounting features for attachment to an object, a person, or to a pet, for example, as a wearable device. In a first embodiment, the child minder device 100 has dimensions of about 4 cm on a side and a thickness of about 1 cm. Generally, the battery is large enough to supply about 1500 mAh and is rechargeable, but advances have been made in reducing power consumption so that a 300 mAmp-hr battery may be sufficient. Suitable batteries include lithium polymer (LiPo) batteries as are available in thin sheets and coin cells. A USB charger or an inductive external battery charger (not shown in FIGS. 2A-2B) may be supplied with the devices. In some instances, ambient energy harvesting (e.g., of energy generated by motion, solar/sunlight, temperature differential) may be used to accumulate charge and to charge the battery with the accumulated charge during portable use so as to extend battery life.

FIGS. 2C and 2D are end and side views, respectively, of child minder device 100. The upper face includes a surface button such as a capacitive switch, which, when pressed, activates instructions encoded by software or logic gates (e.g., configured by firmware) associated with an internal processor. Also disposed on the wall of the housing are a speaker port and a microphone port. One or more features for mounting the device as an attachment or for wearing the device may be configured in the housing. Shown here are mounting slots for receiving a wristband, a belt, or a strap.

FIG. 2E is a view of a first block diagram of an embodiment of a circuit board and associated electronic components of the child minder device 100, the components including battery, LED dot-matrix array, USB port, microphone, speaker, surface switch(es), controller (e.g., a microprocessor or microcontroller), memory, and a sensor package. The sensor package may include a temperature sensor (e.g., thermometer), a photocell, a location sensor assembly, an accelerometer, and so forth. Not shown are supporting logic components including a clock-signal generator, read-only memory (ROM), program instructions in the form of firmware or software and stored in a memory such as a non-volatile memory circuit, LED(s), and electrical connections. While this is a representative package, other embodiments are described below. For example, the LED dot-matrix array can be an FCBA with SPI or I$^2$C bus, or can be replaced with an LCD display, organic LED (OLED) or an Elnk screen (for more details, see U.S. Pat. No. 6,124,851, which is incorporated herein by reference).

Figure 3:
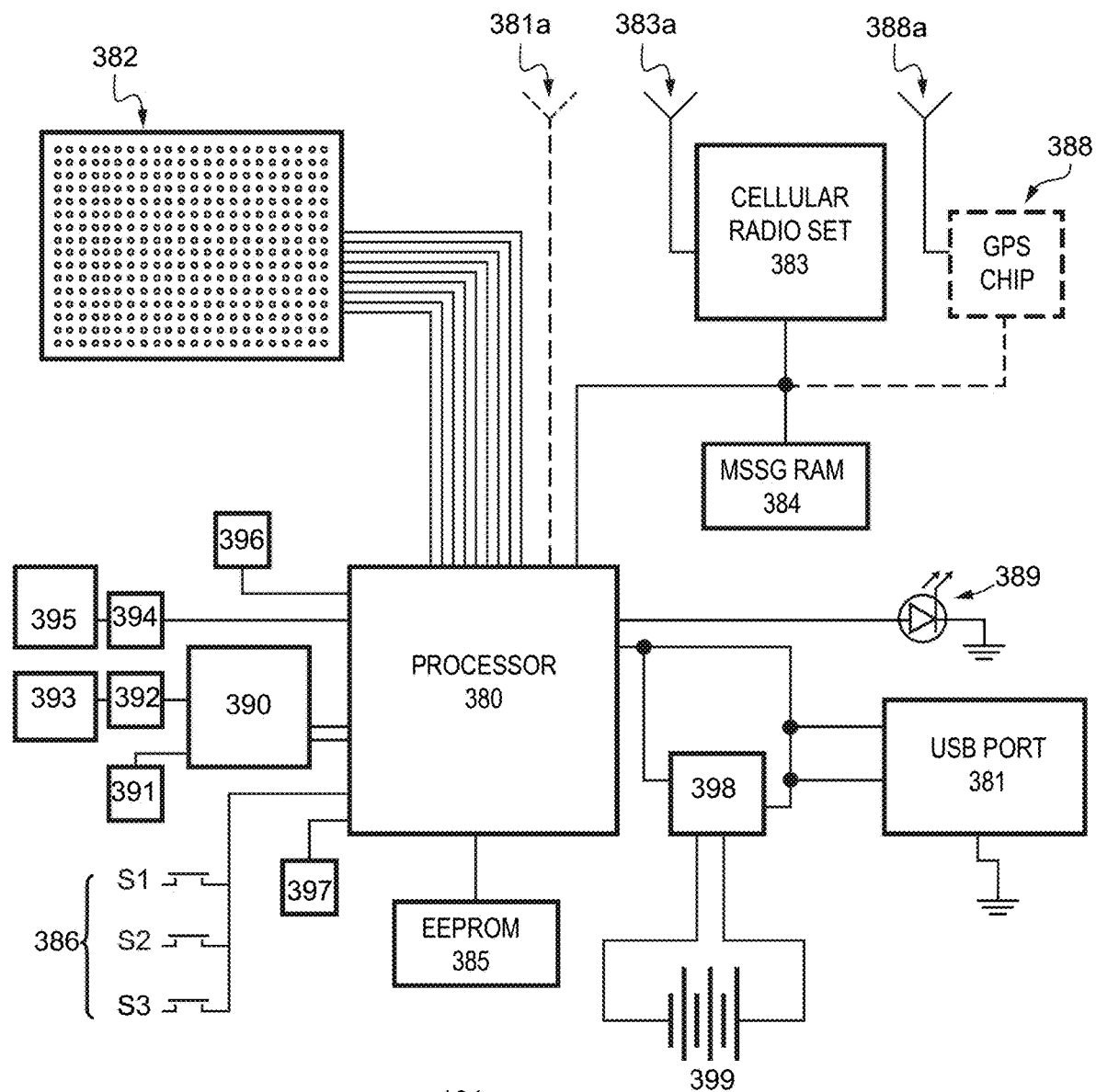
FIG. 3 is a block diagram of a first embodiment of the child device of FIGS. 2A-2E, according to an embodiment.

FIG. 3 is a schematic diagram 101 of a first embodiment 100 of the child minder device of FIGS. 2A-2E. A processor 380 is joined by a databus to LED dot-matrix array 382, which is enabled to display text messages, time, location, and sensor output. The dot-matrix array can include a co-processor, but generally all data for addressing the individual LEDs is supplied by the processor 380 over an 8, 16, 32 or 64 pin bus that connects directly to the processor. The processor 380 may also include a radioset, such as a BTLE/WiFi radioset, and may be electronically coupled to an antenna 381a, including, if needed, an encoder/decoder for parsing digital radio signals.

Processors, such as microcontrollers or microprocessors, may also be used as logic-driven parts of a computing machine. Processors are solid-state digital devices that can be programmed, or otherwise configured, using software resident in non-volatile memory (such as an EEPROM 385) or as firmware, or a combination of both software and firmware. Some chips have reduced-size instruction sets. Also envisaged as parts of a computing machine are co-processors and graphics processors Cellular radioset 383 with cellular antenna 383a is configured to provide simplified audio and text-messaging communications on a private network. Using switches 386, a RECORD mode is activated and a message is dictated. Audio vocoder 390 (or other analog-to-digital coder and compressor) digitizes and compresses the message before it is stored in message RAM 394 as a record and assigned an accession indicator and any cataloging such as by time and location. Once the message is recorded, it can be replayed or re-recorded and is sent to a defined phone number (IMEI) or phone numbers when a switch 386 is pressed. The phone number cannot be dialed on the child minder device, which has no keypad, and is dependent on a setup routine that defines the private network, or the child minder device's relationship with the private network. The child minder device may not function as a full-duplex telephone for conversation, but is simple to operate because audio messages are sent automatically to a pre-designated phone number or numbers using a store-and-share message delivery protocol. Steps in setup of the child minder device provide for designating phone number(s) to receive audio messages. The phone numbers are entered on a graphical user interface of a parent control device (typically a smart device such as a smartphone) and stored in a nonvolatile memory in processor 380 or external to the processor. No dial pad is needed on the child minder device because the cellular contact number or identifier contact numbers to be called are pre-programmed by a parent-device user into the child minder device and the transmission of a voice recording is actuated by pressing a switch 386. The contact number(s) to which the message is(are) sent are programmed into the child minder device when linked in setup to a parent control device as will be described below. A general setup procedure, including any necessary pairing, is outlined in more detail in FIG. 14A and the accompanying description below.

The child minder device 100 is a bespoke contact device (indicating it is able to be linked to and to be customized for an individual) for operating as a cellular/WiFi device on a private network to find and track the whereabouts of the device (and individual "user" or "child") and to exchange audio and text messages with a parent control device via a dedicated and secure 5G (or other) private network (e.g., a software-defined private network, SDPN) that is administered by a cloud-host administrative server (CLOUD HOST). The SDPN is enabled by the cloud host via cellular or WiFi connections to a parent control device and via a network to one or more child minder devices. The multiple child minder devices may be in contact with a parent control device but are not generally in contact with each other.

The SDPN uses the macro cell and femto cells of cellular networks, satellite wireless systems, and even hardwired and microwave communications links as needed, in combination with a cloud-host administrative server that complements the mobile switching centers (MOBSC) of the cellular (e.g., 5G) network. To interface with the cellular network, end communications are routed from the cloud host server through conventional MOBSC (with location registers for home and visitor logs and for authentication) to base stations of individual cells, and are treated like ordinary cellular or wireless traffic at the local level.

The cloud host operates to maintain network integrity. The cloud host implements special rules that implement the SDPN network and adds a layer of artificial intelligence. Use of A-GPS can dramatically improve the time needed for a child minder device to achieve a location lock. Cellular broadcast stations also broadcast a "color" signal that identifies the general area in which the end user is operating the mobile device (e.g., child minder device), giving the system a head start in narrowing down the location of the mobile device. The SDPN network uses this information to create a "trail of breadcrumbs" of locations of the child minder device over time by periodically generating and logging locations obtained by A-GPS in an energy-efficient manner. For any given time period, a flag is set in the child minder device if accelerometric motion is detected that is characteristic of actual motion of the child minder device, and once set, circuitry (e.g., a processor) onboard the child minder device 100 determines a current position of the child minder device, or requests the cloud host to calculate the current position of the child minder device. The position fix typically is not repeated unless motion is again detected. In a variant on geofencing, a child minder device in an identified "safe location" is queried less frequently for location updates than a child minder device outside of an identified safe location, and the child minder device may not be queried for a location update unless motion data from a sensor (e.g., an accelerometer) onboard the child minder device is consistent with an excursion that would take the child minder device outside a designated range of the safe location. For example, the circuitry detecting, via an accelerometer or other sensor, the tempo of a walking person causes the circuitry to set one flag, and the circuitry detecting, via an accelerometer or other sensor, the higher-frequency vibration of an automobile ride causes the circuitry to set another flag that would "trip," a location-update command that the circuitry would execute. Thus, to reduce power consumption and, therefore, to extend the life of the battery, the circuitry onboard the child minder device monitors only the accelerometer (or other motion sensor) on battery power unless and until a location-update command flag is set or a location or other query is received from the cloud host.

The child minder device can monitor the signal strength of a signal from one or more cellular base stations, as is typical in cellular networks to monitor connections and, when needed, to monitor transfer connections from one cell to another cell. Typically, the child-minder-device location is updated when a handoff is made between two cells. Depending on rules set by the cloud host and that can be linked to the child-minder-device user's profile, local events, time of day, and so forth, the cloud host also can be notified by, e.g., the cellular network, if the child minder device is reallocated from one cell to another. Because such reallocation also can occur when cell traffic is being leveled (i.e., by moving users from a crowded cell base station onto an adjacent base station having lighter traffic) the cloud host can monitor the base-station carrier channels in the network path to differentiate location changes that are traffic-load driven versus changes driven by a change in cell initiated because the child minder device detected a stronger signal from an adjacent base station and elected to initiate a handover to the new system transmitter.

A variety of encryption schema may be used to ensure privacy of the messaging. For example, initial pairing of a child minder device with a parent control device may include a WEP (a security algorithm for IEEE 802.11 wireless networks) or WPA2 (WiFi protected access, per packet key mixing and 802.1x authentication with the Extensible Authentication Protocol) cypher. WPA2 may have an advantage, when implemented in a cellular environment, of enabling, by Pairwise Master Key caching, roaming from cell tower to cell tower without the need to re-authenticate. AES (Advanced Encryption Standard) encryption also may be used but, like CCMP, may require significant computing power. Sophisticated protocols that include salting or anonymous key encryption also may be implemented. Because audio messages may be binary in character and not packet-encoded, other proprietary security encoding may be used for the private network and may require fewer computational resources. Use of magic-key salting and propeller encoding are also contemplated.

Messages generated by, or corresponding to, a child minder device are typically geostamped and timestamped so that the parent controller device can find and track the child minder device. In some instances, the cellular radio chip 383 also includes a GPS position locator. In other instances, a GPS chip 388 and antenna 388a are included as a separate component(s). Because GPS involves an energy-intensive signal acquisition and calculation, triangulation methods for determining location may instead be implemented using WiFi or Bluetooth radiosets, and such methods can be satisfactory where multiple WAN gateway receivers having known locations are available, such as in most urban environments. However, cellular-tower-assisted location determination is most commonly used. A-GPS and advanced forward-link trilateration (AFLT) from cell towers permits even greater confidence in location determinations.

A USB port 381 is configured to operate with a battery charger 398 to recharge battery 399, and also may be used to download program upgrades, for product qualification and troubleshooting, and for any other purpose for which a USB port may be utilized.

An audio codec 390 is coupled by a LINE OUT to amplifier 392, which is configured to drive a speaker 393. Also routed through audio codec 390 by a LINE IN is a microphone 391 input terminal. An electret microphone may be used, for example, and may be surface mounted on a printed circuit board on which some or all of the components of the child minder device are mounted. The audio circuitry that includes the audio codec 390 and the processor 380 may include software-implemented, firmware implemented, or hardware implemented filters for reducing or cancelling background noise and signal transients. The speaker 393 may be mounted on the housing of the child minder device rather than on a circuit board so as to take advantage of any resonance of the housing shell. In an embodiment, the microphone LINE IN may be used for power-saving functions such as a verbal WAKE UP to a pin (e.g., a general-purpose-input-output (GPIO) pin) of the circuitry onboard the child minder device. More complex voice-recognition functions, such as implemented by a digital signal processor (DSP) in conjunction with an analog-to-digital converter (ADC), are contemplated to increase capacity for relatively simple voice-actuated command routines.

The child minder device may include a vibrator driver 394 and one or more vibrators (e.g., buzzers) 395 configured to provide notification functions. By selecting a louder (e.g., a higher dB) piezoelectric buzzer (not shown), a FIND MINDER function can be realized analogous to the FIND PHONE function taught in U.S. Pat. No. 9,892,626, herein incorporated by reference. Using a vibrator 395, a child minder device may generate a "nudge" to a user or holder of the child minder device, A nudge is useful when a user of a parent control device wants to attract the attention of the user of the child minder device, such as when the parent control device sends to the child minder device a message to which the user of the parent control device requests a prompt reply.

Sensor package 396 may include one or more sensors that are not switch sensors and are thus distinct from switches (e.g., push buttons) 386 (S1, S2, S3), which can have, at any given time, one state out of one or more states. Sensors make quantitative measurements of physical properties, conditions, or characteristics, such as temperature, and output a sense signal to the processor 380 indicative of the parameters of the physical properties, conditions, or characteristics. If a sensor outputs a digital sense signal, then a digital input node, such as an I/O pin, of the processor 380 can be configured to receive the sense signal directly; but if the sensor outputs an analog sense signal, then an ADC (not shown in FIG. 3) is configured to convert the analog sense signal to a digital sense signal, and to provide the digital sense signal to the processor. Such an ADC may be located external to the processor 380 or may be disposed on the processor. In addition to ambient or internal (to the sensor or device in which the sensor is disposed) temperature, sensors may be directed at measuring motion, velocity, impact, pressure, ambient light intensity, and so forth. Sensor data is frequently shared with an administrative cloud host server for use in aggregating a composite map of the local environment and has found application in a wide variety of "crowdsourced functions" such as weather mapping, traffic mapping, hazard anticipation, alerts directed at events of general interest and local historical significance, and so forth. The child minder devices of the system are configured to function as sensor tags that monitor and report local conditions. Other physical measurements of interest include background noise level, particular sound patterns, radio traffic level, particular radio signals such as from Bluetooth beacons, and so forth. Sensors include photocells, radiation sensors, motion sensors, velocity sensors, accelerometers, jolt sensors, gyroscopes and gyroscopic sensors, gesture sensors, gravitational sensors, magnetic sensors, compass sensors, clock sensors, switch open/closed sensors, vibration sensors, audio-pattern-detection sensors, vehicle-performance sensors, biological-agent sensors, biochemical-agent sensors, pollution sensors, chemical-agent sensors, temperature sensors, humidity sensors, windspeed sensors, pressure sensors, location sensors, proximity sensors, altitude sensors, smoke sensors, oxygen sensors, carbon-monoxide sensors, global-positioning-satellite sensors, relative-radio-signal-strength sensors, and radio-traffic sensors, for example.

Sensors package 396 having audio sensors, such as a microphone or diaphragm, may include some level of configurable acoustic-pattern-matching capability embedded in the sensor package; in other words, some preliminary filtering of the sensor output (sense) signal conditions the sensor output signal, for example by reducing its bandwidth. Various combinations of sensors may be provided in a sensor package 396. The sensors in some embodiments sense parameters experienced by a "bluecell device" (referencing U.S. Prov. Pat. No. 62/732,945, which is incorporated by reference), including and not limited to displacement, motion, acceleration, electromagnetic radiation, temperature, sound, light, pressure, and also chemical or biological parameters where useful. In an embodiment, a sensor is a combined 9-axis motion sensor and temperature sensor (sometimes called an inertial measurement unit (IMU)). In an example device, one sensor is an integrated package having, for each axis, an accelerometer, gyroscope, and magnetometer. In some instances, an integrated sensor package is incorporated into the processor.

Accelerometer sensor (or "accelerometer) 397 is associated with processor 380 and may be used to trigger processor functions as in motion-control and left-behind notifications. Generally, the accelerometer 397 is an XYZ three-axis accelerometer. In some instances, the accelerometer may be integrated into the processor and has a number of uses. Motion control includes pattern recognition by which the processor 380 is programmed, or is trained to recognize, distinct motions such as user gestures (e.g., moving one's hand, jumping, running, suddenly stopping), enabling a haptic user interface. Alternatively, input from the accelerometer, such as a double or triple tap, can be used as a wakeup signal as part of a power-savings sleep routine. Accelerometry also can be used to signal simple responses, such as one tap for YES and two taps for NO.

The cloud-administrative host account for a particular child minder device 100 can be populated with reminders (or alarms) on a schedule with accompanying text or SNS. When the time is right, the reminder is sent to the child minder device with the accompanying message (e.g., "TIME TO COME HOME" OR "CALL MOM"). The child minder device can also function as a timer, for example, sending an alert to the parent control device if fifteen minutes has elapsed and the child minder device is at, or enroute to, a restricted location.

Accelerometry also shows activity and is useful because it indicates when the child minder device is on the move or is recording motion associated with breathing or at least a pulse, and conversely, lack of accelerometry data from a device strapped, for example, to a user's wrist could be an alarm condition.

GPS chip 388 with GPS antenna 388a is optional because in some instances the GPS functionality will be built into the processor 380 or into the cellular radioset 383 or into another one of the radiosets (no other radioset shown in FIG. 3). Many cellular radio chips are provided with accessory GPS functionality integrated into the die. The GPS antenna 388a may be separate from the cellular antenna 383a as shown, but, in some instances, a combination antenna package is used. GPS may be actuated at extended intervals to save power, and may be smart GPS, that is, activation occurs when there is a need, such as when there is motion of the child minder device 100 or there is a situation in proximity to the child minder device (as detected from other data feeds) in response to which the cloud host more closely tracks and monitors the location.

RGB-LED 389 is a surface-mounted light-emitting diode that is configured to illuminate at least a part of the front face of the child minder device 100. The housing is partially translucent, for example, at the location of the LED 389, to enhance this illumination. A light bar (not shown in FIG. 3) is used to diffuse the light from the LED 389 more evenly across the translucent housing area. A light pipe also may be used because the diffusion of light provided by the light pipe can be similar to the diffusion of the light provided by a light bar. Although a color-variable LED 389 can require more pins from the processor 380 than a single-color LED, a color-variable LED can display significantly more information than a single-color (color-invariable) LED. For example, a color can signify incoming radio traffic, unanswered messages, or a threat condition and its relative importance, particularly when combined with a buzzer or an audible message from the speaker.

Multifunction switches 386 are configured to allow a user or other holder of the child minder device 100 to respond to incoming messaging or to an already-received message. In an example, the message displayed on an LED array 382 can be a query, such as ARE YOU ON YOUR WAY? The child minder device 100 provides the switches 386 (e.g., multifunction thumb switches) to make YES or NO answers to simple queries. The switches 386 may be configured, or configurable, for multiple functions, such as for selecting a party from a list and initiating an audio message to that party or for powering the child minder device 100 into a sleep mode. One of the switches 386 is generally a volume control for adjusting speaker loudness or for silencing the speaker or a buzzer. Other functions that can be toggled by a multifunction switch 386 include changing the "skin" of the child minder device (such as the color of the RGB-LED 389), selecting a musical tone to signal an incoming call, or formatting the LED array 382 for scrolling, size of characters, orientation of scrolling or characters, number of lines of text, and so forth. Furthermore, examples of the LED array 382 include a dot-matrix array or an array of organic light-emitting diodes (OLEDs).

FIG. 4A is a perspective view of a child minder device 100, according to an embodiment. Shown is a clamshell housing having a front and back cover pieces. The two housing pieces are sealed together by ultrasonic welding. The housing optionally includes a water-resistant USB-C connector for wired power sharing, data exchange, for installing firmware updates, and for testing and troubleshooting. Also indicated here are textured surfaces overlying pressure sensitive "YES" and "NO" switches.

Figure 4B:
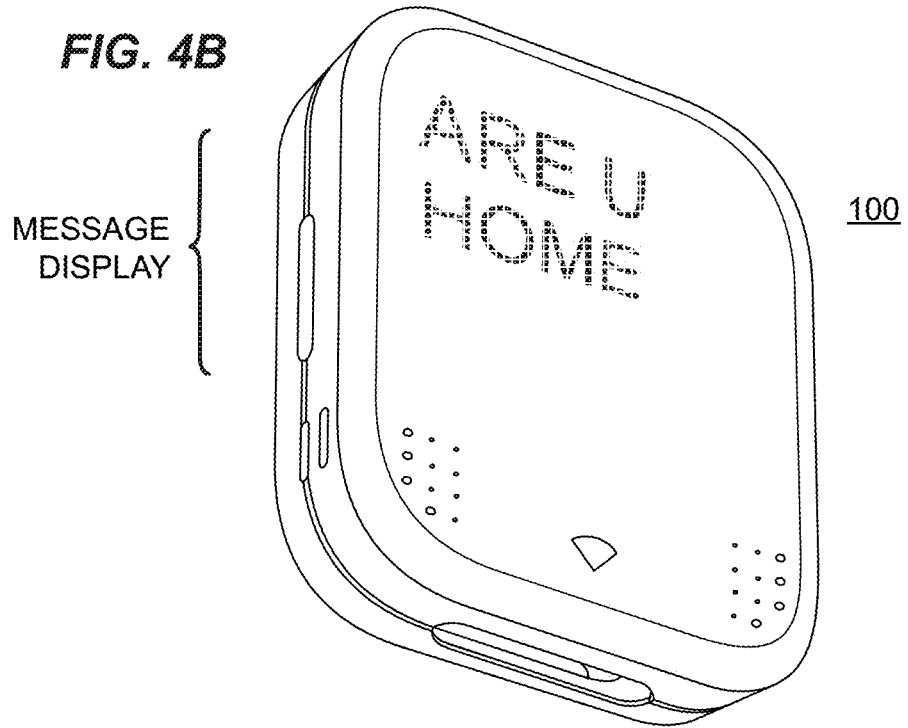
FIGS. 4B and 4C illustrate the message display capability of the LED array of the child device of FIGS. 2A-2E and 4A, according to an embodiment in which selected surfaces on the front cover piece of the housing cover pressure-sensitive switches used to control processor functions.
Figure 4C:
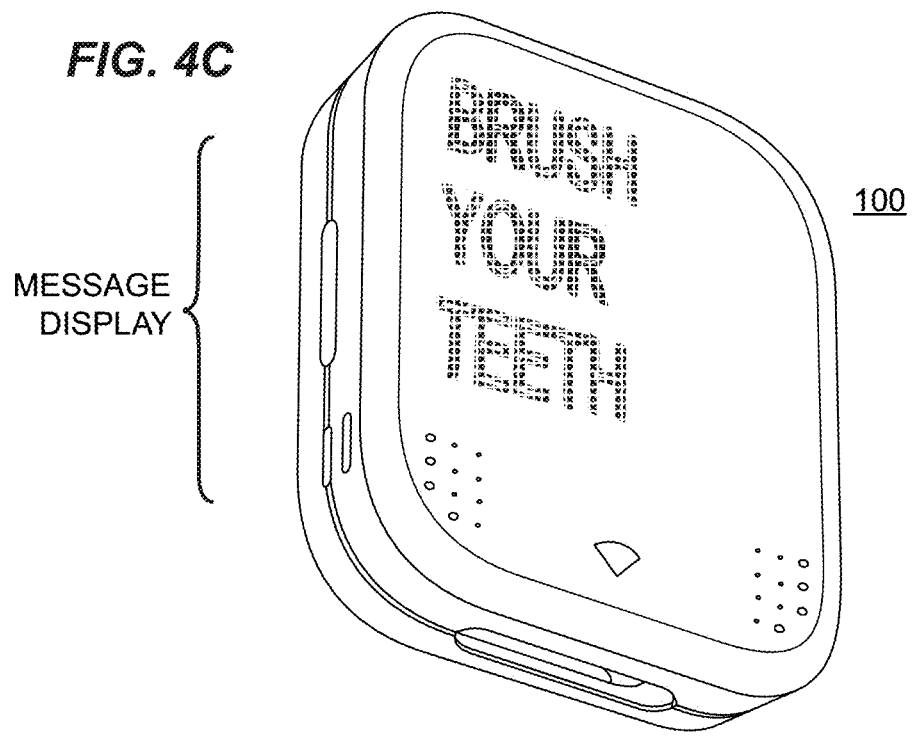

FIGS. 4B and 4C illustrate the message-display capability of the LED dot-matrix array 382 of a child minder device 100, according to an embodiment. In the message LED display, shown are the messages, "ARE U HOME" and "BRUSH YOUR TEETH." These messages are addressed to family members, but other simple messages also may be of use in guiding tour groups ("MEET AT THE STATUTE IN 10 MINUTES"), escorting field trips from schools ("TIME FOR LUNCH"), and coordinating employee actions at trade shows, for example.

Although not shown in FIGS. 4A-4C, the child minder device 100 also includes three buttons positioned at the top of the device, according to an embodiment. The speaker is a piezo device with diaphragm mounted in the wall of the front housing. The LED dot matrix display 382 may be used to read messages on the device, or the contents of the array may be sent to heads-up glasses such as Google Glass or FocalsbyNorth Smart glasses, but with a feed from the child minder device 100. This embodiment also may feature a Bluetooth radioset for LAN connectivity to complement the cellular radioset 383 and/or a WiFi radioset (not shown in FIG. 3). As described above in conjunction with FIG. 3, the child minder device 100 also may include a GPS chip 388 and a GPS antenna 388a (or any other type of antenna) wrapped inside the housing shell.

The upper housing shell member may be partially translucent so as to diffuse the light from the LED dot matrix array 382 and to improve the matrix array's visibility under daylight conditions.

A water-resistant USB port on the outside wall of the housing is configured for battery charging and for data exchange during software updates and for troubleshooting during repair. Also included as part of the child minder device 100 are ports that are configured for audio output and as a sound pipe for the microphone. And selected surfaces on the upper face of the housing overlay pressure-sensitive switches used to control processor functions.

Figure 5A:
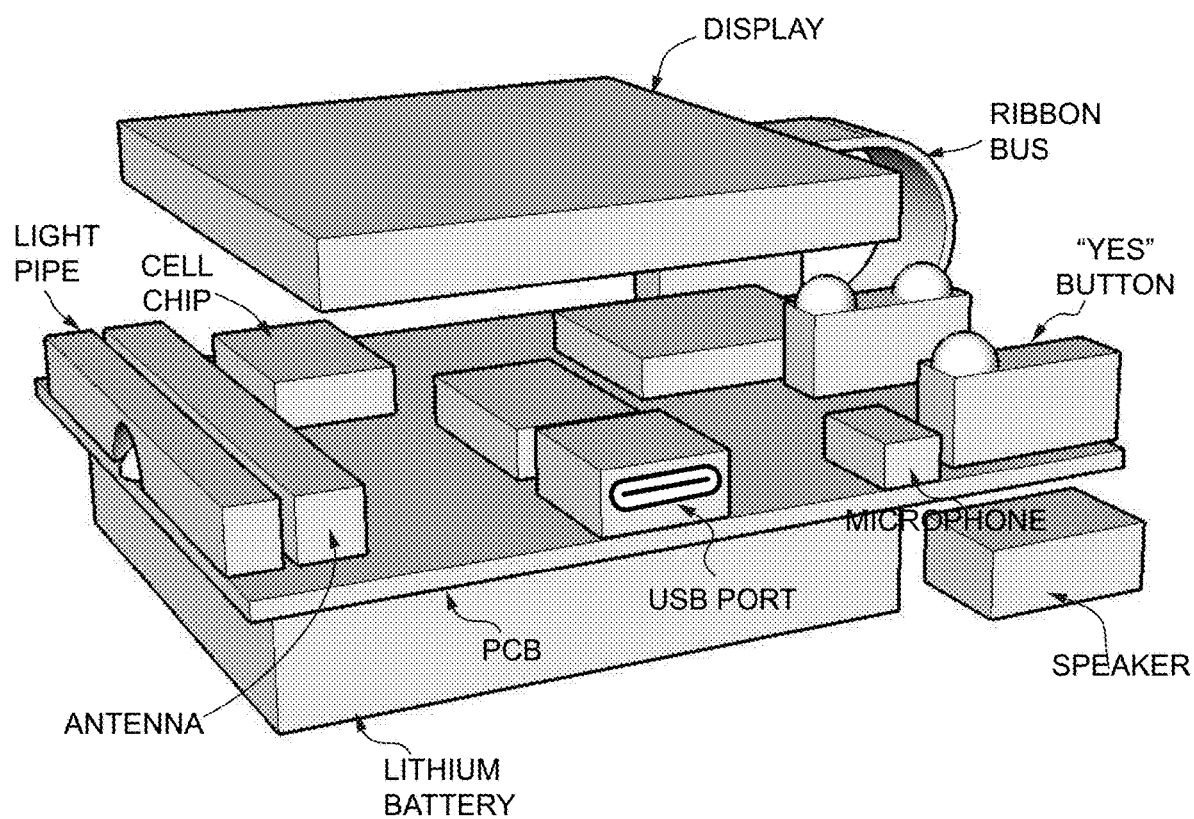
FIGS. 5A and 5B are block diagrams of the internal electronics of a first embodiment of the child minder device of FIGS. 2A-2E and 4A-4C, according to an embodiment.
Figure 5B:
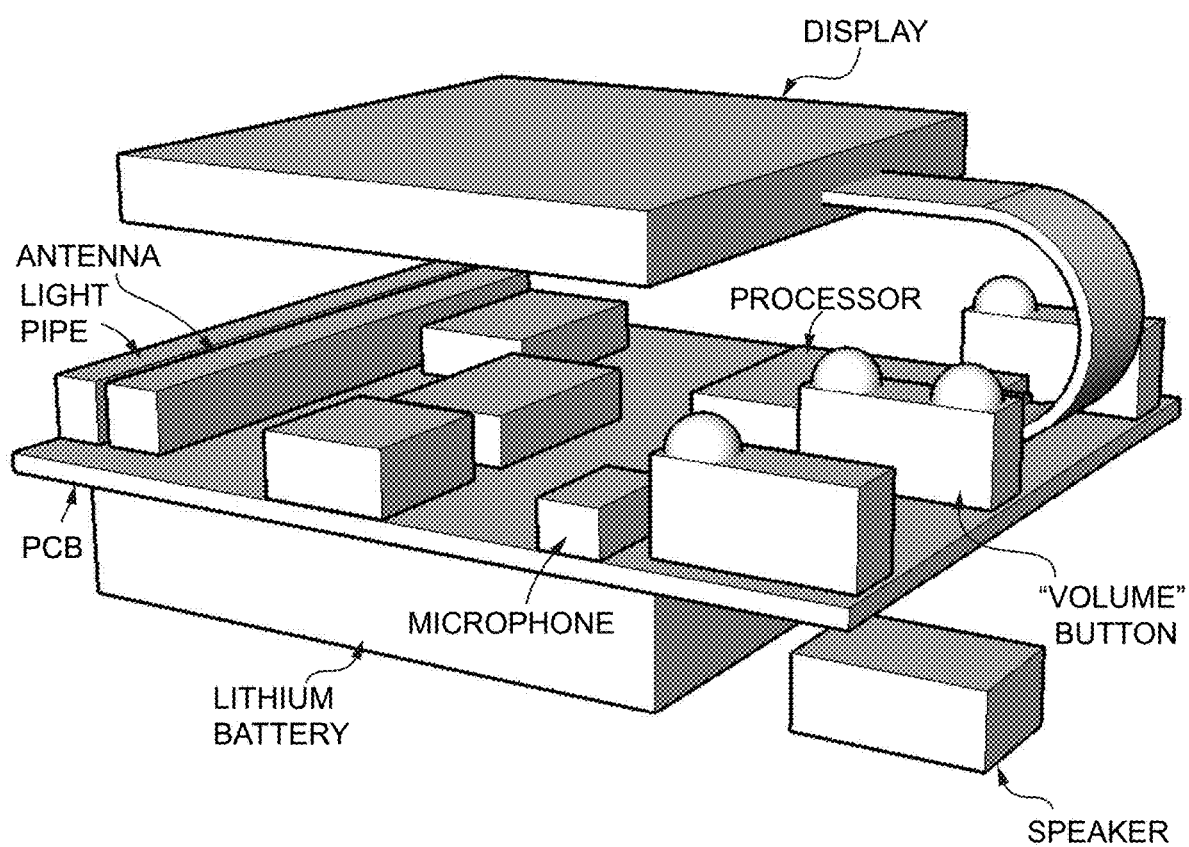

FIGS. 5A and 5B are block diagrams of the internal electronics of an embodiment of a child minder device 150. A circuit board has surface-mounted components that include a processor, RAM, ROM, clock and supporting logic circuitry, a battery, a microphone, at least one radio antenna, and two or three capacitive multifunction buttons designed to be operated through the housing. The microphone is optionally supplied with a DSP and vocoder for command recognition and noise cancelling, and can be used to allow a user to issue verbal commands to the child minder device. Similarly, the speaker can be configured to reproduce voice telecomm audio, can be configured to emit tones or beeps, and can be configured to make alarm notifications. The speaker also may be configured to play verbal messages relayed from the parent control device. The speaker is typically mounted on the housing so as to be a sealed unit as part of the housing wall and is wired to an internal printed circuit board (PCB).

The child minder device includes at least one of cellular, WiFi, and Bluetooth radio sets, and typically includes a GPS radio receiver. In an embodiment, a cellular radio chip is incorporated with compatible antenna strip. The cellular chip is configured to send and to receive audio messages that are recorded on the device or are received by the device and to send or to play the messages when the "YES" switch is pressed, for example. An optional GPS chip (not shown in FIGS. 5A-5B) and associated antenna may be configured for receiving GPS signals and calculating location of the child minder device and, therefore, location of a person or object to which the child minder device is attached.

Also shown is a display, such as an OLED display, for displaying a message received by, or programmed into, the child device. The display can be mounted to the PCB using a ribbon bus as shown or can be bayonet mounted onto the PCB. The array interfaces with the upper surface of the housing, which is translucent so that patterns lit up in the display are visible through the housing top cover. A light pipe with LED can be used to transilluminate a translucent logo patch in the housing and to confirm that the device is working.

In an embodiment, an RGB-LED is used to provide notifications via a light pipe. Both the color and the pulse pattern of the LED are programmable. In default mode, the RGB-LED may be coded to differentiate text and cellular mode and can also be used to aid in debugging software, for example. Programmed RGB-LED functions can include notifications of incoming radio traffic, including pending voice or text messages. The notifications that are color dependent also include context notifications such as warnings issued by the cloud host server based on other contemporaneous input to the system (for example a tornado warning). In this instance, the color bar, a buzzer, or the audio speaker (by a repeating verbal message) may be used to provide the warning. An RGB-LED also enables the user of the child minder device to select a favorite color using the VOLUME/CONTEXT multifunction switch.

The battery may be a lithium polymer battery or any other suitable battery. Selection is made so that the battery has sufficient power to handle cellular data and control transmissions and GPS location acquisition as well as less-energy-intensive housekeeping functions, message display, sensor monitoring, and routine data exchanges in background with an administrative server and the parent control device. As initially specified, in an embodiment the battery is capable of powering a child minder device for two weeks on a single full charge, but with experience has been found to be capable of powering a child minder device for two months or more or a single full charge. Furthermore, the battery may come already installed in the child minder device, or one may install the battery after purchasing, or otherwise acquiring, the child minder device.

Figure 5C:
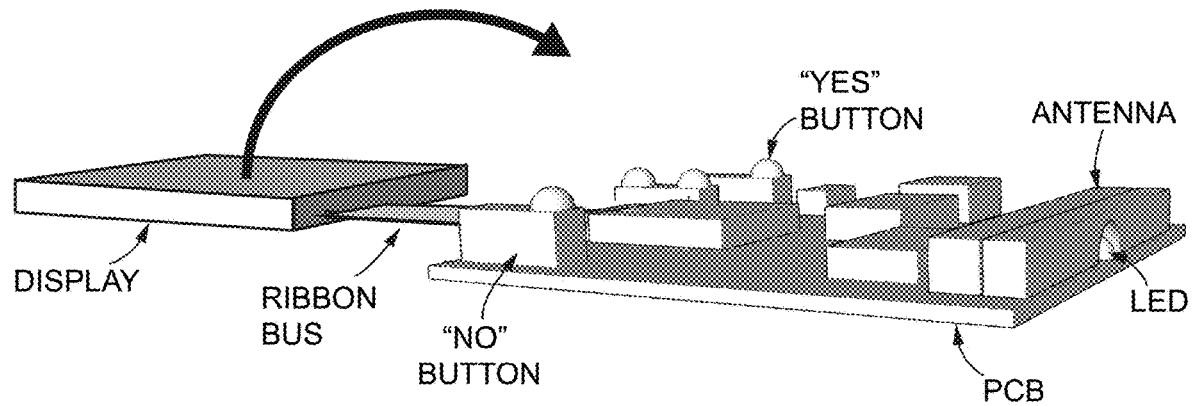
FIGS. 5C (before folding) and 5D (after folding) are views showing folding of the electronic components of the child minder device of FIGS. 2A-2E and 4A-4B as an assembly before insertion into the housing, according to an embodiment.
Figure 5D:
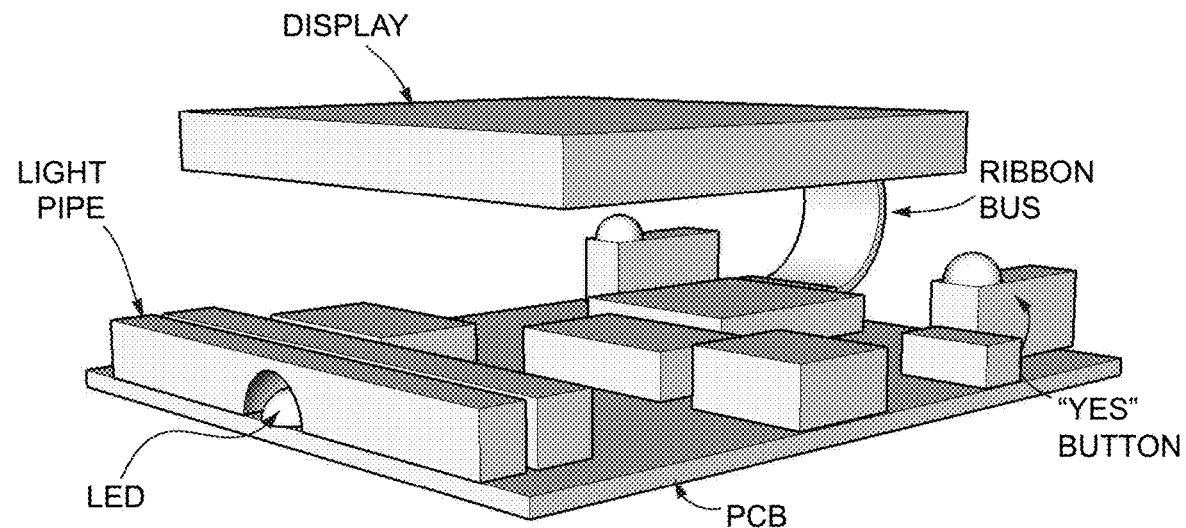

FIGS. 5C and 5D are CAD views showing folding of the electronic components of the child device 150 as an assembly before insertion into the housing, according to an embodiment. An alternate to the ribbon cable bus for attaching the display to the processor is a bayonet junction attachment. FIG. 6B shows the assembly in a folded configuration ready to be installed in the housing.

FIGS. 6A and 6B are plan views showing the circuit-board layout of an embodiment of a child minder device 150. In this layout view, the left panel is a top view of the PCB and the right panel is a bottom view of the PCB. The bottom of the PCB is used for battery and microphone attachment. The top of the PCB includes leads and solder pads for wire mounted surface components that are peripheral to the processor.

Device 150 includes the PCB and the display (e.g., an LED dot-matrix array) connected by a ribbon bus. When the display is folded over the PCB, the upper face is exposed and can be viewed through the translucent housing cover. Stand-off pins (not shown in FIGS. 6A-6B) may be used to support the display above the PCB.

Figure 7:
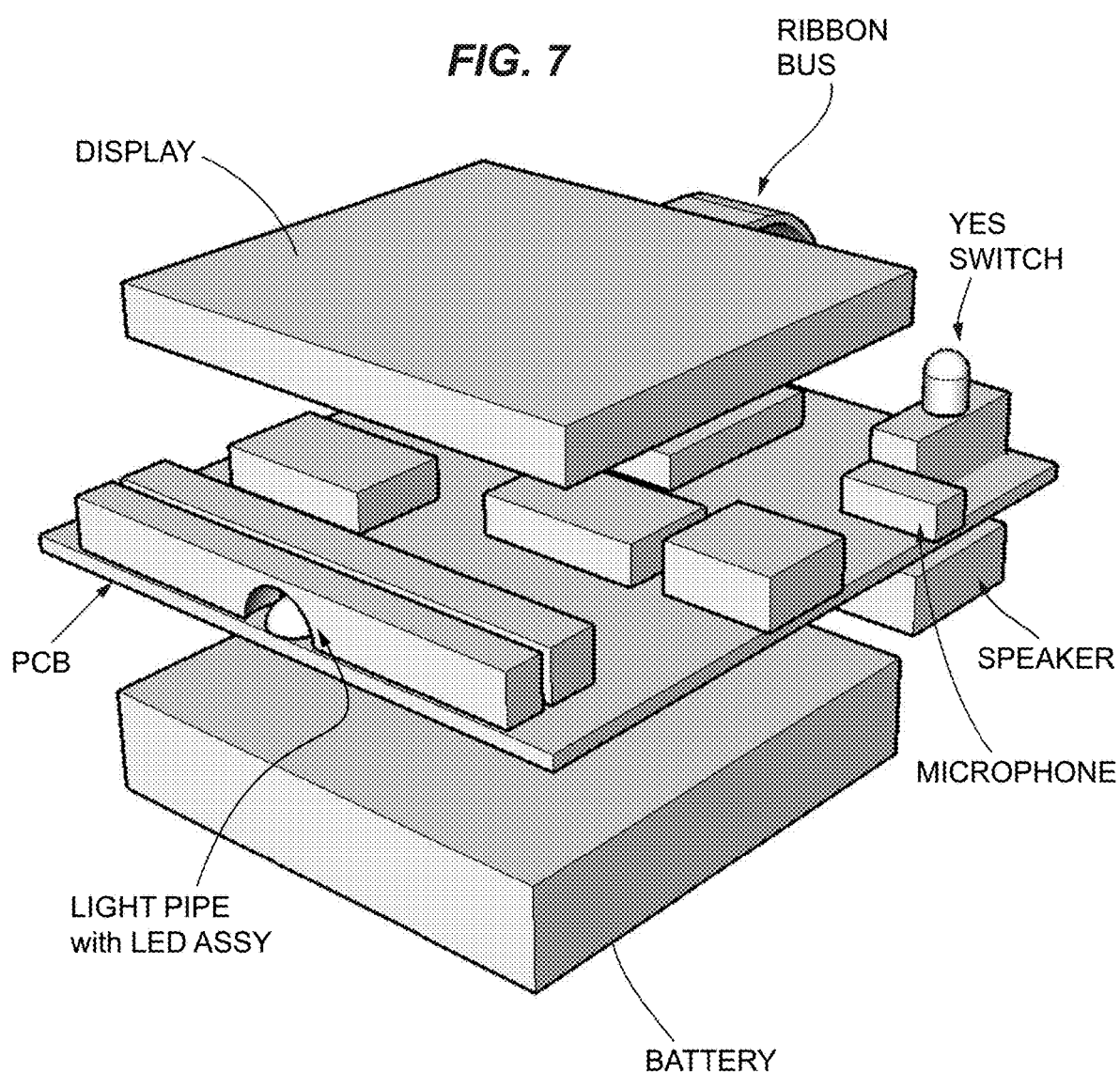
FIG. 7 is an exploded view of the battery separated from, and below, the PCB and the LED array folded per FIG. 5B, according to an embodiment.

FIG. 7 is an exploded view that shows the battery separated from and below the PCB and the display folded above the PCB in the child minder device, according to an embodiment. The display is supported on standoffs (not shown in FIG. 7) that hold it in place against the top undersurface of the housing and protect surface mounted components on the PCB. The battery includes electrical connections to the charger unit and is soldered to vias through the PCB. The speaker is mounted in the housing wall and is wired to the PCB before the two halves of the housing shell are fused together. The microphone is a surface mounted component.

FIGS. 8A and 8B are block diagrams of the electronic components shown in plan view of an alternate embodiment 200 of the child minder device. Two antennae are shown. The cellular antenna also may be compatible for receiving and sending WiFi signals. The Bluetooth antenna enables LAN connections and can be used during setup to pair the child minder device with a parent controller device such as a smartphone, for example. The child minder device 200 may incorporate interference-cancelling technology, which can be configured to allow antennae in user equipment such as the child minder device to both send and to receive at the same time. A GPS antenna also may be used and is sometimes integrated in a GPS chip that provides pre-packaged functionality.

In an embodiment, the processor and the display are connected by a ribbon bus disposed on one side of the PCB so as to avoid physical interference with the positions of the surface switches. The ribbon bus is positioned on the opposite side of the PCB from the speaker assembly. A GPS chip is shown between the switches and includes an internal antenna.

Figure 9A:
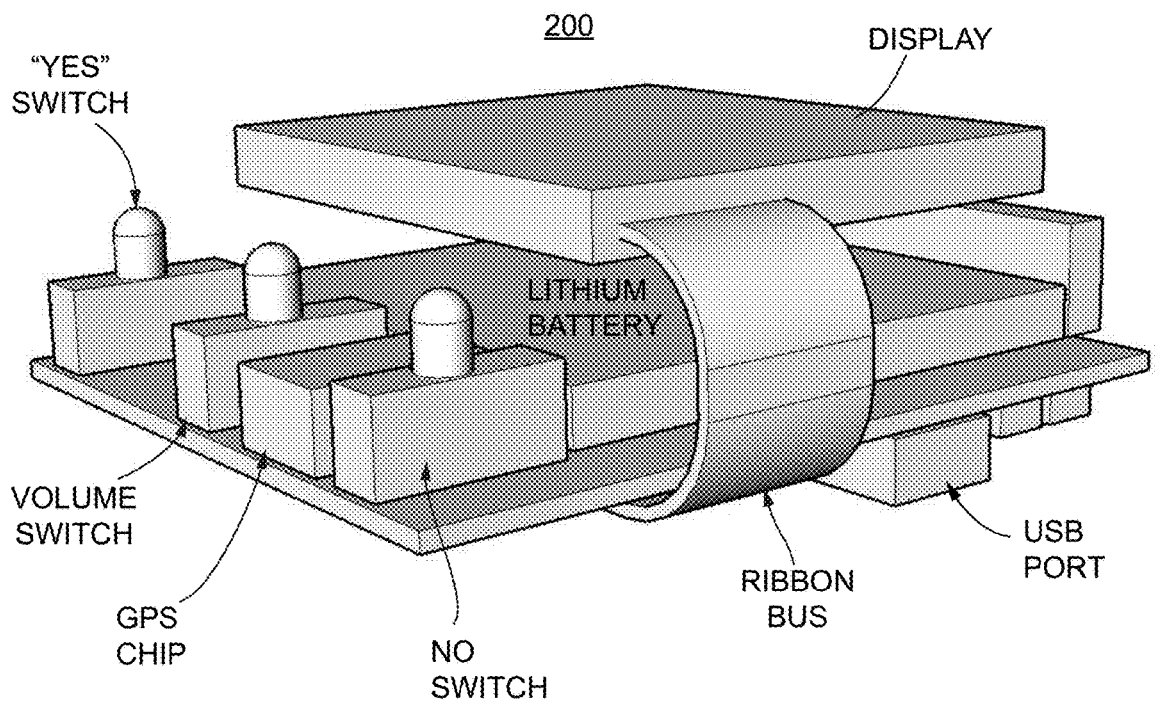
FIGS. 9A and 9B are perspective CAD views of the internal electronic components of the child device of FIGS. 8A-8B.
Figure 9B:
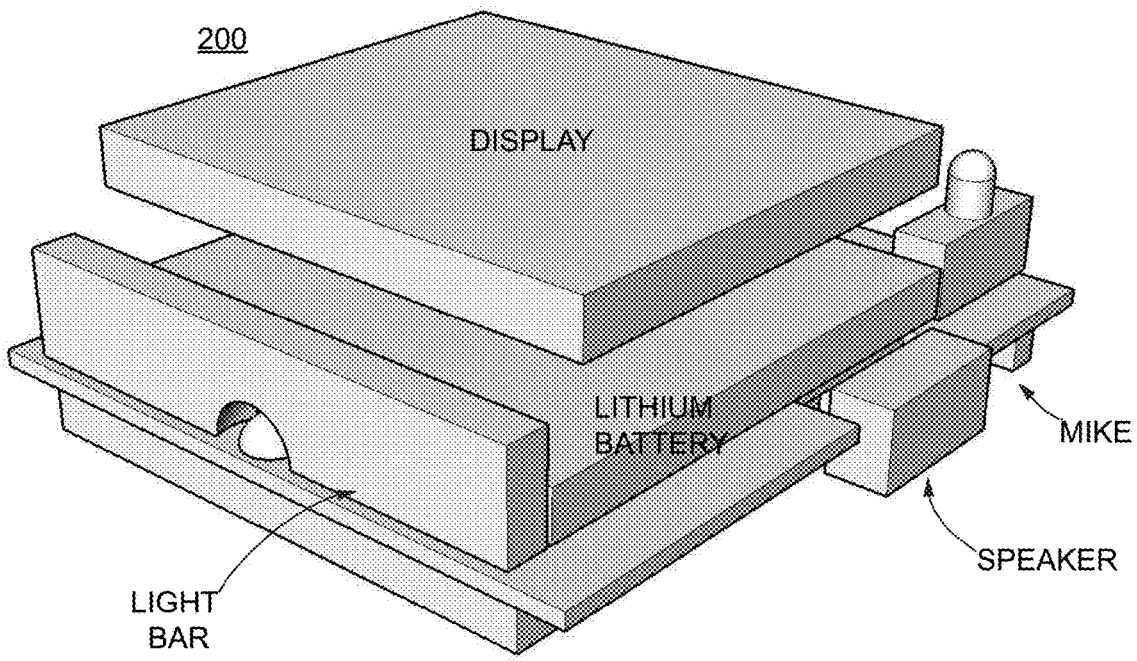

FIGS. 9A and 9B are perspective CAD views of alternate embodiment 200 of a child device, and show internal electronic components.

PCB surface-mounted components face the bottom of the device housing. The lithium battery is soldered onto the "back side" of the PCB along with the pressure (e.g., push-button) switches. The display, connected to the processor with a ribbon bus connector, is folded over the battery from the side. Rather than use the bottom end of the device for making the ribbon bus connection, the processor and display are mounted so that the bus is folded over the side of the PCB. In this way, three pressure switches and a GPS chip may be fitted on the bottom edge of the PCB.

Referencing FIG. 10A, the speaker and microphone of the child minder device 200 are disposed under the pressure switches, and the two antennae include a WiFi/BTLE combination antenna and a cellular antenna in close proximity to a cell radioset chip and the WiFi radioset chip. A light bar is used as before to transilluminate translucent features on the cover of the housing (not shown in FIG. 10A).

Also shown are two antennae: one antenna is configured as a cellular antenna and is adapted to the LTE-M radio protocol. The other antenna is used as a WiFi antenna but is also intended to serve as a BTLE radio-communications antenna if needed. Generally, these are supplied on the circuit board or may be built into the housing with bayonet mounts. While antennas may be suitable for multiple bands, up to three specialized antennae may be optimal, one for GPS, one for cellular, and one for WiFi or BTLE communications. Radioset chips are placed beneath the battery but the antenna strips are exposed to the sky at the edge of the PCB so that no or less loss of signal occurs due to the foil layers of the LiPo battery.

In an embodiment, the GPS chip is placed between two switches and has edge clearance from the battery (see FIG. 10C). Shadowing of incoming GPS signals by the metal of the battery is largely avoided in this layout. While component positioning on both sides of the PCB is more complex, an advantage is that the components face away from the battery and the battery is "sandwiched" between the display and the PCB. Standoffs are disposed between the display and the PCB and are used to ensure ventilation sufficient to dissipate heat generated by the child minder device during its operation.

FIG. 10B illustrates the lateral fold of the ribbon bus of the child minder device 200 relative to the USB port of the child device, according to an embodiment. Also visible in this view is the light-bar assembly with surface-mounted RGB-LED. By using a dark but translucent housing cover, light from the LED is diffused along the light bar and transilluminates a logo on the front of the housing. By varying the color and pulse pattern of the LED, the experienced user can be alerted to incoming messages, low battery, loss of GPS signal, and other warning or notification conditions. Along the bottom left edge of the PCB in FIG. 10B are shown the Audio codex, vibrator driver, piezo vibrator, and accelerometer. The speaker and microphone abut the bottom right edge of the PCB in this view.

FIG. 10C illustrates three pressure switches of the child minder device 200 mounted so that pressure on the outside top housing sends a bit to the processor and actuates program-defined functionalities, according to an embodiment. Each pressure switch is operatively responsive to a thumb or finger pressure on the top cover of the housing. These components are also visible on the left upper edge in FIG. 10A.

In an embodiment of a text mode, three buttons respectively provide for a "YES" response to a question sent by text where a response is required, a "NO" response to a question, and a shortcut to a panic call for help to a designated responder.

In an embodiment of a cellular mode, the buttons are shortcuts and replace a dial pad for calling at least one designated telephone number associated with the parent controller (e.g., smart) device. Each button may be coded to call a designated responder, whether this be a parent of a child user of the child minder device, a group leader, a medical professional, or a civil authority. The child minder device is not intended to be a telephone and hence is not provided with a keypad for making miscellaneous calls, but is intended to support a closely integrated network of child-device users including children, travel companions, group members with a head of a family, a group leader, tour leader, or a responsible party, such as a nurse accompanying patients on an outing or a teacher escorting students for a day at the museum. In this way, misuse of the child minder devices for general texting, social networking, accessing the internet, and so forth, is avoided and power consumption can be limited so that the uses of the child minder device are enabled for extended periods of time between battery recharges.

Center button marked "VOLUME" may have one or more functions depending on context. In ordinary use, the VOLUME button controls speaker audio volume and can be toggled so as to increase or decrease the volume of sound generated by the speaker. In other uses, the volume button can be used to play or record voice messages, for example.

The three pressure-switch assemblies are accessible on the front panel immediately below the display so that a text message can be scrolled from right to left while operating the YES, CONTEXT, and NO switches as thumb "buttons". YES indicates an affirmative response to a text query; NO is either a denial or a refusal and can be used, for example, to indicate that a task has not yet been completed, arrival has been delayed, or the train has not boarded yet, all by context. In some instances, a text message and an audio message may be synchronized by actuating a PLAY function.

Also shown is a light bar (also termed a "light pipe") of transparent plastic designed to distribute light from LED up and down the top surface of the light bar. The LED light transilluminates a logo on the top face of the housing but in some instances, an RGB-LED is used to allow for greater use in coding information. Both the color and the pulse pattern of the LEDs are programmable. In default mode, the LED may be coded to differentiate text and cellular mode and can also be used to aid in debugging software, for example. Programmed LED functions can include notifications of incoming radio traffic, including pending voice or text messages.

A buzzer also may be used for notification of incoming radio traffic. The combination of a light and a buzzer is also useful in executing a "FIND MINDER" function in which a smart device is used to activate the LED and buzzer so as to help a user find the child minder device when in range of the user's (or another searcher's) sight or hearing.

FIG. 10C is drawn so as to illustrate a speaker component of a child minder device 200, the speaker component being wired to the PCB and mounted on the interior wall of the housing shell (not shown in FIG. 10C). A cutout in the PCB receives the speaker assembly. By mounting the speaker on the housing, the speaker is acoustically linked to the dampening mass of the housing, like a soundbox, and has a more lifelike voice quality with better reproduction of longer frequencies in the voice range. The microphone is a surface mounted component and is positioned so that when the child minder device is held, sound enters the microphone port and actuates the pickup microphone inside. A DSP and/or a vocoder may be used in alternate embodiments to recognize a voice command or to digitize speech in preparation for encoding it by the audio codec.

FIGS. 11A, 11B, 11C, 11D and 11E illustrate an embodiment 1100 of a child minder device. The features of this layout correspond generally to the schematic shown in FIG. 2 and are assembly views of the internal components. For clarity, the housing shell is not shown.

By placing the battery on the bottom of the stack, with the PCB sandwiched between the battery and the display screen (e.g., an LED or an OLED display screen), the housing can be used as a heat sink to dissipate battery heat while the battery is charging or recharging. Also, few or no solder joints are used on the bottom of the PCB except possibly for the battery, which can be bayonet-pin mounted for simple assembly (see FIG. 11B). The cell antenna is mounted at the top end of the PCB near the cell radioset chip; the GPS antenna mounted at the bottom end near the GPS chip.

A ribbon bus is again used to join the controller to the display, but a bayonet-pin junction also may be used and with suitable standoffs may help stabilize the display inside the housing. However, if the display is affixed to the top half case of the housing, then the flexibility of the ribbon bus offers a straightforward assembly by folding the top half case (not shown in FIGS. 11A-11E) over the PCB and seating it on the bottom half case prior to sonic welding. The standoffs useful in creating a solid assembly are designed to ensure adequate heat ventilation and dimensional stability.

Use of audio SNS messaging rather than a live VOIP telephone call renders radio-reception quality generally sufficient and allows for a confirmation to be sent when the message is delivered. In contrast, a telephone call that is not answered would raise concerns and might be due to poor reception in a building, in a dead spot in cellular coverage, or a dropped call at peak traffic hours when some calls do not get through. By placing the time and place of playback under control of the child minder device, a stored audio string in RAM also enables the user of the child minder device to replay the message as many times as needed to get the complete meaning, for example a list of directions to get from point A to point B can be accessed one step at a time, rather than requiring multiple phone calls. Also, the SNS audio message may be sent to multiple recipients with a single action, eliminating the need for multiple telephone calls or for conference calling. A parent may designate an alternate telephone number to receive messages and to mind a child so as to better juggle other life responsibilities, for example.

In one embodiment, the child minder device sends a signal to the parent controller device when the audio message is played, and for text messages, the message is displayed or scrolled immediately and a response in the form of a button press is made to stop the message display.

Text messages are sent from the parent controller (smart) device to the child minder device and are displayed on the display, either as a fixed character set for a short message, symbol or direction, or as a scrolling message that can be repeated. Simple emojis also can be sent. Each message is sent with the expectation of a response from the child minder device affirming that the message has been received and understood by the possessor of the child device. In some instances, more detailed queries can necessitate YES or NO responses. The question, "Where are you?" may not be necessary because the parent device can map the location of the child device, but the question, "Are you on the way home?" can be answered YES or NO.

At the child minder device end, the text message may be phrased as a command or a query and the child device is set up to make a "YES" or a "NO" reply. By responding in the affirmative, the user of the child minder assents to a direction or answers a question affirmatively. By responding in the negative, the response indicates a declination or refusal and answers the question in the negative. For SMS, a confirmation is sent to the parent device when the text message is delivered.

Multiple messages can be conveyed to the child device, and, if needed, an audio message can be sent so as to clarify the response. Because each message includes time and location stamps, the parent device can construct a map showing current location and a history of "breadcrumbs" that show recent locations. A future location and time of arrival also can be projected or a waypoint can be established and progress of the child minder device toward the waypoint can be monitored. If needed, an audio message can be sent from the parent device that provides a verbal instruction detailing how to get to the next map waypoint or where to be for a meeting, for example.

Procedures are set up for handling non-replies. AI may be used to recognize and respond in situations where the non-response can be explained, such as if the child device is in a cell location with known bad coverage, or at a stadium or crowd where cell interference is overwhelming the signal, for example. The administrative host can compare a predicted or preset schedule with places and activities as they actually occur, and can flag events and missed events (e.g., absence from school or an after-school child-care facility) that are outside of an envelope of reasonable expectation. The system will issue notifications to responsible parties (e.g., a parent) if there is a discrepancy.

In more advanced devices, a CCD camera is incorporated into the housing and the display is replaced with a moderate-pixel-density video screen so as to permit teleconferencing.

FIG. 12A is a flow chart of a method for operating an embodiment of the above-described system, according to an embodiment. The initial setup 1201 is relatively easy. Each child minder device is provided with a QR code label on the housing and scanning the code with a smart device intended as a parent device (once the needed software is installed on the smart device) causes a folder to be created and takes the user to a menu for assigning the child device to a particular person (such as a child, travelling companion or friend designated as an addressee and respondent associated with a particular device) and entering any context or relevant background such as a profile, an appointment list, a calendar, a schedule of regular destinations and time brackets for each, and so forth. Once programmed, the parent smart device can direct text messages and send audio messages to the child minder device. The parent smart device also can display a map showing the current location of the child minder device and any direction of movement if the circuit in the device includes an accelerometer.

Once the child minder device is registered with one or more parent smart devices, the battery is topped up (e.g., by connecting the USB port of the child minder device to another device configured to charge the battery of the child minder device) and the devices are distributed to individuals 1202 who will be electronically tethered to the parent devices via the respective child minder devices, which are provided with means to be worn on a wrist or a belt, or can be put in a pocket.

On the parent smart device, a screen displays a selection of shortcuts for contacting any one of the tethered individuals or for contacting groups in a shared message or conference call. A message pad can be used to text any one of the registered parent smart devices and the text message will be received and displayed 1204 on the child-device display. Responding to the message is limited to a YES or NO reply.

Messages received by the electronic tether (child minder) device are placed in a queue and can be called up for display one at a time. A voice synthesizer may also be used to render messages. The recipient of the messages can go through the list, responding YES or NO to each. By clicking the NO button, e.g., three times, the message in queue is discarded. The buttons may be used to execute a variety of other simple functions. By holding the NO button, the screen is powered down. Other control means such as commands given by haptic gestures may also be supported.

The child minder device may also initiate a message 1206. The child minder device can record, and send to the parent controller device, one or more audio messages. The buttons may be programmed to start and end a recording. Because the message can be sent only to one or more predetermined addressees, a SEND command is a simple button press. This can be termed an SNS audio message that is routed over the software-defined virtual network operated by the cloud host to the parent controller device(s).

A parent controller device also can access location information corresponding to the child minder device, including current location, past location, and one or more sensors on the child device may provide, to the parent device, velocity of the child device. A current location or a location history can be displayed 1208 on the parent device screen. The screen may also show a confirmation of delivery of a message to a child minder device. On the child device, an LED, vibrator, or buzzer will indicate that a message is in queue 2010. Such a notification also may be provided for text messages in queue, and can be cleared, for example, by opening the message and responding.

If the child device is not responsive 1212, the user of the parent device may escalate by sending a status query, for example, "Are you OK?" Other tools enable the user of the parent device to take action such as by contacting an alternative device, and that failing, a cloud host server may be tasked to find a suitable civil authority and to initiate a contact. The cloud host server will generally have the identification of the person to whom the child minder device corresponds, current location and direction of motion of the child device, and access to a description of the nature of the incident from, for example, a newsfeed. The "no response" status will be displayed on the parent device with time and last-known location of the child minder device. The cloud host may also include algorithms for assessing threat conditions as would be indicated by police or fire activity in proximity to the child device location, and may assist in placing a call to authorities, for example, if the parent device receives no response from the child device.

These steps may be iterated until a confirmatory response is obtained from the user of the child minder device. The parent-device-child-device link also allows users to exchange information about activities, changes in schedule, questions about directions, instructions on where to meet, and so forth. The audio messaging is bidirectional and can be a conversation if a series of messages are sent and responded to. Either the parent device or the child device may initiate a conversation using the SNS audio messaging. Text messaging to the child device may also be used to alert or remind the user of upcoming events. In some instances, this function is handled automatically by the system once a daily calendar is entered by the parent smart device.

The system and network combine data that would not generally be included in a conventional telephone call from a conventional smartphone and the parent user can easily switch from message view to map view or use a split window to see both the reply and the message location contents. Thus, the parent device is enabled to monitor, via the child device, the status and location of the user to which the child device is attached throughout the day and to make contact 2014 with the user if needed.

Background housekeeping functions, messaging, sensor monitoring, and routine data exchanges with an administrative server or other members of the group can include location breadcrumbs logged with timestamps, any significant radio traffic picked up by the child device radios (such as police and fire dispatch), vehicle on-board-diagnostic (OBD) codes, the latest on flight delays or arrivals, reminders about events on a group calendar, and so forth. Location, sensor data, time and other data associated with a message serve as logic conditions ("relevant background") so that responses and any system or device actions that are triggered by the message can be made conditional on one or more of the logic conditions, a valuable step in building intelligence to assess context into the message. In one instance, context is not only in the message as received, but is also in other data accessible by the network server or the parent device. In an example, police activity in an area near the child's last known location or associated with a school expected to be open and in session at the time the child is typically in school, are used to make smart notifications. In another instance, meteorological data in real time advises the decision process. In yet another instance, radio traffic accessible around the child device, or vehicle traffic density as known to the system via Google or other smart network components, can also be used to modify the decision processing in handling any message. What components of a device that are to be actuated, for example, can be judged by the system using AI capacity and relayed to the device at one, both, or all nodes of a child network, including associated child devices and associated or paired parent devices. Generally, the network will be synchronized with the new information so that all devices associated with the child network (such as desktop calendars and partner device for example) are synchronized for location, sensor output, and event data including any message contents exchanged and any executable as ordered by a parent device.

In sleep mode, some background functionality remains alert. The child device returns to sleep mode between tasks and may put inactive electronic components (or inactive portions of such components) or sub-functions to sleep while other electronic components and sub-functions remain active. To save power, a child minder device can check an A-GPS location only every relatively long interval, e.g., 30 min, unless a server query is received.

FIG. 12B is an alternative or optional flow chart showing an automated tracking and monitoring system with parent device notification as an option. Status of the child minder device, or of a person associated with the child minder device, is monitored with periodic updates 1220. Notifications can be sent to all child devices as reminders or as alerts if a hazard is detected that could necessitate a change of plans. If so, the parent smart device can contact 1222 the child minder device by text or by audio messaging. If the reply is an affirmation, then the process can be iterated. If there is a declination, or if there is no response, a different process is triggered.

For example, the flow chart addresses a "non-reply" event or unacceptable reply. If the user of the child device does not provide a satisfactory explanation 1224, and the user of the parent device is distracted or does not follow up on a non-response, the system may have some level of decision-making authority, e.g., a permission, to "intervene" if the situation is critical, such as if a hazardous situation develops proximate to the location of a child device. The intervention 1226 may include summoning help and updating the parent device as the response is escalated, or when a resolution is found. In iterations, the system will handle routine reminders and make special reminders if an unexpected event or a lack of response is detected.

FIG. 12C is an alternate embodiment in which the flow chart addresses questions about a "non-reply" event and depicts use of an "AI-enhanced system" to track and monitor a child-device location and status in a context of proximate events monitored by the system. The initial iteration may be by routine text messaging and archiving of child-device location 1230. A second iteration may involve audio messaging 1232. If an affirmation of status is received from the child minder device, the process of monitoring resets and continues. If a child minder device is in a safe location and no threat to a person associated with the child minder device is detected, then the system may limit its queries until a location change is detected using A-GPS, radio triangulation, or radio beacon contacts.

Conditions geographically local to a child device are also monitored 1234 using a range of data available to the system. The AI-enhanced system is able to intervene if a hazardous situation develops at a location proximate to the child device. The AI-enhanced system also is able to talk to the child device using the audio messaging and also to message the parent device, for example, if there is a non-reply or the reply is unacceptable for one reason or another. The system also can generate a robocall, for example, to a parent or to local resources such as school personnel, or friends in the area; the call requesting a wellness check, or if the situation is judged from context (in the event the system has access to parallel current events, local news, meteorology, and other data streams, for example) to be urgent and the user of the parent device is unresponsive, then to summon assistance 1236 to the last known location of the child device. In other words, the AI can act in loco parentis when a situation warrants intervention. A non-reply event can be escalated in priority and resource allocation according to conditions external to the child minder device but accessible by the system, such that false alarms are more readily differentiated from intervention-necessitating actions. While the parent has control, the system can forward a summons to 1236 third-party and emergency responders if the situation, actual or incipient, merits an escalation of efforts to physically get to the child-device user. The decision to summon local assistance can be followed by analysis of the response efforts and continued intervention to notify the parents or to continue location mapping and sensor monitoring for added execution of functions within the systems' arsenal of responses, where the system is taken as a whole. Alternatively, a query can be repeated at defined intervals 1238 until a response is obtained from a targeted child device. Thus, the process described by the flow chart may be part of a larger iterative process.

FIG. 13 is a view of a system 1300 at a point during operation of the system, and showing a parent smartphone device 1302 of a parent network 1301 and three tethered child electronic devices at locations A, B, C (1320a, 1320b, 1320c) of a child network 1321, each device carried or worn by a family member or guest member of the private communications system. Although the communications link between parent device and child devices is shown to be a cellular network as indicated by cellular towers 1322a, 1322b, other suitable wireless communications links include a WiFi network, a Bluetooth network, or a combination of two or more radio types.

By including a USB port on the child device (FIG. 2), in special circumstances, a wired link can be made between the child device and the cloud host server. However, this is typically for the purpose of downloading updated instructions, BIOS firmware, or programming, and is not typically used in routine communications. The USB port serves a primary purpose of recharging the battery of the child device as described earlier.

Child network 1321 may be termed a radial cellular network because each child device is linked to a central cloud host server 1000 in a network structure abstracted as spokes on a wheel. Specifically, in some embodiments, cellular child-to-child communication is not enabled. The programming in the child device includes a specific list of allowed contacts and the child devices are dedicated to dial those contacts and are restricted from making promiscuous contacts such as is possible with the freedom of a telephone equipped with dial pad. The child device includes no dial pad. The system is intended as a private communications network and hence is restricted to selected functions consistent with its operation. Voice communications on the network are digitized and vocoded for sending as packet data and text messaging to a child device, (not from a child device), again to save energy, to eliminate the need for a keypad or keyboard, and to discourage unintended uses by a user of the child device, for example, web browsing. In one embodiment, the child device is accessible by and from only a single parent device or a few parent devices of a shared parent control network.

In other embodiments, child minder devices may be provided with Bluetooth BTLE radiosets, and in addition to forwarding sensor data and beacon contacts to the cloud host, the child devices can form a mesh network. This is useful where members of a group are staying together and are expected to remain in BTLE radio proximity (i.e., a radius of anywhere from 100 ft to 1000 ft, for example). The child devices may emit a notification if one or more members of the group drop out of radio contact.

Communications between the child devices and the cloud host server are dependent on distances between each pair of child devices and between each child device and a cell tower or antenna unit, for example, and may require an intermediate wireless carrier 1301a. To save power, BTLE transmissions as a microLAN can be used when one or more of the child devices are in close proximity to a BTLE repeater (such as a cellphone or a home hub). At longer distances, WiFi may be useful for child-minder tracking, and provision is made for accessing wireless hotspots. When out of range for WiFi or Bluetooth radio, a child device makes contact to one or more corresponding parent devices through a cellular network. While cellular communications can be energy intensive, energy consumption can be managed to compress messages for parsimonious communication and only when needed. Generally, also to save energy, most routing messaging will be initiated from the parent device 1302 and will be in the form of a question. Using the buttons on the front panel of the child device, the person using the child device will be able to answer with a simple YES or NO, so as to reduce data load on the outgoing antenna to a simple bit frame or packet.

Smart device 1302, as the parent node or device, has a broad range of communications capability. The capacity to communicate to cloud host server 1000 is not limited to one radio type, and may include any one or combination of WiFi, Bluetooth, Cellular or even NFC radio types. In some instances, a wired link is available, as may include a USB link, a CATS Ethernet link, a Lightening link, a Thunderbolt dock, or another proprietary data link such as may be enabled on IOS or Android smart phones.

Also compatible with the child and parent devices and networks are 5G, NB2-IOT and CAT-MI systems and protocols. Voice-enabled systems are also anticipated, in which AI web services are used to link the devices and networks with capacity to converse and to make and receive telephone calls.

System 1300 is a private network designed to assist a parent smart device forming, or otherwise occupying, a parent node in minding one or more child devices at child nodes in the network. The cloud host server is accessed by the parent and child devices to exchange messages. The parent device plays a key role in setting up the private network once the appropriate software is installed on the parent device. Some services are included with the child devices. Typically, a CD or download link is provided when one or more child devices are purchased. Basic services may include location tracking and display and an emergency button for calling assistance (i.e., a panic button). Other "network services" or "cloud host services" may be made available by subscription after a parent account is set up with the cloud host administrative server 1000. Subscription services may include two-way voice messaging, text messaging, and reminder service, daily calendar, and radio contact archiving, for example. Radio contact archiving refers to a feature in which any radio contacts encountered by the child device are stored with a timestamp and geostamp. Recurrent radio contacts can be analyzed for patterns or flagged for law enforcement identification. Known friends and associates can be automatically removed from the analysis. Other services include current-events status reporting and actions, such as AI applications in which proximity to developing events such as fire, shooting, or police activity are considered and recommendations are made to either the parent or directly to the child in loco parentis by the cloud host administrative server.

FIG. 14 is view of a general system 1400 in which the communications link between parent device and child devices is an Internet-enabled private wireless network with cloud host server 1000. System 1400 is the combination or union of a child- and a parent-controller network enabled by software 1461 installed on the parent smart device 1460.

In this instance, child devices 1450a and 1450b are communicating with the cloud server and parent device 1460 via WiFi links 1451a, 1451b, and child device 1450c, at a longer distance the WiFi access point, is communication with the cloud server and the parent device over a cellular link 1451c.

The program 1461 installed on the parent smartphone device 1460 also has routines that can facilitate setup of the smartphone. For example, the phone 1460 can scan a QR code on a child minder device 1450 before giving the child minder device to a person such as a child or group member. The phone 1460 stores the child's information, a UID that is transmitted by the child device for WiFi, BTLE or Cellular messaging in a folder, and can look up the identifying information whenever any message is received. The folder also can include preferences and permissions, including any special instructions specific to an individual to which a corresponding child device is assigned. The data is stored in some instances on the parent device 1460, but backup data and related data may also be stored in one or more databases 1002 accessible by the cloud server software engine 1001.

FIG. 15 is a view of a system 1500 (incorporating the components outlined in FIG. 14) as part of a new kind of "neighborhood environment network" (NEN) in which a cloud host server can forward location information from a child minder device to a parent smart device for display superimposed on a map image that may also contain other information from an IoT or a newsfeed, according to an embodiment. Using maps in memory or downloaded from the cloud, the respective locations A and B (map pins) of child devices 1570a and 1570b can be represented on a map display on parent smart device 1561. While this instance represents a family group, the concept can be extended to other groups ranging from tour groups to a group of first responders.

Location and timestamp information is regularly (e.g., periodically, randomly) transmitted 1571a, 1571b from the child devices to a central cloud host server 1000, in this case via a cellular network 1572 transmitting 1572a to a cloud receiver. The transmissions forwarded to a cloud host server 1000 are then parsed and rebroadcast 1574 to the designated parent smart device 1561. In this way, the child locations A, B can be superimposed on a neighborhood area display along with direction of travel and any waypoints in memory. Thus, a path of the child device through the neighborhood is accessible. Using other information such as distance, bus schedules, traffic, and so forth, the cloud server or the parent device can estimate time of arrival at the parent-node location. The neighborhood area also can be monitored for current events, weather, and for broadcasts from other radio devices, including radio traffic intensity generally and other indicia, as contextual conditions for system-level decision making and notifications (see below).

Programming in the central hub (parent) smartphone is executed to construct a graphical overlay of a map of the city or region along with the latest position data of the two children, Zoey (A) and Joey (B), so that Mom and Dad can "see" the geographical locations of Zoey and Joey. The cloud server or the parent phone 1561 also can indicate any vectors of motion of the child devices, and thus, of Zoey and Joey, on the map. In fact, with a press of a button, the breadcrumbs and timestamps stored in background (on a memory of the parent device) can be added to the plot so that the parents can see where the kids have been, i.e., can follow their trails back through time. This can be valuable as a tracker if something is lost or dropped along the way. The capacity to see the real-time position is also valuable in finding and in getting help to the child or children quickly if needed. A simple question, "Are you headed home," can be answered by the child Joey by pressing the YES or NO button. "Did you stop at the store to get groceries?" directed at Zoey also is easily answered by a button push. So, the parent and child devices find many uses in daily living.

The cloud server also can be used to add context relevant to a neighborhood or location. Cloud host servers can scan for relevant radio and news traffic in order to capture relevant information. A shooting, a school lockdown, a housefire on the child's route home, an Amber alert, all sorts of information of immediate relevance can be harvested and brought to the parent's attention via the displayed map. The parent then can offer simple directions so that the child can avoid any developing situation. In one instance, for more streetwise children, the parent can send a map with an alternate route marked for the child to take. For younger kids, the parent can send instructions for the child to wait in a safe place while he/she comes to pick up the child.

Sensor data can be shared with an administrative server for use in aggregating a composite map of the local environment and has found application in a wide variety of "crowdsourced functions" such as weather mapping, traffic mapping, hazard anticipation, alerts directed at events of general interest and local historical significance, and so forth.

The form factor may be modified during manufacturing to suit conditions specific to an application. In an embodiment, slots or ring mounts are provided in the housing to receive fasteners for securing the child devices to a limb, around the waist, on the neck, as a wrist strap or headband, over an ear, by a carabineer, and so forth.

FIG. 16A, is a view of a strap (such as a wristband or collar) for attachment by which a child device 1600 is secured to, or carried on, a person (e.g., a child, a member of a group), an animal, or an object, according to an embodiment.

FIGS. 16B and 16C are cross-section views showing an antenna structure internal to a strap, according to the strap of FIG. 16A, according to an embodiment. In FIG. 16B, the wrist strap 1610 is made with an embedded antenna 1612 (section plane A). The embedded antenna either can be pinned to the circuit board with leads during assembly or the strap can be inductively or capacitively coupled to a smaller antenna on the circuit board. A flexible antenna of this kind may be made by embedding a conductive powder in a silastic matrix or by using a conductive polymer, of which many are known. The antenna may also be made of a metal powder embedded in a conductive polymer. Impedance of the antenna is determined according to conventional antenna design techniques. The outer silastic layer may be configured to accept the child minder device in a fitted cup. The cup may include electrically conductive pads to complete a circuit from the antenna to the circuit board inside the child device.

Figure 16D:
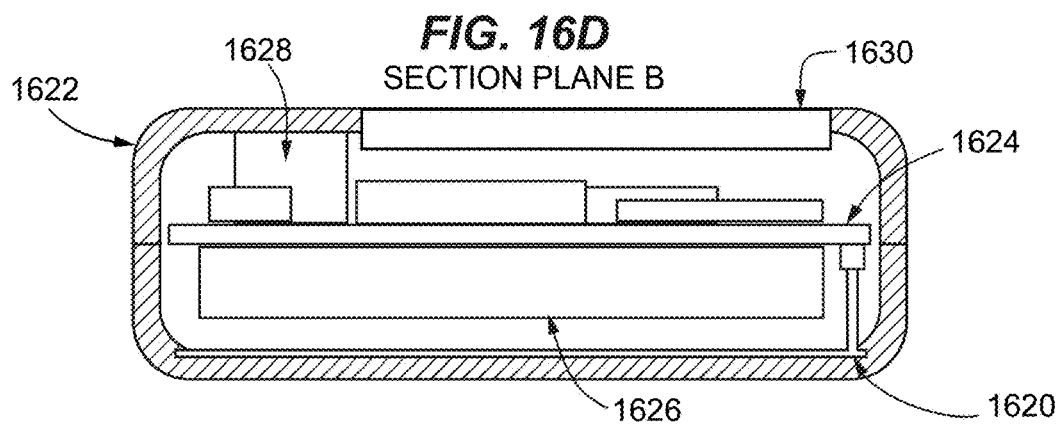

Alternatively, as shown in FIG. 16D, a metallic antenna 1620 may be embedded in or printed on the inside surface of one of the housing shell pieces. In this view, the clamshell housing 1622 is sectioned to show the antenna structure (section plane B). Pins are positioned to engage sockets on the circuit board 1624. Machine assembly properly aligns the halves of the housing, and once assembled, the seam between the two halves is ultrasonically welded closed so as to be water resistant. Also shown in section are a battery pack 1626, a representation of circuit components 1628, and a display module 1630 forming a part of the surface of the child device.

FIGS. 17A and 17B are views showing alternate means for attaching a child minder device to an individual's body or clothing so as to wear the device. Alternate accessory configurations for wearing an exemplary device 1600 include a loop 1702, and a lanyard 1704 respectively. Fixtures may be secured by VELCRO®, magnetically, or by clasps, or by any other suitable attachment apparatus or device. The mounting slots shown in earlier figures may be adapted for receiving straps that can be secured to a wrist, an ankle, a waist, a neck, without limitation. Or the child device can simply be placed in a pocket.

In an embodiment, the housing has dimensions of about 45×40 mm and is about 1 cm thick. It encloses a battery configured for extended use (weeks or months) between charging. Charging while in use or worn is also conceived, such as by charging from external electromagnetic fields or kinetic energy of the user's motion as known in the art.

FIG. 18 is a view of an alternate system (compared with FIG. 1) in which the child minder devices are Bluetooth enabled and are capable of forming a mesh network. The clocks of the child minder devices may be synchronized in a suitable manner to allow digital radio communication between the devices. The clock may be on local time or network time. In a cellular network, devices having cell radiosets typically use network time. Network time is often GPS time, and GPS transmissions may be used as a reference to set a network clock so that it is constant around the globe. Regardless, each base station or access point in the network enforces a cellular clock time on the user equipment in its domain by transmitting synchronization training codes and instructions for slot allocations. This is not unlike the Bluetooth radio domain in which a master/slave clock synchronization protocol is followed, except that Bluetooth devices are all enabled to be either master or slave depending on in which device the transmission thread is originated. But surprisingly, when the cellular radio network is overlaid on a Bluetooth network, the cellular network clock can be propagated through one or more child devices on a Bluetooth band with sufficient precision that a common rising edge of a pulse can be recognized in the combined signal (i.e., the transmitted signal is synchronized from two transmitters). While not "cloning" per se, several child minder devices can be caused to transmit an identical message in synchrony or using space-time coding. A synchronous transmission from multiple Bluetooth devices is like sending a message with an antenna array. A space-time coded message follows the principle first conceived by SM Alamouti in a paper titled "A simple transmit diversity technique for wireless communications" [IEEE J Select Areas in Comm. 16(8):1451-1458. Without being bound by theory, this enables multiple Bluetooth transmitters (i.e., multiple child minder devices, 1801) to be grouped in a local area served by a cell tower or access point so as to execute a simultaneous cellular transmission to the network. One of the BTLE devices will be synchronized with the cell protocols for transmitting in uplink slots. One BTLE transmitter sends the native message in its raw digital form (master); another transmitter sends an inverted wave using a synchronized clock (slave). In the first case, as received by the access point antenna, the result is an additive signal (with more power). But in cases where one or both signals are reflected off obstacles between the transmitting devices and the cellular receiver, significant improvement in error rate is achieved by an adaptation of the Alamouti technique. The Alamouti technique is to synchronize transmissions from otherwise independent local transmitters and to flip one of the signals in such a way that the receiver knows which signal is flipped. Conventionally, a dual antenna is used to send the signal and the two antennae are closely spaced. This is the basis of MIMO (multiple-input-multiple-output) radio art. As disclosed here, without use of MIMO antennae, Bluetooth-Cellular combined devices can be clocked to send synchronized signals, in which one signal may be flipped. The transmission can be decoded by the receiver even under conditions in which signals are bouncing off of and around obstacles (hence having different path lengths) and are weakened by attenuation and fade. This is useful because it is desirable to operate portable radios at very low transmit powers. Weak transmissions are error-prone, and any technique to increase fidelity of transmission has important implications for this kind of radio in developing IOT technologies and deployments. Use of two or more child minder devices as a dual transmitter with two physically separated antenna leads to improved signal decoding and reduces the need for calls to retransmit corrupted digital data, reducing network traffic load.

Of course, some radio systems rely on error-check bits to assess quality of transmission at the receiver, and provision is made for resending the message if it is not successfully captured. But by using Bluetooth to coordinate cellular transmissions, the range and fidelity of low power transmissions is extended by this technique. The ultimate goal is to field devices that have battery life measured in weeks or months and yet transmit effectively over an extended range of 100's of meters.

Example I

In an embodiment of a child minder device, the display is a color video display module 1630 so that video content can be received and displayed on the small screen. A camera and microphone are included to record mixed media with audio. One of the multifunction buttons is used to start and stop video recording. The duration of any recording is limited only by the availability of RAM memory capacity, which may increase as integration densities continue to increase. Multiple microphones and a DSP may be included to improve audio quality. The device also includes capacity for wireless software upgrades such as to a sound filter and a video filter.

Example II

Improvements of the child minder device include a touch-screen display, voice-command enablement, and reduced thickness. The system cloud host server is upgraded to include AI ("artificial intelligence") features that include the capability to broadly assess context with respect to time and place and to issue guidance based on that context. For example, police and emergency bands are monitored and situations (such as a tsunami alert or an incoming fire truck dispatched to the current location of the child minder) can be distilled into actionable information that is sent to the child device(s) and to the parent smart device(s). Alternatively, sensor information from the child network nodes can be sent to the broader network as part of sensor surveillance that is location mapped for a whole range of system processing. AI includes predictive analytics, machine learning, and intelligent applications.

In other instances, the cloud host server can forward or "synchronize" information received from one smartphone to another smartphone. A child device may communicate an update or a help request to a first parent smartphone. The cloud administrator has set up a rules-based system for responding to certain conditions. In one example, the immediate threat is a tornado warning. The cloud host server pushes this information onto the parent's smartphone and the parent sends an urgent notification or calls the children through their child devices, which may be in the tornado's path, advising them to shelter in place or to stay in the basement of the school building for example, rather than running for home.

Other examples are readily constructed, but the unexpected result is that the system includes events and data from IoT components in network listening range, but the IoT is no longer just for listening and reporting, now the system with IoT integration can be used to intercede in events, suggest solutions, and take action to shape outcomes for a safer future, improving the lives of parents, children and groups having common needs and shared connections.

Example III

Advanced software features are added, such as an activity tracking suite that includes motion tracking, sitting time, and fitness parameters such as respiration rate and pulse rate, all acquired from accelerometry data or from a pressure sensor engineered to detect a radial pulse when the child device is worn on a wrist. A package of sensor data output may be digitized to accompany a message and displayed on a parent device or on a display module of the device.

Example IV

A voice-actuated assistant is configured to communicate with parent control devices and child minder devices of a private network. Cloud resources may be accessed by the voice-actuated assistant, and as configured, the voice-actuated assistant may assist in making routine communications with the child device(s) and in resolving problems. When a private network encounters unexpected data, such as child device in location proximity to an active emergency, the private network cloud host may communicate notifications by SNS with the parent device(s) or communicate text instructions to the child device(s), and a voice-actuated assistant, either a smartphone or a voice-actuated interface with hardware such as Siri and Alexa (using iPad, iPhone, Echo or Dot hardware, for example) may be recruited into the network to contact the user of the parent device or the user of the child device as circumstances dictate. In emergency situations, such as a school shooting, the child device may display an instruction while the parent device [or a voice-actuated assistant] may display/announce a corresponding alert or verbalize (using a speaker in the smart device) a query to the "parent" user. In some instances, the parent device may be used as a telephone to initiate an interactive dialog between the network and the user in which the network updates the situation and requests instructions or offers assistance.

Example V

Voice quality in any digital transmission is dependent on sampling rate during the recording process. Vocoders have been refined to achieve acceptable voice quality at sampling rates of 8 to 15 KHz. This means that voice speech can be compressed and reconstructed at a receiver with a minimal amount of packet data. The MAC layer uses "dynamic allocation mode" to allocate time slots for sending and receiving data from and to the child device, assigning unused bandwidth as needed among multiple users. "Fixed allocation mode" is used in teleconferencing because of the need for dedicated streaming in full duplex, but this slows throughput of other traffic on the network. The "store-and-share" protocol used in the child device and parent device to exchange voice messages is combined with "extended dynamic allocation mode," which aggregates slots and extends the number of consecutive slots that can be allocated to each user. In the store-and-share protocol, dynamic allocation of slot mode is selected so that users can send voice phrases, and because of the reduced latency in 5G networks, the exchange becomes so fast that a normal conversation rate is approached. There is no background fill and no interrupting the other speaker (perhaps a good thing). By a parsimonious exchange of audio track messages, surprisingly, the user of the parent device may question the user of the child device, or vice versa, and give directions, discuss plans, and so forth. In an extended embodiment that incorporates a camera into the child device, video teleconferencing is achieved without the need for a dedicated fixed allocation of slots as now typical in LTE networks for video conferencing. In one instance, a child on the way home from school opens a voice or video conferencing call to a parent device and asks for permission to go instead to a friend's house. Because details, such as the length of the visit, the name of the friend, and the means to return home after dark, need to be discussed, and the child device has no keypad, a voice or video teleconference is required so that the parent is aware of and comfortable with the child's plan. The combination of a store-and-share protocol with dynamic allocation of slots as is native in 5G permits teleconferencing and defines a new messaging mode termed "SNS." SNS is an advance over SMS because voice is used instead of text and the data are carried in the traffic channel, not the control channel. Use of messages in the control channel may increase the vulnerability of the system to malicious attacks because the control channel also carries commands to the SIM module and can interrupt access to the system, allow user equipment to be operated by third parties, or to break encryption. The SNS system, in a low-latency network environment, also permits child and parent devices to carry on a virtual full-duplex conversation without a telephone in the child's hand, and serves to reduce the cost of voice communication hardware from typically $1000 at this writing to a fraction of that as the cost of the child minder device.

Example VI

A child minder device is built with energy-saving features. These include an OLED display screen, a sleep mode, a supersleep mode, a paging routine enabling the device to make an arrangement with the network to receive pages at pre-set times when the device is listening, and if there are no pages, to go into supersleep until the time of the next paging window. A 300 mA-hr battery, using a combination of hardware selections and software, is found to operate the child minder device in normal use for several months between battery charges.

It is contemplated that articles, apparatus, methods, and processes of the claimed subject matter encompass variations and adaptations developed using information from the embodiments described herein. Adaptation and/or modification of the articles, apparatus, methods, and processes described herein may be performed by those of ordinary skill in the relevant art.

Throughout the description, where embodiments, articles and apparatus are described as having, including, or comprising specific components, or where processes and methods are described as having, including, or comprising specific steps, it is contemplated that, additionally, there are articles and apparatus of the present disclosure that consist essentially of, or consist of, the recited components, and that there are processes and methods according to the present disclosure that consist essentially of, or consist of, the recited processing steps.

It should be understood that the order of steps or order for performing certain actions is immaterial so long as the implementation remains operable. Moreover, two or more steps or actions may be conducted simultaneously.

Safe Harbor

This specification is provided in connection with a Utility Patent Application filed with the United States Patent and Trademark Office, and as such includes informal sketches and copies of photographs showing exemplary embodiments. A picture is worth a thousand words, and thereby this application discloses everything taught or suggested to one of ordinary skill in the art by the included sketches and photographs, in concert with the information otherwise disclosed herein.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the disclosure. The examples and embodiments described herein are not limited to particularly exemplified materials, methods, and/or structures and various changes may be made in the size, shape, type, number and arrangement of parts described herein. All embodiments, alternatives, modifications and equivalents may be subcombined and combined to provide further embodiments of the present disclosure without departing from the true spirit and scope of the disclosure.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

The invention claimed is:
1. A minder device, comprising:
  a processor with transceiver and instruction set which when executed by the processor cause the transceiver to receive a notification or query from a paired monitor device and in response to send to the paired monitor device a selectable response to over a software defined cellular virtual network ("closed network"), without a dial pad, under control of a network host server;

a selector with inputs to the processor, the inputs are configurable to select at least one selectable response sendable to the monitor device;

a memory with message queue for storing the incoming notification or query;

wherein the processor causes the message queue to be cleared when the notification or query in queue has been timely responded to by a sent selectable response, not to clear the message queue when the incoming notification or query has not been timely responded to; and to cause a location fix and a time stamp to be generated and transmitted to the host server or the monitor device when the response to the incoming notification or query has not been timely responded to or if the sent response is not accepted as an acceptable response by the host server or by the monitor device.

2. The minder device of claim 1 wherein the transceiver includes a cellular radio set and the selectable responses include one or more of responses selected from affirmatory responses, declinatory responses, and store-and-share audio message responses transmitted over the closed network.

3. The minder device of claim 1, wherein the processor is configured to determine a geographical location of the transceiver; and wherein the transceiver is configured to send, to the monitor device via a cellular network and the host server, data representing the determined geographical location.

4. The minder device of claim 1, wherein the processor is configured to generate a network-assisted geographical location of the transceiver via a cellular network and the host server.

5. The minder device of claim 1, further comprising: a processor configured to generate a geographical location of the transceiver; and wherein the transceiver is configured to send, to the monitor device via a cellular network and the host server in response to the incoming notification or query, data representing the determined geographical location.

6. The minder device of claim 1, further comprising: a satellite-positioning circuit configured to determine a geographical location of the satellite-positioning circuit; and wherein the transceiver is configured to send, to the monitor device via the closed network and the host server, data representing the determined geographical location.

7. The minder device of claim 1, further comprising: a satellite-positioning circuit configured to determine a geographical location of the satellite-positioning circuit in response to the notification or query; and wherein the transceiver is configured to send, to the monitor device via the closed network and the host server, data representing the determined geographical location.

8. The minder device of claim 1, wherein the host server is configured to generate a network-assisted current location or last location of the transceiver in response to a non-response by the minder device and to send the current location or last location to the monitor device via the closed network.

9. The minder device of claim 1 wherein the transceiver is configured to receive the notification or query from a monitor device that the host server associates with the minder device.

10. The minder device of claim 1, further comprising a rendering circuit configured to associate one or more of the selectable responses with a respective one of the configurable inputs to which the selector is configurable.

11. The minder device of claim 1, further comprising a rendering circuit configured to associate, in a manner perceivable by a human operator of the selector, one or more of the selectable responses with a respective one of the configurable inputs to which the selector is configurable.

12. The minder device of claim 1 wherein the selector is configurable by a human operator to activate a microphone and an audio codec configured to record, store and transmit a store-and-share audio message.

13. The minder device of claim 1 wherein the selector comprises a switch with microphone and audio codec configured to record, store and transmit a store-and-share audio message.

14. The minder device of claim 1 wherein the transceiver is configured to transition from a lower-power mode to a higher-power mode in response to the notification or query.

15. A method, comprising: receiving with a minder device, from a host server via a cellular network, an incoming message from a monitor device paired with the minder device in a software-defined virtual network ("closed network");

storing the incoming message in a message queue;
activating a vibrator to alert a wearer of the minder device of an incoming message in the message queue; and,
in response to the incoming message:
  i. clearing the queue if the message has been timely responded to by sending an acceptable response,
  ii. not clearing the queue if the incoming message has not been timely responded to,
  iii. causing a location fix and a time stamp to be generated and transmitted to the host server or the monitor device if the incoming message has not been timely responded to or the sent response is not accepted as an acceptable response by the host server or the monitor device.

16. The method of claim 15, further comprising:
determining, with the minder device, a geographical location of the minder device; and sending, to the monitor device via the closed network and the host server, data representing the determined geographical location.

17. The method of claim 15, further comprising: a network-assisted location fix of the transceiver; and sending, to the monitor device via the closed network and the host server, data representing a current location of the minder device.

18. The method of claim 15, further comprising: by the host server, generating a network-assisted current location or last known location of the transceiver in response to a non-response by the minder device and sending the current location or last known location to the monitor device.

19. The method of claim 15, further comprising with the minder device, selecting, by a selector, a response that is responsive to the message and transmitting the response without a dial pad before clearing the queue.

20. The method of claim 15, further comprising associating with the minder device, in a manner perceivable by a human operator of the minder device, one or more selectable responses that are responsive to the message.

21. The method of claim 15, further comprising transitioning the minder device from a lower-power mode to a higher-power mode in response to the message.

22. The method of claim 15, further comprising recording an audio recording and, without a dial pad, sending the audio recording as a packetized store-and-share (SNS) message to the monitor device.

23. A system, comprising:
a monitor device configured to send, via a software-defined virtual network ("closed network"), a monitor notification or query, and to receive, via the closed network, a minder response;
a minder device configured to receive, via the closed network, the monitor notification or query, and in response to the monitor notification or query, having a selector configured to select a selectable response ("minder response") responsive to the monitor message, and to send, via the closed network, without a dial pad, the minder response; and
a cloud host configured to:
receive the monitor notification or query from the monitor device over the closed network, to route the monitor message to the minder device over the closed network, to receive the minder response from the minder device over the closed network, and to route the minder response to the monitor device over the closed network; and, ii) in response to an untimely or an unresponsive response to a monitor message, to generate a request for a network-assisted location of the minder device.

24. The system of claim 23, wherein the cloud host is configured to generate a current location in response to a motion of the minder device.

25. The system of claim 23, wherein the cloud host is configured to generate a network-assisted location fix on demand, to store the current location and at least one last location as waypoints with timestamps, and to generate a map showing the current location and recent waypoints on a display of a monitor device.

26. The system of claim 23, wherein the cloud host is configured to summon assistance to the location of the minder device when a proximate hazard is detected.

27. The system of claim 23, wherein the minder device comprises a display, speaker, a microphone and an audio vocoder, and the system is configured to transmit and receive packetized store-and-share voice messages between the minder device and the monitor device and to store and display monitor device location data on the minder device.

28. The system of claim 23, wherein the system is configured to transmit packetized store-and-share voice messages between the minder device and the monitor device on the traffic channel of a closed network connection with the host computer.

29. The system of claim 23, wherein the minder device, in response to a monitor message, includes switches for entering affirmative or declinatory button press responses, and the system is configured to send the responses to the monitor device in mini—slots on the closed network connection.

30. The system of claim 23, wherein the minder device comprises a camera, a display, a speaker, a microphone, and flash memory, and the minder device is configured to record and store video message recordings in flash memory and to transmit SNS-packetized video message recordings from the minder device to the monitor device.

31. The system of claim 30, wherein the minder device comprises a camera, a display, a speaker, a microphone, and flash memory, and the system is configured to receive and store video message recordings in flash memory from the monitor device and to display the video message recordings.

32. The system of claim 23, wherein the monitor device is a smartphone and the smartphone comprises an instruction set, which when executed by a processor of the smartphone, causes the system to be configured for pairing the smartphone with a minder device.

33. The device of claim 1, further comprising a vibrator configured to alert a wearer of the minder device of a notification or query in the message queue.

* * * * *